(12) United States Patent
Pevarello et al.

(10) Patent No.: US 12,545,682 B2
(45) Date of Patent: Feb. 10, 2026

(54) HETEROCYCLIC DERIVATIVES AS P2X7 RECEPTOR ANTAGONISTS

(71) Applicant: BREYE THERAPEUTICS APS, Hørsholm (DK)

(72) Inventors: Paolo Pevarello, Bresso (IT); Mariangela Sodano, Bresso (IT); Valentina Cusano, Bresso (IT); Francesco Piscitelli, Bresso (IT); Domenica Torino, Bresso (IT); Rocco Vitalone, Bresso (IT); Ali Munaim Yousif, Bresso (IT); Oleksii Artamonov, Cracow (PL)

(73) Assignee: Breye Therapeutics ApS, Hørsholm (DK)

( * ) Notice: Subject to any disclaimer, the term of this patent is extended or adjusted under 35 U.S.C. 154(b) by 416 days.

(21) Appl. No.: 18/265,023

(22) PCT Filed: Dec. 16, 2021

(86) PCT No.: PCT/EP2021/086250
§ 371 (c)(1),
(2) Date: Jun. 2, 2023

(87) PCT Pub. No.: WO2022/129365
PCT Pub. Date: Jun. 23, 2022

(65) Prior Publication Data
US 2024/0034737 A1 Feb. 1, 2024

(30) Foreign Application Priority Data
Dec. 18, 2020 (EP) .................................... 20215585

(51) Int. Cl.
C07D 487/04 (2006.01)
C07D 417/14 (2006.01)
C07D 471/04 (2006.01)
C07D 498/04 (2006.01)

(52) U.S. Cl.
CPC ......... *C07D 487/04* (2013.01); *C07D 417/14* (2013.01); *C07D 471/04* (2013.01); *C07D 498/04* (2013.01)

(58) Field of Classification Search
CPC .................................................. C07D 417/14
See application file for complete search history.

(56) References Cited

FOREIGN PATENT DOCUMENTS

| WO | 2004099146 A1 | 11/2004 |
| WO | 2015118019 A1 | 8/2015 |
| WO | 2018041563 A1 | 3/2018 |

OTHER PUBLICATIONS

International Search Report and Written Opinion issued in International Application No. PCT/EP2021/086250, mailed Mar. 21, 2022, 9 pages.
Kittaka A., Basic Pharmaceutical Textbook Series 6, Drug Discovery Science, Medicinal Chemistry, pp. 142-150 (2007) (11 pages) (accompanied by Machine English translation of same (11 pages)).
Shuji Yasuda, Notification of Reasons for Rejection issued in Japanese Application No. 2023-535964, mailed Oct. 24, 2025 (3 pages) (accompanied by English translation of same (3 pages)).

*Primary Examiner* — Andrew D Kosar
*Assistant Examiner* — John D McAnany
(74) *Attorney, Agent, or Firm* — McNeill PLLC

(57) ABSTRACT

The present invention relates to novel 1,4-substituted piperidine compounds of formula (I) having P2X7 receptor (P2X7) antagonistic properties, pharmaceutical compositions comprising these compounds, chemical processes for preparing these compounds and their use in the treatment or prophylaxis of diseases associated with P2X7 receptor activity in animals, in particular humans.

9 Claims, No Drawings

HETEROCYCLIC DERIVATIVES AS P2X7 RECEPTOR ANTAGONISTS

CROSS-REFERENCE TO RELATED APPLICATIONS

This application is a national phase entry pursuant to 35 U.S.C. § 371 of International Application No. PCT/EP2021/086250, filed Dec. 16, 2021, which claims the benefit of priority of European Application No. 20215585.9, filed Dec. 18, 2020, each of which is incorporated herein by reference in its entirety for any purpose.

The present invention is related to novel substituted heterocyclic compounds of formula (I) having P2X7 receptor (P2X7) antagonistic properties, pharmaceutical compositions comprising these compounds, chemical processes for preparing these compounds and their use in the treatment or prophylaxis of diseases associated with P2X7 receptor activity in animals, in particular humans.

P2X7 belongs to the family of P2X ionotropic receptors. P2X7 is activated by extracellular nucleotides, notably adenosine triphosphate (ATP). P2X7 is distinguished from other P2X family members by the specific localization (CNS and immunocompetent cells in particular), by the high concentrations of ATP (in the mM range) required to activate it and by its ability to form a large pore upon prolonged or repeated stimulation. P2X7 is a ligand-gated ion channel and is present on a variety of cell types, largely those known to be involved in the inflammatory and/or immune process, specifically, macrophages, mast cells and lymphocytes (T and B). Activation of the P2X7 receptor by extracellular nucleotides, e.g., ATP, leads to the release of interleukin-1β (IL-1β) and giant cell formation (macrophages/microglial cells), degranulation (mast cells) and L-selectin shedding (lymphocytes). P2X7 receptors are also located on antigen-presenting cells (APC), keratinocytes, salivary acinar cells (parotid cells), hepatocytes, erythrocytes, erythroleukaemic cells, monocytes, fibroblasts, bone marrow cells, neurones, and renal mesangial cells. The P2X7 receptor is also known to be a pain sensor in the nervous system. Experiments using P2X7 deficient mice demonstrate the role of P2X7 in the development of pain as these mice were protected from the development of both adjuvant-induced inflammatory pain and partial nerve ligation induced neuropathic pain. There is also growing evidence that P2X7 or its downstream effectors, such as IL-1β, are involved in the pathophysiology of several neurological disorders, such as, Alzheimer's Disease (J. I. Diaz-Hernandez et al., Neurobiol. Aging 2012, 1816-1828: In vivo P2X7 inhibition reduces Aβ plaques in AD through GSK3β). P2X7 is thought to have an important function in neurotransmission within the CNS through its activation on postsynaptic and/or presynaptic neurons and glia. Data has emerged using in situ hybridization that P2X7 receptor mRNA is widely distributed throughout the rat brain. Specifically, areas of high P2X7 mRNA expression were found in the anterior olfactory nucleus, cerebral cortex, piriform cortex (Pir), lateral septal nucleus (LS), hippocampal pyramidal cell layers of CA1, CA3, CA4, pontine nuclei, external cuneate nucleus, and medial vestibular nucleus. P2X7 hybridization signals were also observed in the motor neurons of the trigeminal motor nucleus, facial nucleus, hypoglossal nucleus, and the anterior horn of the spinal cord.

Hence there is a therapeutic rationale for the use of P2X7 antagonists in the treatment of a variety of disease states. These states include but are not limited to diseases associated with the CNS such as Alzheimer's Disease, Parkinson's Disease, Huntington's Disease, Amyotrophic Lateral Sclerosis, spinal cord injury, cerebral ischemia, head trauma, meningitis, sleep disorders, mood and anxiety disorders, HIV-induced neuroinflammation, and chronic neuropathic and inflammatory pain. Furthermore, peripheral inflammatory disorders and autoimmune diseases including but not limited to rheumatoid arthritis, ostheoarthritis, psoriasis, allergic dermatitis, asthma, chronic obstructive pulmonary disease, airways hyper-responsiveness, septic shock, bronchitis, glomerulonephritis, irritable bowel syndrome, fatty liver disease, liver fibrosis, skin injury, lung emphysema, muscular dystrophy, fibrosis, atherosclerosis, burn injury, Crohn's Disease, ulcerative colitis, age-related macular degeneration, growth and metastasis of malignant cells, Sjögren's syndrome, myoblastic leukaemia, diabetes, osteoporosis, ischemic heart disease are all examples where the involvement of P2X7 receptors has been implicated. In view of the clinical importance of P2X7, the identification of compounds that modulate P2X7 receptor function represents an attractive avenue into the development of new therapeutic agents.

P2X7 inhibitors are described in various patent applications such as:
  WO2004/099146 that discloses benzamide inhibitors of the P2X7 receptor and their use in the treatment of inflammatory diseases.
  WO2009/108551 that discloses heteroarylamide analogs and their use in P2X7 receptor mediated conditions.
  WO2009/132000 that discloses quinoline and isoquinoline substituted P2X7 receptor antagonists and their use in P2X7 receptor mediated conditions.
  WO2015/119018 that discloses thiazole and oxazole derivatives as P2X7 receptor antagonists and their use in P2X7 receptor mediated conditions.
  WO2018/041563 that discloses substituted N-[2-(4-phenoxypiperidin-1-yl)-2-(1,3-thiazol-5-yl)ethyl]benzamide and N-[2-(4-benzyloxypiperidin-1-yl)-2-(1,3-thiazol-5-yl)ethyl]benzamide derivatives P2X7 receptor antagonists.

However, there is still an unmet need for compounds which are able to efficiently antagonize P2X7 both in the human and rodent species, with suitable drug-like properties, and that can be optimally delivered in the different target organs which are sites of a P2X7 mediated pathology, including the brain. Such compounds are provided herein.

Various embodiments of the invention are presented hereafter;

The present invention relates to heterocyclic compounds of the following formula (I) or a pharmaceutically acceptable salt thereof:

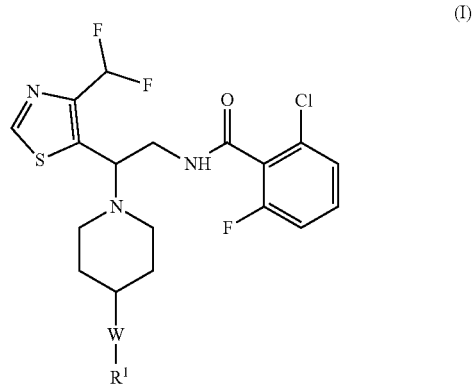

(I)

including any stereochemically isomeric form thereof, wherein

W is oxygen, O—C1-C4 alkyl; C1-C4 alkyl-O—

R$^1$ is monocyclic or bicyclic five to ten membered heterocyclic ring optionally substituted with one or more group selected from C1-C4 alkyl (optionally substituted with halogen), C1-C4 alkoxy, halogen, cyano, C3-C6 cycloalkyl; and a benzofused heterocycle.

As used in the foregoing definitions:

The terms "halo", "halogen" and "halide", which may be used interchangeably, refer to a substituent fluoro, chloro, bromo, or iodo.

The term "stereochemically isomeric forms" as used hereinbefore defines all the possible isomeric forms which the compounds of formula (I) may possess. Unless otherwise mentioned or indicated, the chemical designation of compounds denotes the mixture of all possible stereochemically isomeric forms, said mixtures containing all diastereomers and enantiomers of the basic molecular structure. More in particular, stereogenic centers may have the R- or S-configuration; substituents on bivalent cyclic (partially) saturated radicals may have either the cis- or trans-configuration.

Stereochemically isomeric forms of the compounds of formula (I) are obviously intended to be embraced within the scope of this invention.

The absolute stereochemical configuration of the compounds of formula (I) and of the intermediates used in their preparation may easily be determined by those skilled in the art while using well-known methods such as, for example, X-ray diffraction.

Furthermore, some compounds of formula (I) and some of the intermediates used in their preparation may exhibit polymorphism. It is to be understood that the present invention encompasses any polymorphic forms possessing properties useful in the treatment of the conditions noted hereinabove.

The pharmaceutically acceptable salts as mentioned hereinabove are meant to comprise the therapeutically active non-toxic acid addition salt forms that the compounds of formula (I) are able to form. These pharmaceutically acceptable acid addition salts can conveniently be obtained by treating the base form with such appropriate acid. Appropriate acids comprise, for example, inorganic acids such as hydrohalic acids, e.g. hydrochloric or hydrobromic acid, sulfuric, nitric, phosphoric and the like acids; or organic acids such as, for example, acetic, propanoic, hydroxyacetic, lactic, pyruvic, oxalic (i.e. ethanedioic), malonic, succinic (i.e. butanedioic acid), maleic, fumaric, malic, tartaric, citric, methanesulfonic, trifluoromethanesulfonic, ethanesulfonic, benzenesulfonic, p-toluenesulfonic, cyclamic, salicylic, p-amino salicylic, pamoic and the like acids.

Conversely said salt forms can be converted by treatment with an appropriate base into the free base form.

The compounds of formula (I) may exist in both unsolvated and solvated forms. The term 'solvate' is used herein to describe a molecular association comprising a compound of the invention and one or more pharmaceutically acceptable solvent molecules, e.g. water or ethanol. The term 'hydrate' is used when said solvent is water.

A preferred embodiment of the invention relates to compounds of Formula (I) as defined above wherein:

W is oxygen, 0-C1-C4 alkyl; C1-C4 alkyl-O—

R$^1$ is pyridine, mono o di-substituted with cyano, methyl, halogen, trifluoromethyl group and/or C3-C7 cycloalkyl; pyrimidine, mono or di-substituted with cyano methyl, trifluoromethyl group, C3-C7 alkoxy, C3-C7 cycloalkoxy and/or halogen; oxazole, mono or di-substituted with C3-C7 cycloalkyl, methyl and/or halogen; thiazole, mono or di-substituted with C3-C7 cycloalkyl, cyano, methyl and/or halogen; benzothiazole; benzoxazole; thiadiazole, mono or di-substituted with methyl, halogen, phenyl and/or C1-C4 alkoxy; tetrazole, substituted or not with phenyl; benzodiazole, substituted or not with halogen, phenyl; pyridazine, substituted with methyl and/or halogen; pyrazolo[1,5-a]pyrazine; [1,2,4]triazolo[4,3-a]pyrazine; naphthyridine; pyrazolo[3,4-d]pyrimidine; pyrazine, mono o di-substituted with C3-C7 cycloalkyl, methyl, heterocycle and/or halogen; [1,2]oxazolo[5,4-b]pyridine; or phthalazine.

Another embodiment of the invention relates compounds of Formula (I) as defined above wherein:

W is oxygen, —CH$_2$O— or —OCH$_2$—

R$^1$ is pyridin-2-yl, pyridin-3-yl, pyridin-4-yl, pyrimidin-2-yl, 5-fluoropyridin-3-yl, 3-fluoropyridin-4-yl, 3-fluoropyridin-2-yl, 1,5-methyl-1,2-oxazol-3-yl, dim ethyl-1,2-oxazol-4-yl, 1,3-thiazol-2-yl, 3-methyl-1,2,4-thiadiazol-5-yl, 4-chloro-1,3-thiazol-2-yl, 3-cyclopropyl-1,2,4-thiadiazol-5-yl, 6-methylpyridin-2-yl, 4-methylpyridin-2-yl, 5-cyanopyridin-3-yl, 3-cyanopyrazin-2-yl, 2-cyanopyrazin-3-yl, 2-chloropyridin-3-yl, 1,3-Benzothiazol-2-yl, 1,2-Benzoxazol-3-yl, 1,3-Benzoxazol-2-yl, 3-(2-m ethoxy ethyl)-1,2,4-thiadiazol-5-yl, 3-phenyl-1,2,4-oxadiazol-5-yl, 1-phenyl-1H-1,2,3,4-tetrazol-5-yl, 4-fluoro-1-methyl-1H-1,3-benzodiazol-2-yl, 3-methylpyridin-2-yl, 5-methylpyrimidin-2-yl, 6-methylpyridazin-3-yl, 5-fluoropyridin-2-yl, 6-fluoropyrimidin-4-yl, 6-fluoropyridazin-3-yl, 6-fluoropyrazin-2-yl, 3-fluoropyrazin-2-yl, 2-fluoropyrimidin-4-yl, 3-cyanopyridin-2-yl, 6-cyanopyridin-2-yl, 4-cyanopyridin-3-yl, 6-fluoro-2-methylpyrimidin-4-yl, 6-fluoro-5-methylpyrimidin-4-yl, 6-cyclopropylpyridin-2-yl, 4-(trifluoromethyl)pyrimidin-2-yl, 6-(trifluoromethyl)pyrimidin-4-yl, pyrazolo[1,5-a]pyrazin-4-yl, [1,2,4]triazolo[4,3-a]pyrazin-5-yl, [1,2,4]triazolo[4,3-a]pyrazin-8-yl, 3-chloropyridin-2-yl, 1,5-naphthyridin-4-yl, 1,6-naphthyridin-5-yl, 3-cyanopyridin-4-yl, -methyl-1H-pyrazolo[3,4-d]pyrimidin-4-yl, 3-methyl-[1,2,4]triazolo[4,3-a]pyrazin-8-yl, 4-cyano-3-methyl-1,2-thiazol-5-yl, -fluoro-6-methylpyrimidin-4-yl, 2-fluoro-5-methylpyrimidin-4-yl, 5-fluoro-6-methylpyrimidin-4-yl, 3-(difluoromethoxy)pyridin-2-yl, 3-(difluoromethoxy)pyridin-2-yl, 6-(1H-pyrazol-1-yl)pyrazin-2-yl, 3-(trifluoromethyl)pyridin-2-yl, 6-(trifluoromethyl)pyridin-2-yl, 2-(trifluoromethyl)pyridin-4-yl, 3,6-dimethyl-[1,2]oxazolo[5,4-b]pyridin-4-yl, 2-methoxypyrimidin-4-yl, 4-methoxypyrimidin-2-yl, 6-methoxypyrimidin-4-yl, -cyclobutoxypyrazin-2-yl, 5-fluoro-2,6-dimethylpyrimidin-4-yl, 4-chloropyridin-3-yl, pyrazin-2-yl, pyridazin-3-yl, 6-fluoropyridin-2-yl, 2-methylpyridin-4-yl, 2-chloropyrimidin-4-yl, 4-chloropyrimidin-2-yl, 6-chloropyrazin-2-yl, 6-chloropyridin-2-yl, pyrimidin-4-yl, 2-fluoropyridin-4-yl, 4-fluoropyridin-2-yl, 1,3-thiazol-2-yl, 4-chloro-1,3-thiazol-2-yl, 4-methyl-1,3-thiazol-2-yl, 3-methyl-1,2,4-thiadiazol-5-yl, 4-cyano-1-methyl-1H-pyrazol-5-yl, 3-cyclopropyl-1,2,4-thiadiazol-5-yl, 6-methyl pyridin-2-yl, 4-methylpyridin-2-yl, 2-cyanopyridin-3-yl, 5-cyanopyridin-3-yl, 3-cyanopyrazin-2-yl, 1,3-Benzothiazol-2-yl, 1,2-Benzoxazol-3-yl, 3-(2-m ethoxy ethyl)-1,2,4-thiadiazol-5-yl, 4-phenyl-4H-1,2,4-triazol-3-yl, 1-phenyl-1H-1,2,3,4-tetrazol-5-yl, 4-fluoro- 1-methyl-1H-1,3-benzodiazol-2-yl, 3-methylpyridin-2-yl, 5-methylpyrimidin-2-yl, 6-methylpyridazin-3-yl, 5-fluoropyridin-2-yl, 6-fluoropyrimidin-4-yl, 6-fluoropyridazin-3-yl, 6-fluoropyrazin-2-yl, 3-fluoropyrazin-2-yl, 2-fluoropyrimidin-4-yl, 3-cyanopyridin-2-yl, 6-cyanopyridin-2-yl, 2-cyanopyridin-4-yl, 4-cyanopyridin-3-yl, 6-fluoro-2-methylpyrimidin-4-yl, 6-fluoro-5-methylpyrimidin-4-yl, 4-(trifluoromethyl)pyrimidin-2-yl, 6-(trifluoromethyl)pyrimidin-4-yl, pyrazolo[1,5-a]pyrazin-4-yl, pyrazolo[1,5-a]pyrimidin-5-yl, [1,2,4]triazolo[4,3-a]pyrazin-5-yl, [1,2,4]triazolo[4,3-a]pyrazin-8-yl, 3-chloropyridin-2-yl, 1,6-naphthyridin-5-yl, 3-cyanopyridin-4-yl, 1-methyl-1H-pyrazolo[3,4-d]pyrimidin-4-yl, 6-fluoropyridin-2-yl, 2-fluoropyridin-4-yl, 4-fluoropyridin-2-yl, or 2-cyanopyridin-4-yl.

Most preferably, a compound of formula (I) according to this invention is selected from the group consisting of:

| Example | Name |
|---|---|
| 1 | 2-chloro-N-{2-[4-(difluoromethyl)-1,3-thiazol-5-yl]-2-[4-(pyridin-2-yloxy)piperidin-1-ylethyl}-6-fluorobenzamide |
| 2 | 2-chloro-N-{2-[4-(difluoromethyl)-1,3-thiazol-5-yl]-2-[4-(pyridin-3-yloxy)piperidin-1-yl]ethyl}-6-fluorobenzamide |
| 3 | 2-chloro-N-{2-[4-(difluoromethyl)-1,3-thiazol-5-yl]-2-[4-(pyridin-4-yloxy)piperidin-1-yl]ethyl}-6-fluorobenzamide |
| 4 | 2-chloro-N-{2-[4-(difluoromethyl)-1,3-thiazol-5-yl]-2-[4-(pyrimidin-2-yloxy)piperidin-1-yl]ethyl}-6-fluorobenzamide |
| 5 | 2-chloro-N-{2-[4-(difluoromethyl)-1,3-thiazol-5-yl]-2-{4-[(5-fluoropyridin-3-yl)oxy]piperidin-1-yl}ethyl}-6-fluorobenzamide |
| 6 | 2-chloro-N-{2-[4-(difluoromethyl)-1,3-thiazol-5-yl]-2-{4-[(3-fluoropyridin-4-yl)oxy]piperidin-1-yl}ethyl}-6-fluorobenzamide |
| 7 | 2-chloro-N-{2-[4-(difluoromethyl)-1,3-thiazol-5-yl]-2-{4-[(3-fluoropyridin-2-yl)oxy]piperidin-1-yl}ethyl}-6-fluorobenzamide |
| 8 | 2-chloro-N-{2-[4-(difluoromethyl)-1,3-thiazol-5-yl]-2-{4-[(5-methyl-1,2-oxazol-3-yl)methoxy]piperidin-1-yl}ethyl}-6-fluorobenzamide |
| 9 | 2-chloro-N-{2-[4-(difluoromethyl)-1,3-thiazol-5-yl]-2-{4-[(dimethyl-1,2-oxazol-4-yl)methoxy]piperidin-1-yl}ethyl}-6-fluorobenzamide |
| 10 | 2-chloro-N-{2-[4-(difluoromethyl)-1,3-thiazol-5-yl]-2-[4-(1,3-thiazol-2-yloxy)piperidin-1-yl]ethyl}-6-fluorobenzamide |
| 11 | 2-Chloro-N-{2-[4-(difluoromethyl)-1,3-thiazol-5-yl]-2-{4-[(3-methyl-1,2,4-thiadiazol-5-yl)oxy]piperidin-1-yl}ethyl}-6-fluorobenzamide |
| 12 | 2-Chloro-N-(2-{4-[(4-chloro-1,3-thiazol-2-yl)oxy]piperidin-1-yl}-2-[4-(difluoromethyl)-1,3-thiazol-5-yl]ethyl)-6-fluorobenzamide |
| 13 | 2-Chloro-N-(2-{4-[(3-cyclopropyl-1,2,4-thiadiazol-5-yl)oxy]piperidin-1-yl}-2-[4-(difluoromethyl)-1,3-thiazol-5-yl]ethyl)-6-fluorobenzamide |
| 14 | 2-Chloro-N-{2-[4-(difluoromethyl)-1,3-thiazol-5-yl]-2-{4-[(6-methylpyridin-2-yl)oxy]piperidin-1-yl}ethyl}-6-fluorobenzamide |
| 15 | 2-Chloro-N-{2-[4-(difluoromethyl)-1,3-thiazol-5-yl]-2-{4-[(4-methylpyridin-2-yl)oxy]piperidin-1-yl}ethyl}-6-fluorobenzamide |
| 16 | 2-Chloro-N-(2-{4-[(5-cyanopyridin-3-yl)oxy]piperidin-1-yl}-2-[4-(difluoromethyl)-1,3-thiazol-5-yl]ethyl)-6-fluorobenzamide |
| 17 | 2-Chloro-N-(2-{4-[(3-cyanopyrazin-2-yl)oxy]piperidin-1-yl}-2-[4-(difluoromethyl)-1,3-thiazol-5-yl]ethyl)-6-fluorobenzamide |
| 18 | 2-Chloro-N-(2-{4-[(2-cyanopyridin-3-yl)oxy]piperidin-1-yl}-2-[4-(difluoromethyl)-1,3-thiazol-5-yl]ethyl)-6-fluorobenzamide |
| 19 | 2-Chloro-N-(2-{4-[(2-chloropyridin-3-yl)oxy]piperidin-1-yl}-2-[4-(difluoromethyl)-1,3-thiazol-5-yl]ethyl)-6-fluorobenzamide |
| 20 | N-{2-[4-(1,3-Benzothiazol-2-yl oxy)piperidin-1-yl]-2-[4-(difluoromethyl)-1,3-thiazol-5-yl]ethyl}-2-chloro-6-fluorobenzamide |
| 21 | N-{2-[4-(1,2-Benzoxazol-3-yloxy)piperidin-1-yl]-2-[4-(difluoromethyl)-1,3-thiazol-5-yl]ethyl}-2-chloro-6-fluorobenzamide |
| 22 | N-{2-[4-(1,3-Benzoxazol-2-yloxy)piperidin-1-yl]-2-[4-(difluoromethyl)-1,3-thiazol-5-yl]ethyl}-2-chloro-6-fluorobenzamide |
| 23 | 2-Chloro-N-{2-[4-(difluoromethyl)-1,3-thiazol-5-yl]-2-(4-{[3-(2-methoxyethyl)-1,2,4-thiadiazol-5-yl]oxy}piperidin-1-yl)ethyl}-6-fluorobenzamide |
| 24 | 2-Chloro-N-{2-[4-(difluoromethyl)-1,3-thiazol-5-yl]-2-{4-[(3-phenyl-1,2,4-oxadiazol-5-yl)oxy]piperidin-1-yl}ethyl}-6-fluorobenzamide |
| 25 | 2-Chloro-N-{2-[4-(difluoromethyl)-1,3-thiazol-5-yl]-2-{4-[(1-phenyl-1H-1,2,3,4-tetrazol-5-yl)oxy]piperidin-1-yl}ethyl}-6-fluorobenzamide |
| 26 | 2-Chloro-N-{2-[4-(difluoromethyl)-1,3-thiazol-5-yl]-2-{4-[(4-fluoro-1-methyl-1H-1,3-benzodiazol-2-yl)oxy]piperidin-1-yl}ethyl}-6-fluorobenzamide |
| 27 | 2-Chloro-N-{2-[4-(difluoromethyl)-1,3-thiazol-5-yl]-2-{4-[(3-methylpyridin-2-yl)oxy]piperidin-1-yl}ethyl}-6-fluorobenzamide |
| 28 | 2-Chloro-N-{2-[4-(difluoromethyl)-1,3-thiazol-5-yl]-2-{4-[(5-methylpyrimidin-2-yl)oxy]piperidin-1-yl}ethyl}-6-fluorobenzamide |
| 29 | 2-Chloro-N-{2-[4-(difluoromethyl)-1,3-thiazol-5-yl]-2-{4-[(6-methylpyridazin-3-yl)oxy]piperidin-1-yl}ethyl}-6-fluorobenzamide |
| 30 | 2-Chloro-N-{2-[4-(difluoromethyl)-1,3-thiazol-5-yl]-2-{4-[(5-fluoropyridin-2-yl)oxy]piperidin-1-yl}ethyl}-6-fluorobenzamide |
| 31 | 2-Chloro-N-{2-[4-(difluoromethyl)-1,3-thiazol-5-yl]-2-{4-[(6-fluoropyrimidin-4-yl)oxy]piperidin-1-yl}ethyl}-6-fluorobenzamide |
| 32 | 2-Chloro-N-{2-[4-(difluoromethyl)-1,3-thiazol-5-yl]-2-{4-[(6-fluoropyridazin-3-yl)oxy]piperidin-1-yl}ethyl}-6-fluorobenzamide |

-continued

| Example | Name |
|---|---|
| 33 | 2-Chloro-N-{2-[4-(difluoromethyl)-1,3-thiazol-5-yl]-2-{4-[(6-fluoropyrazin-2-yl)oxy]piperidin-1-yl}ethyl}-6-fluorobenzamide |
| 34 | 2-Chloro-N-{2-[4-(difluoromethyl)-1,3-thiazol-5-yl]-2-{4-[(3-fluoropyrazin-2-yl)oxy]piperidin-1-yl}ethyl}-6-fluorobenzamide |
| 35 | 2-Chloro-N-{2-[4-(difluoromethyl)-1,3-thiazol-5-yl]-2-{4-[(2-fluoropyrimidin-4-yl)oxy]piperidin-1-yl}ethyl}-6-fluorobenzamide |
| 36 | 2-Chloro-N-(2-{4-[(3-cyanopyridin-2-yl)oxy]piperidin-1-yl}-2-[4-(difluoromethyl)-1,3-thiazol-5-yl]ethyl)-6-fluorobenzamide |
| 37 | 2-Chloro-N-(2-{4-[(6-cyanopyridin-2-yl)oxy]piperidin-1-yl}-2-[4-(difluoromethyl)-1,3-thiazol-5-yl]ethyl)-6-fluorobenzamide |
| 38 | 2-Chloro-N-(2-{4-[(4-cyanopyridin-3-yl)oxy]piperidin-1-yl}-2-[4-(difluoromethyl)-1,3-thiazol-5-yl]ethyl)-6-fluorobenzamide |
| 39 | 2-Chloro-N-{2-[4-(difluoromethyl)-1,3-thiazol-5-yl]-2-{4-[(6-fluoro-2-methylpyrimidin-4-yl)oxy]piperidin-1-yl}ethyl}-6-fluorobenzamide |
| 40 | 2-Chloro-N-{2-[4-(difluoromethyl)-1,3-thiazol-5-yl]-2-{4-[(6-fluoro-5-methylpyrimidin-4-yl)oxy]piperidin-1-yl}ethyl}-6-fluorobenzamide |
| 41 | 2-Chloro-N-(2-{4-[(6-cyclopropylpyridin-2-yl)oxy]piperidin-1-yl}-2-[4-(difluoromethyl)-1,3-thiazol-5-yl]ethyl)-6-fluorobenzamide |
| 42 | 2-Chloro-N-{2-[4-(difluoromethyl)-1,3-thiazol-5-yl]-2-(4-{[4-(trifluoromethyl)pyrimidin-2-yl]oxy}piperidin-1-yl)ethyl}-6-fluorobenzamide |
| 43 | 2-Chloro-N-{2-[4-(difluoromethyl)-1,3-thiazol-5-yl]-2-(4-{[6-(trifluoromethyl)pyrimidin-4-yl]oxy}piperidin-1-yl)ethyl}-6-fluorobenzamide |
| 44 | 2-Chloro-N-{2-[4-(difluoromethyl)-1,3-thiazol-5-yl]-2-(4-{pyrazolo[1,5-a]pyrazin-4-yloxy}piperidin-1-yl)ethyl}-6-fluorobenzamide |
| 45 | 2-Chloro-N-{2-[4-(difluoromethyl)-1,3-thiazol-5-yl]-2-(4-{[1,2,4]triazolo[4,3-a]pyrazin-5-yloxy}piperidin-1-yl)ethyl}-6-fluorobenzamide |
| 46 | 2-Chloro-N-{2-[4-(difluoromethyl)-1,3-thiazol-5-yl]-2-(4-{[1,2,4]triazolo[4,3-a]pyrazin-8-yloxy}piperidin-1-yl)ethyl}-6-fluorobenzamide |
| 47 | 2-Chloro-N-(2-{4-[(3-chloropyridin-2-yl)oxy]piperidin-1-yl}-2-[4-(difluoromethyl)-1,3-thiazol-5-yl]ethyl)-6-fluorobenzamide |
| 48 | 2-Chloro-N-{2-[4-(difluoromethyl)-1,3-thiazol-5-yl]-2-[4-(1,5-naphthyridin-4-yloxy)piperidin-1-yl]ethyl}-6-fluorobenzamide |
| 49 | 2-Chloro-N-{2-[4-(difluoromethyl)-1,3-thiazol-5-yl]-2-[4-(1,6-naphthyridin-5-yloxy)piperidin-1-yl]ethyl}-6-fluorobenzamide |
| 50 | 2-Chloro-N-(2-{4-[(3-cyanopyridin-4-yl)oxy]piperidin-1-yl}-2-[4-(difluoromethyl)-1,3-thiazol-5-yl]ethyl)-6-fluorobenzamide |
| 51 | 2-Chloro-N-{2-[4-(difluoromethyl)-1,3-thiazol-5-yl]-2-[4-({1-methyl-1H-pyrazolo[3,4-d]pyrimidin-4-yl}oxy)piperidin-1-yl]ethyl}-6-fluorobenzamide |
| 52 | 2-Chloro-N-{2-[4-(difluoromethyl)-1,3-thiazol-5-yl]-2-[4-({3-methyl-[1,2,4]triazolo[4,3-a]pyrazin-8-yl}oxy)piperidin-1-yl]ethyl}-6-fluorobenzamide |
| 53 | 2-Chloro-N-(2-{4-[(4-cyano-3-methyl-1,2-thiazol-5-yl)oxy]piperidin-1-yl}-2-[4-(difluoromethyl)-1,3-thiazol-5-yl]ethyl)-6-fluorobenzamide |
| 54 | 2-Chloro-N-{2-[4-(difluoromethyl)-1,3-thiazol-5-yl]-2-{4-[(2-fluoro-6-methylpyrimidin-4-yl)oxy]piperidin-1-yl}ethyl}-6-fluorobenzamide |
| 55 | 2-Chloro-N-{2-[4-(difluoromethyl)-1,3-thiazol-5-yl]-2-{4-[(2-fluoro-5-methylpyrimidin-4-yl)oxy|piperidin-1-yl}ethyl}-6-fluorobenzamide |
| 56 | 2-Chloro-N-{2-[4-(difluoromethyl)-1,3-thiazol-5-yl]-2-{4-[(5-fluoro-6-methylpyrimidin-4-yl)oxy]piperidin-1-yl}ethyl}-6-fluorobenzamide |
| 57 | 2-Chloro-N-[2-(4-{[3-(difluoromethoxy)pyridin-2-yl]oxy}piperidin-1-yl)-2-[4-(difluoromethyl)-1,3-thiazol-5-yl]ethyl]-6-fluorobenzamide |
| 58 | 2-Chloro-N-{2-[4-(difluoromethyl)-1,3-thiazol-5-yl]-2-(4-{[6-(1H-pyrazol-1-yl)pyrazin-2-yl]oxy}piperidin-1-yl)ethyl}-6-fluorobenzamide |
| 59 | 2-Chloro-N-{2-[4-(difluoromethyl)-1,3-thiazol-5-yl]-2-(4-{[3-(trifluoromethyl)pyridin-2-yl]oxy}piperidin-1-yl)ethyl}-6-fluorobenzamide |
| 60 | 2-Chloro-N-{2-[4-(difluoromethyl)-1,3-thiazol-5-yl]-2-(4-{[6-(trifluoromethyl)pyridin-2-yl]oxy}piperidin-1-yl)ethyl}-6-fluorobenzamide |
| 61 | 2-Chloro-N-{2-[4-(difluoromethyl)-1,3-thiazol-5-yl]-2-(4-{[2-(trifluoromethyl)pyridin-4-yl]oxy}piperidin-1-yl)ethyl}-6-fluorobenzamide |
| 62 | 2-Chloro-N-{2-[4-(difluoromethyl)-1,3-thiazol-5-yl]-2-[4-({3,6-dimethyl-[1,2]oxazolo[5,4-b]pyridin-4-yl}oxy)piperidin-1-yl]ethyl}-6-fluorobenzamide |
| 63 | 2-Chloro-N-{2-[4-(difluoromethyl)-1,3-thiazol-5-yl]-2-{4-[(2-methoxypyrimidin-4-yl)oxy]piperidin-1-yl}ethyl}-6-fluorobenzamide |
| 64 | 2-Chloro-N-{2-[4-(difluoromethyl)-1,3-thiazol-5-yl]-2-{4-[(4-methoxypyrimidin-2-yl)oxy]piperidin-1-yl}ethyl}-6-fluorobenzamide |
| 65 | 2-Chloro-N-{2-[4-(difluoromethyl)-1,3-thiazol-5-yl]-2-{4-[(6-methoxypyrimidin-4-yl)oxy]piperidin-1-yl}ethyl}-6-fluorobenzamide |
| 66 | 2-Chloro-N-(2-{4-[(3-cyclobutoxypyrazin-2-yl)oxy]piperidin-1-yl}-2-[4-(difluoromethyl)-1,3-thiazol-5-yl]ethyl)-6-fluorobenzamide |
| 67 | 2-Chloro-N-{2-[4-(difluoromethyl)-1,3-thiazol-5-yl]-2-{4-[(5-fluoro-2,6-dimethylpyrimidin-4-yl)oxy]piperidin-1-yl}ethyl}-6-fluorobenzamide |

-continued

| Example | Name |
|---|---|
| 68 | 2-Chloro-N-{2-[4-(difluoromethyl)-1,3-thiazol-5-yl]-2-[4-(phthalazin-1-yloxy)piperidin-1-yl]ethyl}-6-fluorobenzamide |
| 69 | 2-Chloro-N-(2-{4-[(4-chloropyridin-3-yl)oxy]piperidin-1-yl}-2-[4-(difluoromethyl)-1,3-thiazol-5-yl]ethyl)-6-fluorobenzamide |
| 70 | 2-Chloro-N-{2-[4-(difluoromethyl)-1,3-thiazol-5-yl]-2-[4-(pyrazin-2-yloxy)piperidin-1-yl]ethyl}-6-fluorobenzamidev |
| 71 | 2-Chloro-N-{2-[4-(difluoromethyl)-1,3-thiazol-5-yl]-2-[4-(pyridazin-3-yloxy)piperidin-1-yl]ethyl}-6-fluorobenzamide |
| 72 | 2-Chloro-N-{2-[4-(difluoromethyl)-1,3-thiazol-5-yl]-2-{4-[(6-fluoropyridin-2-yl)oxy]piperidin-1-yl}ethyl}-6-fluorobenzamide |
| 73 | 2-Chloro-N-{2-[4-(difluoromethyl)-1,3-thiazol-5-yl]-2-{4-[(2-methylpyridin-4-yl)oxy]piperidin-1-yl}ethyl}-6-fluorobenzamide |
| 74 | 2-Chloro-N-(2-{4-[(2-chloropyrimidin-4-yl)oxy]piperidin-1-yl}-2-[4-(difluoromethyl)-1,3-thiazol-5-yl]ethyl)-6-fluorobenzamide |
| 75 | 2-chloro-N-(2-{4-[(4-chloropyrimidin-2-yl)oxy]piperidin-1-yl}-2-[4-(difluoromethyl)-1,3-thiazol-5-yl]ethyl)-6-fluorobenzamide |
| 76 | 2-Chloro-N-(2-{4-[(6-chloropyrazin-2-yl)oxy]piperidin-1-yl}-2-[4-(difluoromethyl)-1,3-thiazol-5-yl]ethyl)-6-fluorobenzamide |
| 77 | 2-Chloro-N-(2-{4-[(6-chloropyridin-2-yl)oxy]piperidin-1-yl}-2-[4-(difluoromethyl)-1,3-thiazol-5-yl]ethyl)-6-fluorobenzamide |
| 78 | 2-Chloro-N-{2-[4-(difluoromethyl)-1,3-thiazol-5-yl]-2-[4-(pyrimidin-4-yloxy)piperidin-1-yl]ethyl}-6-fluorobenzamide |
| 79 | 2-Chloro-N-(2-{4-[(4-cyanopyridin-2-yl)oxy]piperidin-1-yl}-2-[4-(difluoromethyl)-1,3-thiazol-5-yl]ethyl)-6-fluorobenzamide |
| 80 | 2-Chloro-N-{2-[4-(difluoromethyl)-1,3-thiazol-5-yl]-2-{4-[(2-fluoropyridin-4-yl)oxy]piperidin-1-yl}ethyl}-6-fluorobenzamide |
| 81 | 2-chloro-N-{2-[4-(difluoromethyl)-1,3-thiazol-5-yl]-2-{4-[(4-fluoropyridin-2-yl)oxy]piperidin-1-yl}ethyl}-6-fluorobenzamide |
| 82 | 2-chloro-N-{2-[4-(difluoromethyl)-1,3-thiazol-5-yl]-2-{4-[(1,3-thiazol-2-yloxy)methyl]piperidin-1-yl}ethyl}-6-fluorobenzamide |
| 83 | 2-Chloro-N-[2-(4-{[(4-chloro-1,3-thiazol-2-yl)oxy]methyl}piperidin-1-yl)-2-[4-(difluoromethyl)-1,3-thiazol-5-yl]ethyl]-6-fluorobenzamide |
| 84 | 2-Chloro-N-{2-[4-(difluoromethyl)-1,3-thiazol-5-yl]-2-(4-{[(4-methyl-1,3-thiazol-2-yl)oxy]methyl}piperidin-1-yl)ethyl}-6-fluorobenzamide |
| 85 | 2-Chloro-N-{2-[4-(difluoromethyl)-1,3-thiazol-5-yl]-2-(4-{[(3-methyl-1,2,4-thiadiazol-5-yl)oxy]methyl}piperidin-1-yl)ethyl}-6-fluorobenzamide |
| 86 | 2-Chloro-N-[2-(4-{[(4-cyano-1-methyl-1H-pyrazol-5-yl)oxy]methyl}piperidin-1-yl)-2-[4-(difluoromethyl)-1,3-thiazol-5-yl]ethyl]-6-fluorobenzamide |
| 87 | 2-Chloro-N-[2-(4-{[(3-cyclopropyl-1,2,4-thiadiazol-5-yl)oxy]methyl}piperidin-1-yl)-2-[4-(difluoromethyl)-1,3-thiazol-5-yl]ethyl]-6-fluorobenzamide |
| 88 | 2-Chloro-N-{2-[4-(difluoromethyl)-1,3-thiazol-5-yl]-2-(4-{[(6-methylpyridin-2-yl)oxy]methyl}piperidin-1-yl)ethyl}-6-fluorobenzamide |
| 89 | 2-Chloro-N-{2-[4-(difluoromethyl)-1,3-thiazol-5-yl]-2-(4-{[(4-methylpyridin-2-yl)oxy]methyl}piperidin-1-yl)ethyl}-6-fluorobenzamide |
| 90 | 2-Chloro-N-[2-(4-{[(2-cyanopyridin-3-yl)oxy]methyl}piperidin-1-yl)-2-[4-(difluoromethyl)-1,3-thiazol-5-yl]ethyl]-6-fluorobenzamide |
| 91 | 2-Chloro-N-[2-(4-{[(5-cyanopyridin-3-yl)oxy]methyl}piperidin-1-yl)-2-[4-(difluoromethyl)-1,3-thiazol-5-yl]ethyl]-6-fluorobenzamide |
| 92 | 2-Chloro-N-[2-(4-{[(3-cyanopyrazin-2-yl)oxy]methyl}piperidin-1-yl)-2-[4-(difluoromethyl)-1,3-thiazol-5-yl]ethyl]-6-fluorobenzamide |
| 93 | N-(2-{4-[(1,3-Benzothiazol-2-yloxy)methyl]piperidin-1-yl}-2-[4-(difluoromethyl)-1,3-thiazol-5-yl]ethyl)-2-chloro-6-fluorobenzamide |
| 94 | N-(2-{4-[(1,2-Benzoxazol-3-yloxy)methyl]piperidin-1-yl}-2-[4-(difluoromethyl)-1,3-thiazol-5-yl]ethyl)-2-chloro-6-fluorobenzamide |
| 95 | 2-Chloro-N-{2-[4-(difluoromethyl)-1,3-thiazol-5-yl]-2-(4-({[3-(2-methoxyethyl)-1,2,4-thiadiazol-5-yl]oxy}methyl)piperidin-1-yl)ethyl}-6-fluorobenzamide |
| 96 | 2-Chloro-N-{2-[4-(difluoromethyl)-1,3-thiazol-5-yl]-2-(4-{[(4-phenyl-4H-1,2,4-triazol-3-yl)oxy]methyl}piperidin-1-yl)ethyl}-6-fluorobenzamide |
| 97 | 2-Chloro-N-{2-[4-(difluoromethyl)-1,3-thiazol-5-yl]-2-(4-{[(1-phenyl-1H-1,2,3,4-tetrazol-5-yl)oxy]methyl}piperidin-1-yl)ethyl}-6-fluorobenzamide |
| 98 | 2-Chloro-N-{2-[4-(difluoromethyl)-1,3-thiazol-5-yl]-2-(4-{[(4-fluoro-1-methyl-1H-1,3-benzodiazol-2-yl)oxy]methyl}piperidin-1-yl)ethyl}-6-fluorobenzamide |
| 99 | 2-Chloro-N-{2-[4-(difluoromethyl)-1,3-thiazol-5-yl]-2-(4-{[(3-methylpyridin-2-yl)oxy]methyl}piperidin-1-yl)ethyl}-6-fluorobenzamide |
| 100 | 2-Chloro-N-{2-[4-(difluoromethyl)-1,3-thiazol-5-yl]-2-(4-{[(5-methylpyrimidin-2-yl)oxy]methyl}piperidin-1-yl)ethyl}-6-fluorobenzamide |

-continued

| Example | Name |
|---|---|
| 101 | 2-Chloro-N-{2-[4-(difluoromethyl)-1,3-thiazol-5-yl]-2-(4-{[(6-methylpyridazin-3-yl)oxy]methyl}piperidin-1-yl)ethyl}-6-fluorobenzamide |
| 102 | 2-Chloro-N-{2-[4-(difluoromethyl)-1,3-thiazol-5-yl]-2-(4-{[(5-fluoropyridin-2-yl)oxy]methyl}piperidin-1-yl)ethyl}-6-fluorobenzamide |
| 103 | 2-Chloro-N-{2-[4-(difluoromethyl)-1,3-thiazol-5-yl]-2-(4-{[(6-fluoropyrimidin-4-yl)oxy]methyl}piperidin-1-yl)ethyl}-6-fluorobenzamide |
| 104 | 2-Chloro-N-{2-[4-(difluoromethyl)-1,3-thiazol-5-yl]-2-(4-{[(6-fluoropyridazin-3-yl)oxy]methyl}piperidin-1-yl)ethyl}-6-fluorobenzamide |
| 105 | 2-Chloro-N-{2-[4-(difluoromethyl)-1,3-thiazol-5-yl]-2-(4-{[(6-fluoropyrazin-2-yl)oxy]methyl}piperidin-1-yl)ethyl}-6-fluorobenzamide |
| 106 | 2-Chloro-N-{2-[4-(difluoromethyl)-1,3-thiazol-5-yl]-2-(4-{[(3-fluoropyrazin-2-yl)oxy]methyl}piperidin-1-yl)ethyl}-6-fluorobenzamide |
| 107 | 2-Chloro-N-{2-[4-(difluoromethyl)-1,3-thiazol-5-yl]-2-(4-{[(2-fluoropyrimidin-4-yl)oxy]methyl}piperidin-1-yl)ethyl}-6-fluorobenzamide |
| 108 | 2-Chloro-N-[2-(4-{[(3-cyanopyridin-2-yl)oxy]methyl}piperidin-1-yl)-2-[4-(difluoromethyl)-1,3-thiazol-5-yl]ethyl]-6-fluorobenzamide |
| 109 | 2-Chloro-N-[2-(4-{[(6-cyanopyridin-2-yl)oxy]methyl}piperidin-1-yl)-2-[4-(difluoromethyl)-1,3-thiazol-5-yl]ethyl]-6-fluorobenzamide |
| 110 | 2-Chloro-N-[2-(4-{[(2-cyanopyridin-4-yl)oxy]methyl}piperidin-1-yl)-2-[4-(difluoromethyl)-1,3-thiazol-5-yl]ethyl]-6-fluorobenzamide |
| 111 | 2-Chloro-N-[2-(4-{[(4-cyanopyridin-3-yl)oxy]methyl}piperidin-1-yl)-2-[4-(difluoromethyl)-1,3-thiazol-5-yl]ethyl]-6-fluorobenzamide |
| 112 | 2-Chloro-N-{2-[4-(difluoromethyl)-1,3-thiazol-5-yl]-2-(4-{[(6-fluoro-2-methylpyrimidin-4-yl)oxy]methyl}piperidin-1-yl)ethyl}-6-fluorobenzamide |
| 113 | 2-Chloro-N-{2-[4-(difluoromethyl)-1,3-thiazol-5-yl]-2-(4-{[(6-fluoro-5-methylpyrimidin-4-yl)oxy]methyl}piperidin-1-yl)ethyl}-6-fluorobenzamide |
| 114 | 2-Chloro-N-{2-[4-(difluoromethyl)-1,3-thiazol-5-yl]-2-[4-({[4-(trifluoromethyl)pyrimidin-2-yl]oxy}methyl)piperidin-1-yl]ethyl}-6-fluorobenzamide |
| 115 | 2-Chloro-N-{2-[4-(difluoromethyl)-1,3-thiazol-5-yl]-2-[4-({[6-(trifluoromethyl)pyrimidin-4-yl]oxy}methyl)piperidin-1-yl]ethyl}-6-fluorobenzamide |
| 116 | 2-Chloro-N-{2-[4-(difluoromethyl)-1,3-thiazol-5-yl]-2-[4-({pyrazolo[1,5-a]pyrazin-4-yloxy}methyl)piperidin-1-yl]ethyl}-6-fluorobenzamide |
| 117 | 2-Chloro-N-{2-[4-(difluoromethyl)-1,3-thiazol-5-yl]-2-[4-({pyrazolo[1,5-a]pyrimidin-5-yloxy}methyl)piperidin-1-yl]ethyl}-6-fluorobenzamide |
| 118 | 2-Chloro-N-{2-[4-(difluoromethyl)-1,3-thiazol-5-yl]-2-[4-({[1,2,4]triazolo[4,3-a]pyrazin-5-yloxy}methyl)piperidin-1-yl]ethyl}-6-fluorobenzamide |
| 119 | 2-Chloro-N-{2-[4-(difluoromethyl)-1,3-thiazol-5-yl]-2-[4-({[1,2,4]triazolo[4,3-a]pyrazin-8-yloxy}methyl)piperidin-1-yl]ethyl}-6-fluorobenzamide |
| 120 | 2-Chloro-N-[2-(4-{[(3-chloropyridin-2-yl)oxy]methyl}piperidin-1-yl)-2-[4-(difluoromethyl)-1,3-thiazol-5-yl]ethyl]-6-fluorobenzamide |
| 121 | 2-Chloro-N-{2-[4-(difluoromethyl)-1,3-thiazol-5-yl]-2-{4-[(1,6-naphthyridin-5-yloxy)methyl]piperidin-1-yl}ethyl}-6-fluorobenzamide |
| 122 | 2-Chloro-N-[2-(4-{[(3-cyanopyridin-4-yl)oxy]methyl}piperidin-1-yl)-2-[4-(difluoromethyl)-1,3-thiazol-5-yl]ethyl]-6-fluorobenzamide |
| 123 | 2-Chloro-N-{2-[4-(difluoromethyl)-1,3-thiazol-5-yl]-2-{4-[{{1-methyl-1H-pyrazolo[3,4-d]pyrimidin-4-yl}oxy)methyl]piperidin-1-yl}ethyl}-6-fluorobenzamide |
| 124 | 2-Chloro-N-{2-[4-(difluoromethyl)-1,3-thiazol-5-yl]-2-(4-{[(6-fluoropyridin-2-yl)oxy]methyl}piperidin-1-yl)ethyl}-6-fluorobenzamide |
| 125 | 2-Chloro-N-{2-[4-(difluoromethyl)-1,3-thiazol-5-yl]-2-(4-{[(2-fluoropyridin-4-yl)oxy]methyl}piperidin-1-yl)ethyl}-6-fluorobenzamide |
| 126 | 2-chloro-N-{2-[4-(difluoromethyl)-1,3-thiazol-5-yl]-2-(4-{[(4-fluoropyridin-2-yl)oxy]methyl}piperidin-1-yl)ethyl}-6-fluorobenzamide |
| 127 | 2-Chloro-N-(2-{4-[(2-cyanopyridin-4-yl)oxy]piperidin-1-yl}-2-[4-(difluoromethyl)-1,3-thiazol-5-yl]ethyl)-6-fluorobenzamide |

Compounds of formula (I) generally can be prepared by reacting a compound of formula (II):

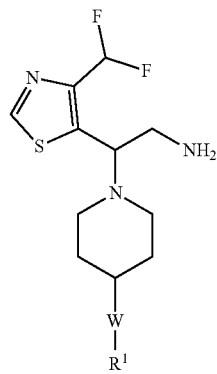

(II)

wherein the meanings of W and $R_1$ are as defined above, with a compound of formula (III)

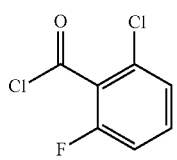

(III)

The reaction of a compound of formula (II) with a compound of formula (III), may be performed in a reaction-inert solvent such as, for example, acetonitrile, dimethyl acetamide, N-methyl-pyrrolidone or DMF, and optionally in the presence of a suitable base such as, for example, sodium carbonate, potassium carbonate or triethylamine. Stirring may enhance the rate of the reaction. The reaction may conveniently be carried out at a temperature ranging between room temperature and the reflux temperature of the reaction mixture.

Compounds of formula (III) are known in the art or can be prepared according to general procedures reported in literature.

Compounds of formula (II) can be prepared according to the following scheme:

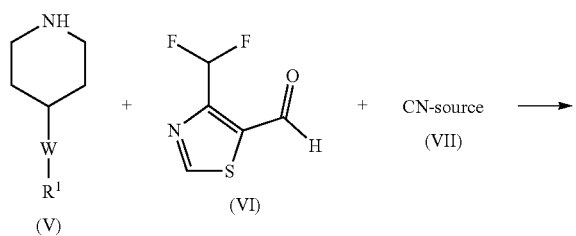

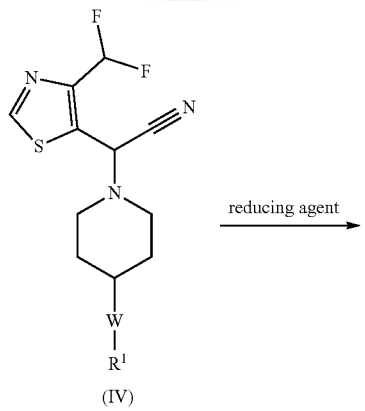

(IV)

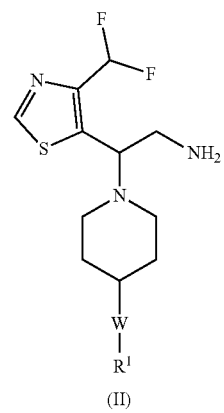

(II)

Primary amines (II) can be obtained by reduction of the respective nitrile derivatives (IV) in a nitrogen-hydrogen bond forming reaction. Non-limiting examples of such reaction include reduction with:

hydrogen or a hydrogen source in the presence of a metal such as nickel, platinum, palladium and cobalt or a derivative thereof such as Ni-Raney, platinum oxide, palladium oxide or Raney cobalt as catalyst;

a hydride such as lithium aluminum hydride, DIBAL, boron hydride or a functional derivative thereof.

The reaction may be performed in a suitable solvent, such as methanol, tetrahydrofuran, acetic acid, diethyl ether, toluene or methanolic ammonia solution preferably at temperatures between −78° C. and RT.

Compounds of formula (IV), wherein linker and $R^1$ are as defined in formula (I), can be prepared from aldehydes (VI) by a Strecker condensation reaction with the respective heterocyclyl intermediate (V) in presence of a source of cyanide (VII) for example TMSCN or a functional derivative thereof, in a solvent such as AcOH or MeCN, preferably at temperatures between 0° C. and RT. Stirring may enhance the rate of the Strecker condensation reaction.

The starting materials and some of the intermediates are known compounds and are commercially available or may be prepared according to conventional reaction procedures generally known in the art.

The heterocyclyl intermediate (V) are generally known in the art.

Compounds of formula (I) can be also prepared for reaction between compounds of formula (VIIIa) or formula (VIIIb) with suitable commercially available halide R1-X.

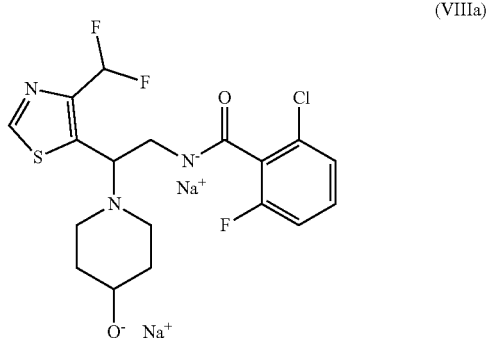

(VIIIa)

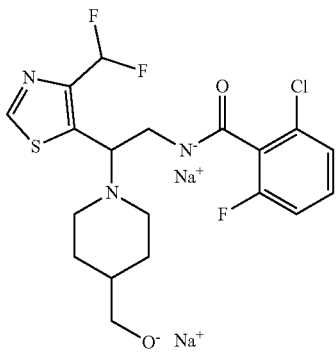

(VIIIb)

The reaction of a compound of formula (VIIIa or VIIIb) with halide, may be performed in a reaction-inert solvent such as THF, the reactions were carried out in oven-dried vial, using a stock solution of alkoxide VIII in inert solvent, such as THF, under Argon atmosphere; in these vial opportune halide was added at once by syringe as a solution in anhydrous THF. Stirring may enhance the rate of the reaction. The reaction may conveniently be carried out at room temperature.

Compounds of formula VIII can be prepared according to following scheme:

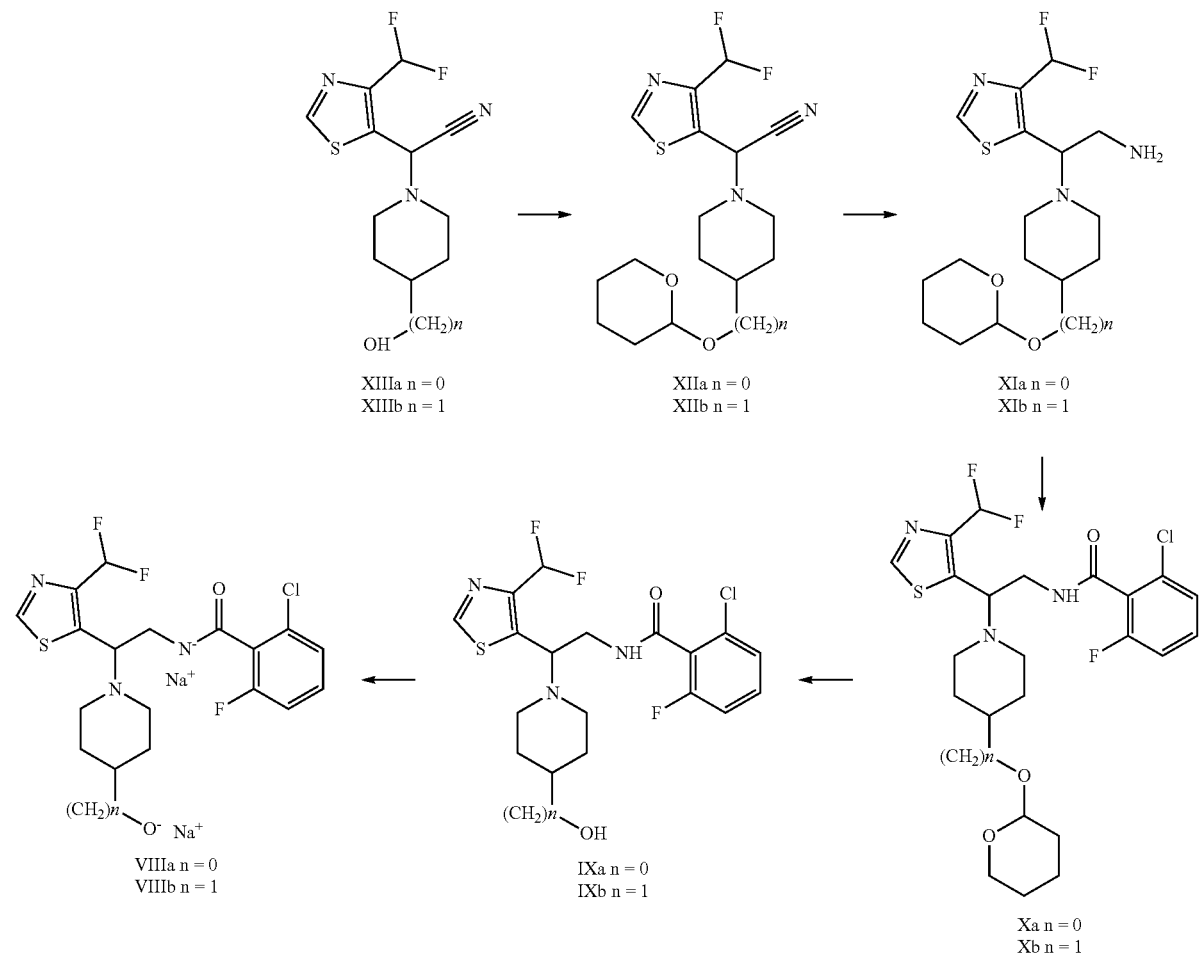

Compounds of formula (VIII) can be prepared starting from corresponding compounds of formula (IX) by reaction with NaH, the reactions were carried out in inert solvent such as THF under Argon atmosphere preferably at RT.

Compounds of formula (IX) can be prepared from corresponding compounds of formula (X) by hydrolysis reaction with HCl conc.in MeOH, in this way the protective group was removed from alcoholic function.

Compounds of formula (X), compounds of formula (XI) and compound of formula (XII) can be prepared following the processes reported in the examples.

The compounds of formula (I) as prepared in the hereinabove described processes may be synthesized in the form of racemic mixtures of enantiomers which can be separated from one another following art-known resolution procedures. Those compounds of formula (I) that are obtained in racemic form may be converted into the corresponding diastereomeric salt forms by reaction with a suitable chiral acid. Said diastereomeric salt forms are subsequently separated, for example, by selective or fractional crystallization and the enantiomers are liberated there from by alkali. An alternative manner of separating the enantiomeric forms of the compounds of formula (1) involves liquid chromatography using a chiral stationary phase. Said pure stereochemically isomeric forms may also be derived from the corresponding pure stereochemically isomeric forms of the appropriate starting materials, provided that the reaction occurs stereospecifically. Preferably if a specific stereoisomer is desired, said compound will be synthesized by stereospecific methods of preparation. These methods will advantageously employ enantiomerically pure starting materials.

The compounds of formula (I), the pharmaceutically acceptable salts and stereoisomeric forms thereof possess P2X7 receptor antagonizing properties as demonstrated in the Pharmacological Examples. Other examples of art-known group transformation reactions to convert compounds of formula (I) into other compounds of formula (I) are hydrolysis of carboxylic esters to the corresponding carboxylic acid or alcohol; hydrolysis of amides to the corresponding carboxylic acids or amines; alcohols may be converted into esters and ethers; primary amines may be converted into secondary or tertiary amines; double bonds may be hydrogenated to the corresponding single bond. The starting materials and some of the intermediates are known compounds and are commercially available or may be prepared according to conventional reaction procedures generally known in the art. The compounds of formula (I) as prepared in the hereinabove described processes may be synthesized in the form of racemic mixtures of enantiomers which can be separated from one another following art-known resolution procedures. Those compounds of formula (I) that are obtained in racemic form may be converted into the corresponding diastereomeric salt forms by reaction with a suitable chiral acid. Said diastereomeric salt forms are subsequently separated, for example, by selective or fractional crystallization and the enantiomers are liberated there from by alkali. An alternative manner of separating the enantiomeric forms of the compounds of formula (I) involves liquid chromatography using a chiral stationary phase. Said pure stereochemically isomeric forms may also be derived from the corresponding pure stereochemically isomeric forms of the appropriate starting materials, provided that the reaction occurs stereospecifically. Preferably if a specific stereoisomer is desired, said compound will be synthesized by stereospecific methods of preparation. These methods will advantageously employ enantiomerically pure starting materials. In the preparation of the compounds of formula I and the starting materials and/or intermediates described herein it may be useful to protect certain groups which are sensitive to the reaction conditions. The evaluation of the usefulness of the optional protection, as well as the selection of the suitable protecting agent, according to the reaction carried out in the preparation of the compounds of the invention and the functional group to be protected, are within the common knowledge of the skilled person. The removal of the optional protective groups is carried out according to conventional techniques. For a general reference to the use of protective groups in organic chemistry, see Theodora W. Greene and Peter G. M. Wuts "Protective groups in organic synthesis", John Wiley & Sons, Inc., II Ed., 1991.

The preparation of the salts of the compounds of formula I is carried out according to known methods. Therefore, the present compounds of formula (I) are useful as a medicine especially in the treatment of a condition or disease mediated by the P2X7 receptor, in particular P2X7 receptor antagonistic activity. Subsequently the present compounds may be used for the manufacture of a medicine for treatment of a condition or a disease mediated by P2X7 receptor activity, in particular P2X7 receptor antagonistic activity.

The present invention also provides the use of a compound of formula (I) or a pharmaceutically acceptable salt thereof for the manufacture of a medicament for the treatment of conditions or diseases selected from P2X7 receptor mediated conditions or diseases. In an embodiment, the present invention provides a compound of formula (I) for use as a medicine or for use in the treatment of conditions or diseases selected from P2X7 receptor mediated conditions or diseases. Further, the present invention also provides a method of treatment of a condition mediated by P2X7 receptor activity, in a mammalian subject, which method comprises administering to a mammal in need of such treatment a therapeutically effective amount of a compound of formula (I) or a pharmaceutically acceptable salt thereof. In view of the above described mechanisms of action, the compounds of the invention are useful for the treatment of neurodegenerative disorders of various origins such as Alzheimer's Disease and other dementia conditions such as Lewys body, fronto-temporal dementia and taupathies; amyotrophic lateral sclerosis, Multiple Sclerosis, Parkinson's Disease and other parkinsonian syndromes; HIV-induced neuroinflammation; essential tremors; other spino cerebellar degenerations and Charcot-Marie-Toot neuropathy. The compounds of the invention are also useful for the treatment of neurological conditions such as epilepsy including simple partial seizure, complex partial seizure, secondary generalized seizure, further including absence seizure, myoclonic seizure, clonic seizure, tonic seizure, tonic clonic seizure and atonic seizure.

The compounds of the invention are also useful for the treatment of cognitive disorders and of psychiatric disorders. Psychiatric disorders include, and are not limited to major depression, dysthymia, mania, bipolar disorder (such as bipolar disorder type I, bipolar disorder type II), cyclothymic disorder, rapid cycling, ultradian cycling, mania, hypomania, schizophrenia, schizophreniform disorders, schizoaffective disorders, personality disorders, attention disorders with or without hyperactive behaviour, delusional disorders, brief psychotic disorders, shared psychotic disorders, psychotic disorder due to a general medical condition, substance-induced psychotic disorders or a psychotic disorder not otherwise specified, anxiety disorders such as generalised anxiety disorder, panic disorders, post-traumatic stress disorder, impulse control disorders, phobic disorders, dissociative states and moreover in smoke, drug addiction and alcoholism. In particular bipolar disorders, psychosis, anxiety and addiction.

The compounds of the present invention are useful in the prevention or treatment of neuropathic pain. Neuropathic pain syndromes include, and are not limited to: diabetic neuropathy; sciatica; non-specific lower back pain; multiple sclerosis pain; fibromyalgia; HIV-related neuropathy; neuralgia, such as post-herpetic neuralgia and trigeminal neuralgia, Morton's neuralgia, causalgia; and pain resulting from physical trauma, amputation, phantom limb, cancer, toxins or chronic inflammatory conditions; central pain such as the one observed in thalamic syndromes, mixed central and peripheral forms of pain such as complex regional pain syndromes (CRPS) also called reflex sympathetic dystrophies.

The compounds of the invention are also useful for the treatment of chronic pain. Chronic pain includes, and is not limited to, chronic pain caused by inflammation or an inflammatory-related condition, ostheoarthritis, rheumatoid arthritis, acute injury or trauma, upper back pain or lower back pain (resulting from systematic, regional or primary spine disease such as radiculopathy), bone pain (due to osteoarthritis, osteoporosis, bone metastasis or unknown reasons), pelvic pain, spinal cord injury-associated pain, cardiac chest pain, non-cardiac chest pain, central poststroke pain, myofascial pain, sickle cell pain, cancer pain, Fabry's disease, AIDS pain, geriatric pain or pain caused by headache, temporomandibular joint syndrome, gout, fibrosis or thoracic outlet syndromes, in particular rheumatoid arthritis and osteoarthritis.

The compounds of the invention are also useful in the treatment of acute pain caused by acute injury, illness, sport-medicine injuries, carpal tunnel syndrome, burns, musculoskeletal sprains and strains, musculotendinous strain, cervicobrachial pain syndromes, dyspepsia, gastric ulcer, duodenal ulcer, dysmenorrhea, endometriosis or surgery (such as open heart or bypass surgery), post-operative pain, kidney stone pain, gallbladder pain, gallstone pain, obstetric pain or dental pain.

The compounds of the invention are also useful in the treatment of headaches such as migraine, tension type headache, transformed migraine or evolutive headache, cluster headache, as well as secondary headache disorders, such as the ones derived from infections, metabolic disorders or other systemic illnesses and other acute headaches, paroxysmal hemicrania and the like, resulting from a worsening of the above mentioned primary and secondary headaches.

Compounds of the invention are also useful in the treatment of diseases such as vertigo, tinnitus, muscle spasm, and other disorders including and not limited to cardiovascular diseases (such as cardiac arrhythmia, cardiac infarction or angina pectoris, hypertension, cardiac ischemia, cerebral ischemia) endocrine disorders (such as acromegaly or diabetes insipidus) diseases in which the pathophysiology of the disorder involves excessive or hypersecretory or otherwise inappropriate cellular secretion of an endogenous substance (such as catecholamine, a hormone or a growth factor).

The compounds of the invention are also useful in the selective treatment of liver disease, such as inflammatory liver diseases, for example chronic viral hepatitis B, chronic viral hepatitis C, alcoholic liver injury, primary biliary cirrhosis, autoimmune hepatitis, liver fibrosis, non-alcoholic steatohepatitis and liver transplant rejection.

The compounds of the invention inhibit inflammatory processes affecting all body systems. Therefore are useful in the treatment of inflammatory processes of the muscularskeletal system of which the following is a list of examples but it is not comprehensive of all target disorders: arthritic conditions such as ankylosing spondylitis, cervical arthritis, fibromyalgia, gout, juvenile rheumatoid arthritis, lumbosacral arthritis, osteoarthritis, osteoporosis, psoriatic arthritis, rheumatic disease; disorders affecting skin and related tissues: eczema, psoriasis, dermatitis and inflammatory conditions such as sunburn; disorders of the respiratory system: asthma, allergic rhinitis and respiratory distress syndrome, lung disorders in which inflammation is involved such as asthma and bronchitis; chronic obstructive pulmonary disease; disorders of the immune and endocrinological systems: periarthritis nodosa, thyroiditis, aplastic anaemia, scleroderma, myasthenia gravis, multiple sclerosis and other demyelinating disorders, encephalomyelitis, sarcoidosis, nephritic syndrome, Bechet's syndrome, polymyositis, gingivitis.

Compounds of the invention are also useful in the treatment of gastrointestinal (GI) tract disorders such as inflammatory bowel disorders including but not limited to ulcerative colitis, Crohn's disease, ileitis, proctitis, celiac disease, enteropathies, microscopic or collagenous colitis, eosinophilic gastroenteritis, or pouchitis resulting after proctocolectomy and post ileonatal anastomosis, and irritable bowel syndrome including any disorders associated with abdominal pain and/or abdominal discomfort such as pylorospasm, nervous indigestion, spastic colon, spastic colitis, spastic bowel, intestinal neurosis, functional colitis, mucous colitis, laxative colitis and functional dyspepsia; but also for treatment of atrophic gastritis, gastritis varioliforme, ulcerative colitis, peptic ulceration, pyrosis, and other damage to the GI tract, for example, by *Helicobacter pylori*, gastroesophageal reflux disease, gastroparesis, such as diabetic gastroparesis; and other functional bowel disorders, such as non-ulcerative dyspepsia (NUD); emesis, diarrhoea, and visceral inflammation.

Compounds of the invention are also useful in the treatment of disorders of the genito-urinary tract such as overactive bladder, prostatitis (chronic bacterial and chronic non-bacterial prostatitis), prostadynia, interstitial cystitis, urinary incontinence and benign prostatic hyperplasia, annexities, pelvic inflammation, bartholinities and vaginitis. In particular, overactive bladder and urinary incontinence.

The compounds of the invention are also useful in the treatment of ophthalmic diseases such as retinitis, retinopathies, uveitis and acute injury to the eye tissue, age-related macular degeneration or glaucoma, conjunctivitis.

The compounds of the invention are also useful in the treatment of eating disorders such as anorexia nervosa including the subtypes restricting type and binge-eating/purging type; bulimia nervosa including the subtypes purging type and non-purging type; obesity; compulsive eating disorders; binge eating disorder; and eating disorder not otherwise specified.

The compounds of the invention are also useful in the treatment of allergic dermatitis, hyper-responsiveness of the airway, chronic obstructive pulmonary disease (COPD), bronchitis, septic shock, Sjögren's syndrome, glomerulonephritis, atherosclerosis, growth and metastases of malignant cells, myoblastic leukaemia, diabetes, meningitis, osteoporosis, burn injury, ischaemic heart disease, stroke, peripheral vascular disease, varicose veins, glaucoma.

The term "treating" and "treatment', as used herein, refers to curative, palliative and prophylactic treatment, including reversing, alleviating, inhibiting the progress of, or preventing the disease, disorder or condition to which such term applies, or one or more symptoms of such disease, disorder or condition.

Additionally the present invention provides pharmaceutical compositions comprising at least one pharmaceutically acceptable carrier and a therapeutically effective amount of a compound of formula (I).

In order to prepare the pharmaceutical compositions of this invention, an effective amount of the particular compound, in base or acid addition salt form, as the active ingredient is combined in intimate admixture with at least one pharmaceutically acceptable carrier, which carrier may take a wide variety of forms depending on the form of preparation desired for administration. These pharmaceutical compositions are desirably in unitary dosage form suitable, preferably, for oral administration, rectal administration, percutaneous administration or parenteral injection.

For example in preparing the compositions in oral dosage form, any of the usual liquid pharmaceutical carriers may be employed, such as for instance water, glycols, oils, alcohols and the like in the case of oral liquid preparations such as suspensions, syrups, elixirs and solutions; or solid pharmaceutical carriers such as starches, sugars, kaolin, lubricants, binders, disintegrating agents and the like in the case of powders, pills, capsules and tablets. Because of their easy administration, tablets and capsules represent the most advantageous oral dosage unit form, in which case solid pharmaceutical carriers are obviously employed. For parenteral injection compositions, the pharmaceutical carrier will mainly comprise sterile water, although other ingredients may be included in order to improve solubility of the active ingredient.

Injectable solutions may be prepared for instance by using a pharmaceutical carrier comprising a saline solution, a glucose solution or a mixture of both. Injectable suspensions may also be prepared by using appropriate liquid carriers, suspending agents and the like. In compositions suitable for percutaneous administration, the pharmaceutical carrier may optionally comprise a penetration enhancing agent and/or a suitable wetting agent, optionally combined with minor proportions of suitable additives which do not cause a significant deleterious effect to the skin. Said additives may be selected in order to facilitate administration of the active ingredient to the skin and/or be helpful for preparing the desired compositions. These topical compositions may be administered in various ways, e.g., as a transdermal patch, a spot-on or an ointment. Addition salts of the compounds of formula (1), due to their increased water solubility over the corresponding base form, are obviously more suitable in the preparation of aqueous compositions.

It is especially advantageous to formulate the pharmaceutical compositions of the invention in dosage unit form for ease of administration and uniformity of dosage.

"Dosage unit form" as used herein refers to physically discrete units suitable as unitary dosages, each unit containing a predetermined amount of active ingredient calculated to produce the desired therapeutic effect in association with the required pharmaceutical carrier. Examples of such dosage unit forms are tablets (including scored or coated tablets), capsules, pills, powder packets, wafers, injectable solutions or suspensions, teaspoonfuls, tablespoonfuls and the like, and segregated multiples thereof.

For oral administration, the pharmaceutical compositions of the present invention may take the form of solid dose forms, for example, tablets (both swallowable and chewable forms), capsules or gelcaps, prepared by conventional means with pharmaceutically acceptable excipients and carriers such as binding agents (e.g. pregelatinised maize starch, polyvinylpyrrolidone, hydroxypropylmethylcellulose and the like), fillers (e.g. lactose, microcrystalline cellulose, calcium phosphate and the like), lubricants (e.g. magnesium stearate, talc, silica and the like), disintegrating agents (e.g. potato starch, sodium starch glycollate and the like), wetting agents (e.g. sodium lauryl sulphate) and the like. Such tablets may also be coated by methods well known in the art.

Liquid preparations for oral administration may take the form of e.g. solutions, syrups or suspensions, or they may be formulated as a dry product for admixture with water and/or another suitable liquid carrier before use. Such liquid preparations may be prepared by conventional means, optionally with other pharmaceutically acceptable additives such as suspending agents (e.g. sorbitol syrup, methylcellulose, hydroxypropylmethylcellulose or hydrogenated edible fats), emulsifying agents (e.g. lecithin or acacia), non-aqueous carriers (e.g. almond oil, oily esters or ethyl alcohol), sweeteners, flavours, masking agents and preservatives (e.g. methyl or propyl p-hydroxybenzoates or sorbic acid).

Pharmaceutically acceptable sweeteners useful in the pharmaceutical compositions of the invention comprise preferably at least one intense sweetener such as aspartame, acesulfame potassium, sodium cyclamate, alitame, a dihydrochalcone sweetener, monellin, stevioside sucralose (4,1', 6'-trichloro-4,1',6'-trideoxygalactosucrose) or, preferably, saccharin, sodium or calcium saccharin, and optionally at least one bulk sweetener such as sorbitol, mannitol, fructose, sucrose, maltose, isomalt, glucose, hydrogenated glucose syrup, xylitol, caramel or honey. Intense sweeteners are conveniently used in low concentrations. For example, in the case of sodium saccharin, the said concentration may range from about 0.04% to 0.1% (weight/volume) of the final formulation. The bulk sweetener can effectively be used in larger concentrations ranging from about 10% to about 35%, preferably from about 10% to 15% (weight/volume). The pharmaceutically acceptable flavours which can mask the bitter tasting ingredients in the low-dosage formulations comprise preferably fruit flavours such as cherry, raspberry, black currant or strawberry flavour. A combination of two flavours may yield very good results. In the high-dosage formulations, stronger pharmaceutically acceptable flavours may be required such as Caramel Chocolate, Mint Cool, Fantasy and the like.

Each flavour may be present in the final composition in a concentration ranging from about 0.05% to 1% (weight/volume). Combinations of said strong flavours are advantageously used. Preferably a flavour is used that does not undergo any change or loss of taste and/or color under the circumstances of the formulation.

The compounds of formula (I) may be formulated for parenteral administration by injection, conveniently intravenous, intra-muscular or subcutaneous injection, for example by bolus injection or continuous intravenous infusion. Formulations for injection may be presented in unit dosage form, e.g. in ampoules or multi-dose containers, including an added preservative. They may take such forms as suspensions, solutions or emulsions in oily or aqueous vehicles, and may contain formulating agents such as isotonizing, suspending, stabilizing and/or dispersing agents. Alternatively, the active ingredient may be present in powder form for mixing with a suitable vehicle, e.g. sterile pyrogen-free water, before use.

The compounds of formula (I) may also be formulated in rectal compositions such as suppositories or retention enemas, e.g. containing conventional suppository bases such as cocoa butter and/or other glycerides.

Those of skill in the treatment of diseases linked to the mediation of the ligand-gated ion channels will easily determine the therapeutically effective amount of a compound of formula (I) from the test results presented hereinafter. In general it is contemplated that a therapeutically effective dose will be from about 0.001 mg/kg to about 50 mg/kg of body weight, more preferably from about 0.01 mg/kg to about 10 mg/kg of body weight of the patient to be treated. It may be appropriate to administer the therapeutically effective dose in the form of two or more sub-doses at appropriate intervals throughout the day. Said sub-doses may be formulated as unit dosage forms, for example each containing from about 0.1 mg to about 1000 mg, more particularly from about 1 to about 500 mg, of the active ingredient per unit dosage form.

As used herein, a "therapeutically effective amount" of a compound, is the quantity of a compound which, when administered to an individual or animal, results in a sufficiently high level of that compound in the individual or animal to cause a discernible P2X7 receptor antagonistic response.

The exact dosage and frequency of administration depends on the particular compound of formula (I) used, the particular condition being treated, the severity of the condition being treated, the age, weight and general physical condition of the particular patient as well as the other medication, the patient may be taking, as is well known to those skilled in the art. Furthermore, said "therapeutically effective amount" may be lowered or increased depending on the response of the treated patient and/or depending on the evaluation of the physician prescribing the compounds of the instant invention. The effective daily amount ranges mentioned hereinabove are therefore only guidelines.

Nomenclature and Structures

In general, the nomenclature used in this Application is based on ChemSketch™ (ACDLabs) and generated according to the IUPAC systematic nomenclature. Chemical structures shown herein were prepared using ChemDraw® version 19.1. Any open valency appearing on a carbon, oxygen, sulfur, or nitrogen atom in the structures herein indicates the presence of a hydrogen atom unless indicated otherwise. Where a nitrogen-containing heteroaryl ring is shown with an open valency on a nitrogen atom and variables such as $R^1$, $R^2$, $R^3$ etc. are shown on the heteroaryl ring, such variables may be bound or joined to the open valency nitrogen. Where a chiral center exists in a structure, but no specific stereochemistry is shown for the chiral center, both enantiomers associated with the chiral center are encompassed by the structure. Where a structure shown herein may exist in multiple tautomeric forms, all such tautomers are encompassed by the structure. The atoms represented in the structure herein are intended to encompass all naturally occurring isotopes of such atoms. Thus, for example, the hydrogen atoms represented herein are meant to include deuterium and tritium, and the carbon atoms are meant to include $^{13}C$ and $^{14}C$ isotopes.

ABBREVIATIONS

Abbreviations which may be used in the description of the Schemes and the Examples that follows are:
AcOH: Acetic acid;
Anh: Anhydrous;
AcONa: Sodium acetate;
DCM: Dichloromethane;
DHP: Dihydropyran
DIBAL: Diisobutylaluminium hydride;
DMF: Dimethylformamide;
DMSO: Dimethylsulfoxide;
EtOAc: Ethyl acetate;
ESI: Electrospray ionization;
HCl: hydrochloric acid;
h: hour;
Hrs: hours;
$KHCO_3$: potassium hydrogen carbonate;
M: Molar;
MeCN: Acetonitrile;
MeOH: Methanol;
$MgSO_4$: Magnesium sulfate;
Min: Minute(s);
NaH: Sodium hydride;
$NaHCO_3$: Sodium hydrogen carbonate;
$Na_2SO_3$: Sodium sulfite;
Ni-Raney: Nickel-Raney;
NMR: Nuclear Magnetic Resonance;
ON: overnight;
PPTS: Pyridinium p-toluenesulfonate;
RT: Room Temperature;
TFA Trifluoroacetic acid;
THF: Tetrahydrofuran;
TLC: Thin Layer Chromatography;
TMSCN Trimethylsilylcyanide;
UPLC-MS: UltraPerformance LiquidChromatography-Mass Spectrometry;
Y: yield.

EXPERIMENTAL PART

The following examples illustrate the present invention. Unless explicitly stated otherwise, all particulars (especially percentages and amounts) relate to the weight.

A Synthesis of the Intermediates

Preparation of Nitrile Derivatives (IV) (Typical Procedure)

Opportune commercially available amines (1.0 eq) and anhydrous NaOAc (3.8 eq) were stirred in glacial acetic acid (1.3 mL, 0.9 M) for 2 h at RT. Separately, the solution of 4-(difluoromethyl)thiazole-5-carbaldehyde CAS: 1803203-56-6 (1 eq) in glacial acetic acid (1.5 mL, 0.4 M) was cooled down to 13° C. followed by dropwise addition of TMSCN (12 eq) and kept for additional for 30 min before mixing with the abovementioned solution of the corresponding amine in AcOH. The resulting reaction mixture was stirred at RT overnight. The volatiles were removed in vacuo. The oily residue was dissolved in DCM (20 mL), washed with sat. $NaHCO_3$ solution (3×5 mL), 10% $Na_2SO_3$ solution (5 mL), water and brine. The organic phase was dried over $MgSO_4$ and evaporated in vacuo to give crude nitrile derivatives which was used in the next step without further purification. (y=36-71%)

Using this procedure:
intermediate 1a (y=55%) was prepared using 4-[(3,5-dimethyl-1,2-oxazol-4-yl)methoxy]piperidine hydrochloride (CAS: 1097797-73-3);
intermediate 1b (y=67%) was prepared using 42-(piperidin-4-yloxy)pyridine hydrochloride (CAS 313490-36-7);
intermediate 1c (y=64%) was prepared using 3-(piperidin-4-yloxy)pyridine (CAS: 310881-48-2);
intermediate 1d (y=55%) was prepared using 4-(piperidin-4-yloxy)pyridine (CAS: 224178-65-8);
intermediate 1e (y=56%) was prepared using 2-(piperidin-4-yloxy)pyrimidine (CAS: 499240-48-1);

intermediate 1f (y=71%) was prepared using 3-fluoro-5-(piperidin-4-yloxy)pyridine (CAS: 1189578-46-8);

intermediate 1g (y=48%) was prepared using 3-fluoro-4-(piperidin-4-yloxy)pyridine hydrochloride (CAS: 2013099-11-9);

intermediate 1h (y=58%) was prepared using 3-fluoro-2-(piperidin-4-yloxy)pyridine (CAS: 1189578-05-9);

intermediate 1i (y=49%) was prepared using 4-[(5-methyl-1,2-oxazol-3-yl)methoxy]piperidine hydrochloride (CAS: 883537-12-0);

intermediate 1j (y=66%) was prepared using 4-hydroxypiperidine (CAS: 5382-16-1);

intermediate 1k (y=60%) was prepared using 4-hydroxymethylpiperidine (CAS: 6457-49-4);

| Intermediate | Structure |
|---|---|
| 1a | |
| 1b | 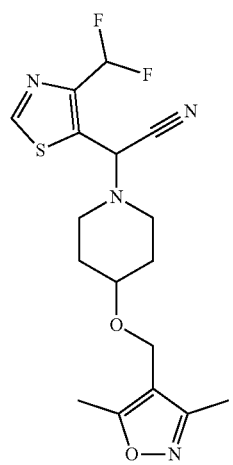 [SMILES: Cc1noc(C)c1COC1CCN(C(C#N)c2scnc2C(F)F)CC1] |
| 1c | 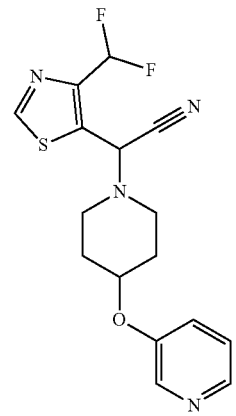 [SMILES: N#CC(c1scnc1C(F)F)N1CCC(Oc2cccnc2)CC1] |
| 1d | 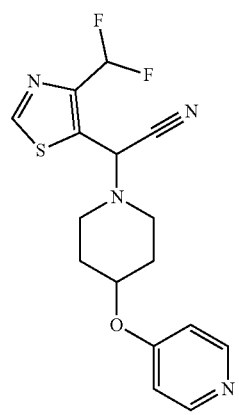 [SMILES: N#CC(c1scnc1C(F)F)N1CCC(Oc2ccncc2)CC1] |
| 1e | 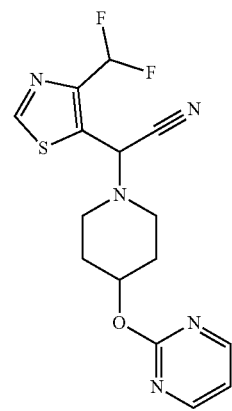 [SMILES: N#CC(c1scnc1C(F)F)N1CCC(Oc2ncccn2)CC1] |

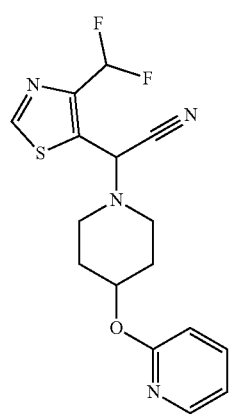

| Intermediate | Structure |
|---|---|
| 1f | |
| 1g | |
| 1h | 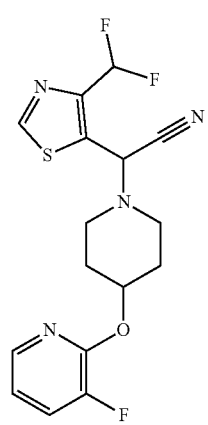 [SMILES: N#CC(c1scnc1C(F)F)N1CCC(Oc2ncccc2F)CC1] |

| Intermediate | Structure |
|---|---|
| 1i | |
| 1j | |
| 1k | |

Preparation of Oxan-2-Yloxy Nitrile Derivatives (XII) (Typical Procedure)

4-hydroxy/acetonitrile derivative (1.0 eq) was dissolved in anhydrous DCM (180 mL, 0.1 M). DHP (5.0 eq.) followed by PPTS (0.02 eq.) were added and the reaction mixture was stirred at RT ON and then quenched with sat. aq. NaHCO$_3$ (50 mL). The phases were separated, and the organic phase was washed with brine, dried over MgSO$_4$ and concentrated in vacuo to give a crude product which was used without further purification.

Using this procedure:
intermediate 2a (y=61%) was prepared starting from intermediate 1j;
intermediate 2b (y=67%) was prepared starting from intermediate 1k;

| Intermediate | Structure |
|---|---|
| 2a | 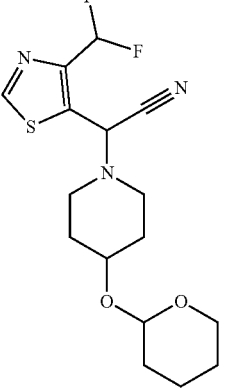 |
| 2b | 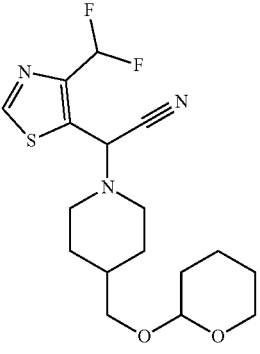 [SMILES: N#CC(c1scnc1C(F)F)N1CCC(COC2CCCCO2)CC1] |

Preparation of Amines Derivatives (II) (Typical Procedure)

The suitable nitrile intermediate 1 (1.0 eq), was dissolved in anhydrous DCM (2-3 mL) under inert atmosphere. The solution was cooled down to −65° C. and 1 M solution of DIBAL in DCM (3.5 eq.) was added dropwise. The reaction mixture was stirred at −65° C. for 1 h. Then it was warmed up to −40° C. and quenched with 10% Rochelle's salt. The biphasic mixture was stirred at RT for 30 min. The phases were separated, and the water phase was extracted with DCM (3×10 mL). The combined organic phases were dried over MgSO$_4$ and concentrated in vacuo. The crude was purified by column chromatography to give title compound. (y=31-63%).

Using this procedure:
intermediate 3a (y=51%) was prepared starting to intermediate 1a;
intermediate 3b (y=38%) was prepared starting to intermediate 1b;
intermediate 3c (y=49%) was prepared starting to intermediate 1c;
intermediate 3d (y=46%) was prepared starting to intermediate 1d;
intermediate 3e (y=41%) was prepared starting to intermediate 1e;
intermediate 3f (y=54%) was prepared starting to intermediate 1f;
intermediate 3g (y=31%) was prepared starting to intermediate 1g;
intermediate 3h (y=63%) was prepared starting to intermediate 1h;
intermediate 3i (y=39%) was prepared starting to intermediate 1i;
intermediate 3j (y=62%) was prepared starting to intermediate 2a;
intermediate 3k (y=59%) was prepared starting to intermediate 2b;

| Intermediate | Structure |
|---|---|
| 3a | 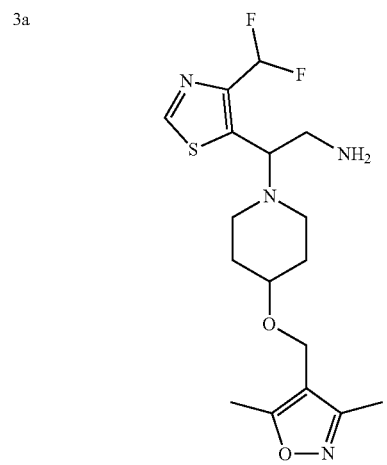 |
| 3b | 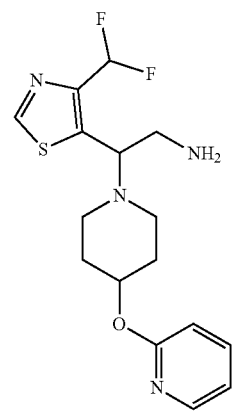 [SMILES: NCC(c1scnc1C(F)F)N1CCC(Oc2ccccn2)CC1] |
| 3c | 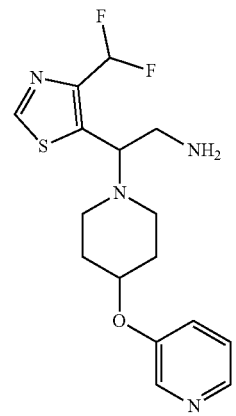 [SMILES: NCC(c1scnc1C(F)F)N1CCC(Oc2cccnc2)CC1] |

| Intermediate | Structure |
|---|---|
| 3d | 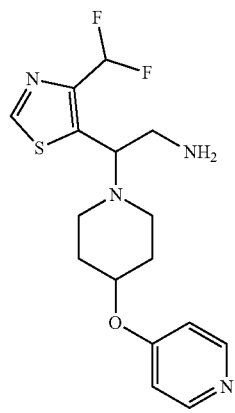 [SMILES: NCC(c1scnc1C(F)F)N1CCC(Oc2ccncc2)CC1] |
| 3e | 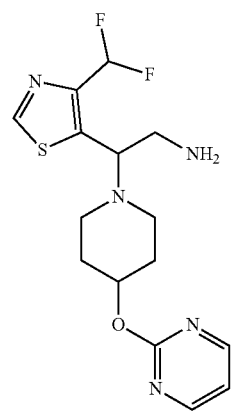 [SMILES: NCC(c1scnc1C(F)F)N1CCC(Oc2ncccn2)CC1] |
| 3f | 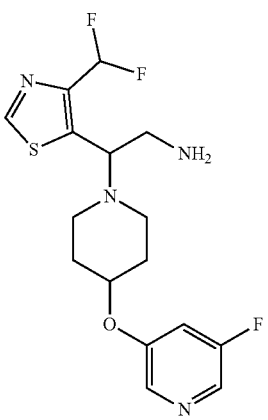 [SMILES: NCC(c1scnc1C(F)F)N1CCC(Oc2cncc(F)c2)CC1] |
| Intermediate | Structure |
|---|---|
| 3g | 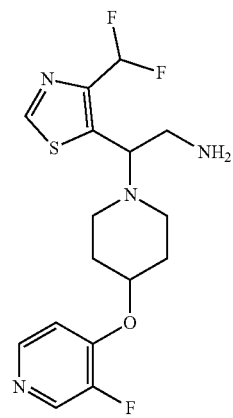 [SMILES: NCC(c1scnc1C(F)F)N1CCC(Oc2ccncc2F)CC1] |
| 3h | 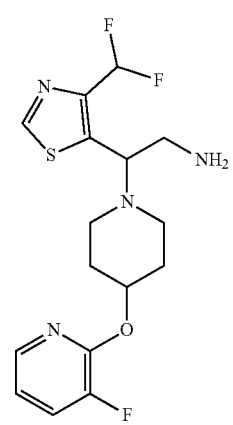 [SMILES: NCC(c1scnc1C(F)F)N1CCC(Oc2ncccc2F)CC1] |
| 3i | 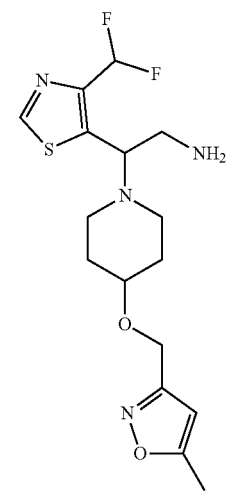 [SMILES: Cc1cc(COC2CCN(C(CN)c3scnc3C(F)F)CC2)no1] |

| Intermediate | Structure |
|---|---|
| 3j | 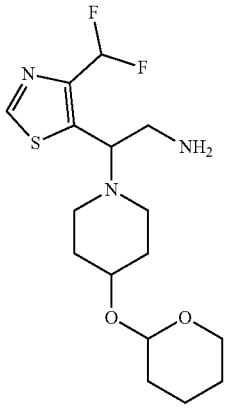 [SMILES: NCC(c1scnc1C(F)F)N1CCC(OC2CCCCO2)CC1] |
| 3k | 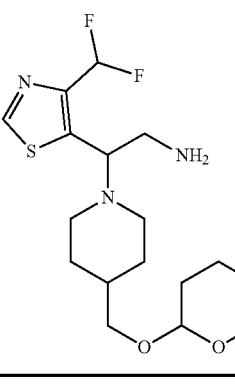 |

| Intermediate | Structure |
|---|---|
| 4a | 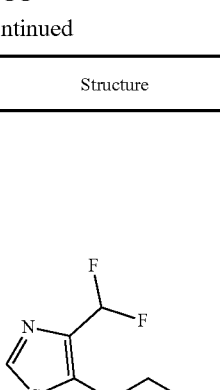 |
| 4b | 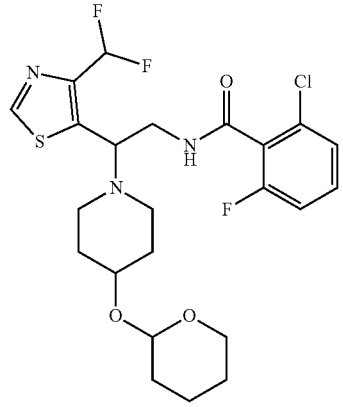 [SMILES: O=C(NCC(c1scnc1C(F)F)N1CCC(OC2CCCCO2)CC1)c1c(F)cccc1Cl] |

Preparation of Oxan-2-Yloxy Benzamide Derivatives (X) (Typical Procedure)

The suitable amine (1.0 eq) was dissolved in anhydrous MeCN (5 mL) under inert atmosphere. The solution was cooled to −15° C. and KHCO$_3$ (2 eq.) followed by neat 2-chloro-6-fluorobenzoyl chloride (CAS: 79455-63-3; 1.15 eq) were added. The reaction mixture was allowed to warm up to RT ON. Then the volatiles were removed in vacuo, the solid residue was dissolved in DCM and the insoluble materials were filtered off. The filtrate was concentrated in vacuo to give the crude product which was used further without additional purification.

Using this procedure:

intermediate 4a was prepared starting to intermediate 3j;

intermediate 4b was prepared starting to intermediate 3k;

Preparation of Hydroxy Benzamide Derivatives (IX) (Typical Procedure)

Crude intermediate 4, oxan-2-yloxy benzamide derivatives, (1.0 eq) was dissolved in MeOH (22 mL, 0.6 M) and cooled down to 10° C. Conc. aq. HCl (7 mL) was added and the reaction mixture was stirred at r.t. for 30 min. The volatiles were removed in vacuo affording the wet residue which was dissolved in sat. aq. NaHCO$_3$ and extracted with EtOAc. The combined organic phases were washed with water and brine, dried over MgSO$_4$ and concentrated. The crude product was purified by column chromatography (hexanes/EtOAc 1/1 followed by pure EtOAc) to give the title compound. (y=88-96%) Using this procedure:

intermediate 5a (y=96%) was prepared starting to intermediate 4a;

intermediate 5b (y=88%) was prepared starting to intermediate 4b;

| Intermediate | Structure |
|---|---|
| 5a | (thiazole-CHF2 / piperidine-4-OH / 2-chloro-6-fluorobenzamide structure) |
| 5b | (thiazole-CHF2 / piperidine-4-CH2OH / 2-chloro-6-fluorobenzamide structure) |

Preparation of Disodium Alkoxide Derivatives (VIII) (Typical Procedure)

The suitable intermediate 5, hydroxy benzamide derivatives, (1.0 eq) was dissolved in anh. THF (0.046 M) under Argon atmosphere. NaH (60% dispersion in mineral oil, 2.1 eq) was added in few portions at RT and the reaction mixture was allowed to stir for additional 2-12 h (ON preferably) to give pale yellow solution of disodium salt which was used further. The prepared solution of known concentration was stored in the sealed vial at RT and did not show any evidence of degradation by $^1$H-NMR and UPLC within 1 month. Keeping in the fridge caused partial precipitation of disodium salt which dissolves back while sonicating at RT.

Using this procedure:
intermediate 6a was prepared starting to intermediate 5a;
intermediate 6b was prepared starting to intermediate 5b;

| Intermediate | Structure |
|---|---|
| 6a | (disodium alkoxide derivative of 5a) |
| 6b | (disodium alkoxide derivative of 5b) |

General Procedures for the Synthesis of Final Compounds

Method A

Preparation of Examples 1-9

Solid KHCO$_3$ (2.0 eq) was added at once to the stirred solution of a suitable amine, intermediate 3, (1.0 eq) in anhydrous MeCN (6 mL, 0.05 M) at −10° C. Neat 2-chloro-6-fluorobenzoyl chloride CAS: 79455-63-3 (1.15 eq) was added to the reaction mixture. After stirring for additional 30 min at −10° C. the volatiles were evaporated. The residue was triturated with DCM (10 mL), filtered and concentrated to give crude residue which was purified by column chromatography (SiO$_2$; Hexane/EtOAc 2:1) to give the title compound. (y=32-98%).

Using this procedure compounds:
Example 1 (y=67%) was prepared starting from intermediate 3b;
Example 2 (y=50%) was prepared starting from intermediate 3c;
Example 3 (y=54%) was prepared starting from intermediate 3d;
Example 4 (y=85%) was prepared starting from intermediate 3e;
Example 5 (y=72%) was prepared starting from intermediate 3f;
Example 6 (y=98%) was prepared starting from intermediate 3g;
Example 7 (y=32%) was prepared starting from intermediate 3h;
Example 8 (y=43%) was prepared starting from intermediate 3i;
Example 9 (y=68%) was prepared starting from intermediate 3a.

Method B

Preparation of Examples 10-127

The oven-dried vial (7 mL, screw cap with septa) was charged with a stock solution of the suitable alkoxide intermediate 6, prepared as described above (1.0 eq), under Argon atmosphere. The suitable commercially available halide (1.0 eq) was added at once by syringe as a solution in anhydrous THF (1 mL). The reaction mixture was kept at rt and monitored by $^1$H-NMR and UPLC. Once the acceptable conversion level was achieved (preferably >50%), the reaction mixture was quenched by addition of the stock solution of diglycolic anhydride (~0.25 M, 1 mL, 1.1 eq), shaked and kept at r.t. for additional 2-12 h (ON preferably). After evaporation of volatiles in vacuo, the residue was partitioned between EtOAc (5 mL) and water (2 mL). The organic phase was washed with water (2 mL), dried over MgSO$_4$ and concentrated in vacuo to give crude residue which was purified by column chromatography (SiO$_2$; Hex/EA 1:2) to give title compound. (y=7-71%)

Using this procedure compounds:

Example 10 (y=60%) was prepared starting from intermediate 6a and 2-fluoro-1,3-thiazole (CAS 27225-14-5);

Example 11 (y=54%) was prepared starting from intermediate 6a and 5-chloro-3-methyl-1,2,4-thiadiazole (CAS 21734-85-0);

Example 12 (y=35%) was prepared starting from intermediate 6a and 2,4-dichlorothiazole (CAS 4175-76-2);

Example 13 (y=46%) was prepared starting from intermediate 6a and 5-chloro-3-cyclopropyl-1,2,4-thiadiazole (CAS 122684-54-2);

Example 14 (y=12%) was prepared starting from intermediate 6a and 2-fluoro-6-methylpyridine (CAS 407-22-7);

Example 15 (y=18%) was prepared starting from intermediate 6a and 2-fluoro-4-methylpyridine (CAS 461-87-0);

Example 16 (y=19%) was prepared starting from intermediate 6a and 5-fluoropyridine-3-carbonitrile (CAS 696-42-4);

Example 17 (y=26%) was prepared starting from intermediate 6a and 3-chloropyrazine-2-carbonitrile (CAS 55557-52-3);

Example 18 (y=60%) was prepared starting from intermediate 6a and 2-cyano-3-fluoropyridine (CAS 97509-75-6);

Example 19 (y=11%) was prepared starting from intermediate 6a and 2-chloro-3-fluoropyridine (CAS 17282-04-1);

Example 20 (y=43%) was prepared starting from intermediate 6a and 2-fluoro-1,3-benzothiazole (CAS 1123-98-4);

Example 21 (y=12%) was prepared starting from intermediate 6a and 3-chloro-1,2-benzoxazole (CAS 16263-52-8);

Example 22 (y=16%) was prepared starting from intermediate 6a and 2-chloro-1,3-benzoxazole (CAS 615-18-9);

Example 23 (y=42%) was prepared starting from intermediate 6a and 5-chloro-3-(2-methoxyethyl)-1,2,4-thiadiazole (CAS 89180-91-6);

Example 24 (y=11%) was prepared starting from intermediate 6a and 5-chloro-3-phenyl-1,2,4-oxadiazole (CAS 827-44-1);

Example 25 (y=54%) was prepared starting from intermediate 6a and 5-chloro-1-phenyl-1H-tetrazole (CAS 14210-25-4);

Example 26 (y=58%) was prepared starting from intermediate 6a and 2-chloro-4-fluoro-1-methyl-1H-1,3-benzodiazole (CAS 1283719-98-1);

Example 27 (y=28%) was prepared starting from intermediate 6a and 2-fluoro-3-methylpyridine (CAS 2369-18-8);

Example 28 (y=35%) was prepared starting from intermediate 6a and 2-fluoro-5-methylpyrimidine (CAS 62802-36-2);

Example 29 (y=47%) was prepared starting from intermediate 6a and 3-fluoro-6-methylpyridazine (CAS 65202-56-4);

Example 30 (y=36%) was prepared starting from intermediate 6a and 2,5-difluoropyridine (CAS 84476-99-3);

Example 31 (y=28%) was prepared starting from intermediate 6a and 4,6-difluoropyrimidine (CAS 2802-62-2);

Example 32 (y=54%) was prepared starting from intermediate 6a and 3,6-difluoropyridazine (CAS 33097-39-1);

Example 33 (y=42%) was prepared starting from intermediate 6a and 2,6-difluoropyrazine (CAS 33873-09-5);

Example 34 (y=57%) was prepared starting from intermediate 6a and 2,3-difluoropyrazine (CAS 52751-15-2);

Example 35 (y=22%) was prepared starting from intermediate 6a and 2,4-difluoropyrimidine (CAS 2802-61-1);

Example 36 (y=67%) was prepared starting from intermediate 6a and 2-fluoropyridine-3-carbonitrile (CAS 3939-13-7);

Example 37 (y=65%) was prepared starting from intermediate 6a and 2-cyano-6-fluoropyridine (CAS 3939-15-9);

Example 38 (y=59%) was prepared starting from intermediate 6a and 3-fluoropyridine-4-carbonitrile (CAS 113770-88-0);

Example 39 (y=51%) was prepared starting from intermediate 6a and 4,6-difluoro-2-methylpyrimidine (CAS 18382-80-4);

Example 40 (y=71%) was prepared starting from intermediate 6a and 4,6-difluoro-5-methylpyrimidine (CAS 18260-64-5);

Example 41 (y=19%) was prepared starting from intermediate 6a and 2-fluoro-6-(cyclopropyl)pyridine (CAS 1563529-53-2);

Example 42 (y=29%) was prepared starting from intermediate 6a and 2-chloro-4-(trifluoromethyl)pyrimidine (CAS 33034-67-2);

Example 43 (y=59%) was prepared starting from intermediate 6a and 4-chloro-6-(trifluoromethyl)pyrimidine (CAS 37552-81-1);

Example 44 (y=47%) was prepared starting from intermediate 6a and 4-chloropyrazolo[1,5-a]pyrazine (CAS 1260665-84-6);

Example 45 (y=16%) was prepared starting from intermediate 6a and 5-chloro-[1,2,4]triazolo[4,3-a]pyrazine (CAS 63744-34-3);

Example 46 (y=24%) was prepared starting from intermediate 6a and 8-chloro-[1,2,4]triazolo[4,3-a]pyrazine (CAS 68774-77-6);

Example 47 (y=33%) was prepared starting from intermediate 6a and 3-chloro-2-fluoropyridine (CAS 1480-64-4);

Example 48 (y=15%) was prepared starting from intermediate 6a and 4-chloro-1,5-naphthyridine (CAS 7689-63-6);

Example 49 (y=58%) was prepared starting from intermediate 6a and 5-chloro-1,6-naphthyridine (CAS 23616-32-2);

Example 50 (y=29%) was prepared starting from intermediate 6a and 4-chloropyridine-3-carbonitrile (CAS 89284-61-7);

Example 51 (y=42%) was prepared starting from intermediate 6a and 4-chloro-1-methyl-1H-pyrazolo[3,4-d]pyrimidine (CAS 23000-43-3);

Example 52 (y=11%) was prepared starting from intermediate 6a and 8-chloro-3-methyl-[1,2,4]triazolo[4,3-a]pyrazine (CAS 68774-78-7);

Example 53 (y=54%) was prepared starting from intermediate 6a and 5-chloro-3-methyl-1,2-thiazole-4-carbonitrile (CAS 25069-00-5);

Example 54 (y=14%) was prepared starting from intermediate 6a and 2,4-difluoro-6-methylpyrimidine (CAS 696-80-0);

Example 55 (y=37%) was prepared starting from intermediate 6a and 2,4-difluoro-5-methylpyrimidine (CAS 96548-89-9);

Example 56 (y=59%) was prepared starting from intermediate 6a and 4-chloro-5-fluoro-6-methylpyrimidine (CAS 898044-55-8);

Example 57 (y=8%) was prepared starting from intermediate 6a and 2-chloro-3-(difluoromethoxy)pyridine (CAS 1206977-80-1);

Example 58 (y=30%) was prepared starting from intermediate 6a and 2-chloro-6-(1H-pyrazol-1-yl)pyrazine (CAS 642459-09-4);

Example 59 (y=33%) was prepared starting from intermediate 6a and 2-chloro-3-(trifluoromethyl)pyridine (CAS 65753-47-1);

Example 60 (y=25%) was prepared starting from intermediate 6a and 2-chloro-6-(trifluoromethyl)pyridine (CAS 39890-95-4);

Example 61 (y=11%) was prepared starting from intermediate 6a and 4-chloro-2-(trifluoromethyl)pyridine (CAS 131748-14-6);

Example 62 (y=32%) was prepared starting from intermediate 6a and 4-chloro-3,6-dimethyl-[1,2]oxazolo[5,4-b]pyridine (CAS 2126161-62-2);

Example 63 (y=29%) was prepared starting from intermediate 6a and 4-chloro-2-methoxypyrimidine (CAS 51421-99-9);

Example 64 (y=32%) was prepared starting from intermediate 6a and 2-chloro-4-methoxypyrimidine (CAS 22536-63-6);

Example 65 (y=13%) was prepared starting from intermediate 6a and 4-chloro-6-methoxypyrimidine (CAS 26452-81-3);

Example 66 (y=25%) was prepared starting from intermediate 6a and 2-chloro-3-cyclobutoxypyrazine (CAS 1250943-13-5);

Example 67 (y=38%) was prepared starting from intermediate 6a and 4-chloro-5-fluoro-2,6-dimethylpyrimidine (CAS 1240622-52-9);

Example 68 (y=28%) was prepared starting from intermediate 6a and 1-chlorophthalazine (CAS 5784-45-2);

Example 69 (y=10%) was prepared starting from intermediate 6a and 4-chloro-3-fluoropyridine (CAS 2546-56-7);

Example 70 (y=62%) was prepared starting from intermediate 6a and 2-fluoropyrazine (CAS 4949-13-7);

Example 71 (y=42%) was prepared starting from intermediate 6a and 3-chloropyridazine (CAS 1120-95-2);

Example 72 (y=65%) was prepared starting from intermediate 6a and 2,6-difluoropyridine (CAS 1513-65-1);

Example 73 (y=15%) was prepared starting from intermediate 6a and 4-chloro-2-methylpyridine (CAS 3678-63-5);

Example 74 (y=19%) was prepared starting from intermediate 6a and 2,4-dichloropyrimidine (CAS 3934-20-1);

Example 75 (y=24%) was prepared starting from intermediate 6a and 2,4-dichloropyrimidine (CAS 3934-20-1);

Example 76 (y=28%) was prepared starting from intermediate 6a and 2,6-dichloropyrazine (CAS 4774-14-5);

Example 77 (y=33%) was prepared starting from intermediate 6a and 2,6-dichloropyridine (CAS 2402-78-0);

Example 78 (y=25%) was prepared starting from intermediate 6a and 4-chloropyrimidine (CAS 17180-93-7);

Example 79 (y=29%) was prepared starting from intermediate 6a and 2-chloro-4-cyanopyridine (CAS 33252-30-1);

Example 80 (y=52%) was prepared starting from intermediate 6a and 2,4-difluoropyridine (CAS 34941-90-7);

Example 81 (y=29%) was prepared starting from intermediate 6a and 2,4-difluoropyridine (CAS 34941-90-7);

Example 82 (y=44%) was prepared starting from intermediate 6b and 2-fluoro-1,3-thiazole (CAS 27225-14-5);

Example 83 (y=41%) was prepared starting from intermediate 6b and 2,4-dichlorothiazole (CAS 4175-76-2);

Example 84 (y=7%) was prepared starting from intermediate 6b and 2-chloro-4-methyl-1,3-thiazole (CAS 26847-01-8);

Example 85 (y=36%) was prepared starting from intermediate 6b and 5-chloro-3-methyl-1,2,4-thiadiazole (CAS 21734-85-0);

Example 86 (y=10%) was prepared starting from intermediate 6b and 5-chloro-1-methyl-1H-pyrazole-4-carbonitrile (CAS 111493-52-8);

Example 87 (y=43%) was prepared starting from intermediate 6b and 5-chloro-3-cyclopropyl-1,2,4-thiadiazole (CAS 122684-54-2);

Example 88 (y=39%) was prepared starting from intermediate 6b and 2-fluoro-6-methylpyridine (CAS 407-22-7);

Example 89 (y=32%) was prepared starting from intermediate 6b and 2-fluoro-4-methylpyridine (CAS 461-87-0);

Example 90 (y=57%) was prepared starting from intermediate 6b and 2-cyano-3-fluoropyridine (CAS 97509-75-6);

Example 91 (y=50%) was prepared starting from intermediate 6b and 5-fluoropyridine-3-carbonitrile (CAS 696-42-4);

Example 92 (y=21%) was prepared starting from intermediate 6b and 3-chloropyrazine-2-carbonitrile (CAS 55557-52-3);

Example 93 (y=48%) was prepared starting from intermediate 6b and 22-fluoro-1,3-benzothiazole (CAS 1123-98-4);

Example 94 (y=19%) was prepared starting from intermediate 6b and 3-chloro-1,2-benzoxazole (CAS 16263-52-8);

Example 95 (y=51%) was prepared starting from intermediate 6b and 5-chloro-3-(2-methoxyethyl)-1,2,4-thiadiazole (CAS 89180-91-6);

Example 96 (y=9%) was prepared starting from intermediate 6b and 3-chloro-4-phenyl-4H-1,2,4-triazole (CAS 90002-02-1);

Example 97 (y=60%) was prepared starting from intermediate 6b and 5-chloro-1-phenyl-1H-tetrazole (CAS 14210-25-4);

Example 98 (y=7%) was prepared starting from intermediate 6b and 2-chloro-4-fluoro-1-methyl-1H-1,3-benzodiazole (CAS 1283719-98-1);
Example 99 (y=21%) was prepared starting from intermediate 6b and 2-fluoro-3-methylpyridine (CAS 2369-18-8);
Example 100 (y=59%) was prepared starting from intermediate 6b and 2-fluoro-5-methylpyrimidine (CAS 62802-36-2);
Example 101 (y=62%) was prepared starting from intermediate 6b and 3-fluoro-6-methylpyridazine (CAS 65202-56-4);
Example 102 (y=34%) was prepared starting from intermediate 6b and 2,5-difluoropyridine (CAS 84476-99-3);
Example 103 (y=39%) was prepared starting from intermediate 6b and 4,6-difluoropyrimidine (CAS 2802-62-2);
Example 104 (y=53%) was prepared starting from intermediate 6b and 3,6-difluoropyridazine (CAS 33097-39-1);
Example 105 (y=53%) was prepared starting from intermediate 6b and 2,6-difluoropyrazine (CAS 33873-09-5);
Example 106 (y=44%) was prepared starting from intermediate 6b and 2,3-difluoropyrazine (CAS 52751-15-2);
Example 107 (y=14%) was prepared starting from intermediate 6b and 2,4-difluoropyrimidine (CAS 2802-61-1);
Example 108 (y=65%) was prepared starting from intermediate 6b and 2-fluoropyridine-3-carbonitrile (CAS 3939-13-7);
Example 109 (y=53%) was prepared starting from intermediate 6b and 2-cyano-6-fluoropyridine (CAS 3939-15-9);
Example 110 (y=53%) was prepared starting from intermediate 6b and 4-fluoropyridine-2-carbonitrile (CAS 847225-56-3);
Example 111 (y=64%) was prepared starting from intermediate 6b and 3-fluoropyridine-4-carbonitrile (CAS 113770-88-0);
Example 112 (y=11%) was prepared starting from intermediate 6b and 4,6-difluoro-2-methylpyrimidine (CAS 18382-80-4);
Example 113 (y=30%) was prepared starting from intermediate 6b and 4,6-difluoro-5-methylpyrimidine (CAS 18260-64-5);
Example 114 (y=33%) was prepared starting from intermediate 6b and using 2-chloro-4-(trifluoromethyl)pyrimidine (CAS 33034-67-2);
Example 115 (y=43%) was prepared starting from intermediate 6b and 4-chloro-6-(trifluoromethyl)pyrimidine (CAS 37552-81-1);
Example 116 (y=34%) was prepared starting from intermediate 6b and 4-chloropyrazolo[1,5-a]pyrazine (CAS 1260665-84-6);
Example 117 (y=18%) was prepared starting from intermediate 6b and 5-chloropyrazolo[1,5-a]pyrimidine (CAS 29274-24-6);
Example 118 (y=8%) was prepared starting from intermediate 6b and 5-chloro-[1,2,4]triazolo[4,3-a]pyrazine (CAS 63744-34-3);
Example 119 (y=12%) was prepared starting from intermediate 6b and 8-chloro-[1,2,4]triazolo[4,3-a]pyrazine (CAS 68774-77-6);
Example 120 (y=56%) was prepared starting from intermediate 6b and 3-chloro-2-fluoropyridine (CAS 1480-64-4);
Example 121 (y=31%) was prepared starting from intermediate 6b and 5-chloro-1,6-naphthyridine (CAS 23616-32-2);
Example 122 (y=37%) was prepared starting from intermediate 6b and 4-chloropyridine-3-carbonitrile (CAS 89284-61-7);
Example 123 (y=65%) was prepared starting from intermediate 6b and 4-chloro-1-methyl-1H-pyrazolo[3,4-d]pyrimidine (CAS 23000-43-3);
Example 124 (y=67%) was prepared starting from intermediate 6b and 2,6-difluoropyridine (CAS 1513-65-1);
Example 125 (y=18%) was prepared starting from intermediate 6b and 2,4-difluoropyridine (CAS 34941-90-7);
Example 126 (y=8%) was prepared starting from intermediate 6b and 2,4-difluoropyridine (CAS 34941-90-7);
Example 127 (y=50%) was prepared starting from intermediate 6a and 4-fluoropyridine-2-carbonitrile (CAS 847225-56-3).

| Example | Structure | Name |
|---|---|---|
| 1 | | 2-chloro-N-{2-[4-(difluoromethyl)-1,3-thiazol-5-yl]-2-[4-(pyridin-2-yloxy)piperidin-1-yl]ethyl}-6-fluorobenzamide |

| Example | Structure | Name |
|---|---|---|
| 2 | | 2-chloro-N-{2-[4-(difluoromethyl)-1,3-thiazol-5-yl]-2-[4-(pyridin-3-yloxy)piperidin-1-yl]ethyl}-6-fluorobenzamide |
| 3 | | 2-chloro-N-{2-[4-(difluoromethyl)-1,3-thiazol-5-yl]-2-[4-(pyridin-4-yloxy)piperidin-1-yl]ethyl}-6-fluorobenzamide |
| 4 | | 2-chloro-N-{2-[4-(difluoromethyl)-1,3-thiazol-5-yl]-2-[4-(pyrimidin-2-yloxy)piperidin-1-yl]ethyl}-6-fluorobenzamide |

-continued

| Example | Structure | Name |
|---------|-----------|------|
| 5 | | 2-chloro-N-{2-[4-(difluoromethyl)-1,3-thiazol-5-yl]-2-{4-[(5-fluoropyridin-3-yl)oxy]piperidin-1-yl}ethyl}-6-fluorobenzamide |
| 6 | | 2-chloro-N-{2-[4-(difluoromethyl)-1,3-thiazol-5-yl]-2-{4-[(3-fluoropyridin-4-yl)oxy]piperidin-1-yl}ethyl}-6-fluorobenzamide |
| 7 | | 2-chloro-N-{2-[4-(difluoromethyl)-1,3-thiazol-5-yl]-2-{4-[(3-fluoropyridin-2-yl)oxy]piperidin-1-yl}ethyl}-6-fluorobenzamide |

-continued

| Example | Structure | Name |
|---|---|---|
| 8 | | 2-chloro-N-{2-[4-(difluoromethyl)-1,3-thiazol-5-yl]-2-{4-[(5-methyl-1,2-oxazol-3-yl)methoxy]piperidin-1-yl}ethyl}-6-fluorobenzamide |
| 9 | | 2-chloro-N-{2-[4-(difluoromethyl)-1,3-thiazol-5-yl]-2-{4-[(dimethyl-1,2-oxazol-4-yl)methoxy]piperidin-1-yl}ethyl}-6-fluorobenzamide |
| 10 | | 2-chloro-N-{2-[4-(difluoromethyl)-1,3-thiazol-5-yl]-2-[4-(1,3-thiazol-2-yloxy)piperidin-1-yl]ethyl}-6-fluorobenzamide |

-continued

| Example | Structure | Name |
| --- | --- | --- |
| 11 | | 2-Chloro-N-{2-[4-(difluoromethyl)-1,3-thiazol-5-yl]-2-{4-[(3-methyl-1,2,4-thiadiazol-5-yl)oxy]piperidin-1-yl}ethyl}-6-fluorobenzamide |
| 12 | | 2-Chloro-N-(2-{4-[(4-chloro-1,3-thiazol-2-yl)oxy]piperidin-1-yl}-2-[4-(difluoromethyl)-1,3-thiazol-5-yl]ethyl)-6-fluorobenzamide |
| 13 | | 2-Chloro-N-(2-{4-[(3-cyclopropyl-1,2,4-thiadiazol-5-yl)oxy]piperidin-1-yl}-2-[4-(difluoromethyl)-1,3-thiazol-5-yl]ethyl)-6-fluorobenzamide |

-continued

| Example | Structure | Name |
|---------|-----------|------|
| 14 | | 2-Chloro-N-{2-[4-(difluoromethyl)-1,3-thiazol-5-yl]-2-{4-[(6-methylpyridin-2-yl)oxy]piperidin-1-yl}ethyl}-6-fluorobenzamide |
| 15 | | 2-Chloro-N-{2-[4-(difluoromethyl)-1,3-thiazol-5-yl]-2-{4-[(4-methylpyridin-2-yl)oxy]piperidin-1-yl}ethyl}-6-fluorobenzamide |
| 16 | | 2-Chloro-N-(2-{4-[(5-cyanopyridin-3-yl)oxy]piperidin-1-yl}-2-[4-(difluoromethyl)-1,3-thiazol-5-yl]ethyl)-6-fluorobenzamide |

| Example | Structure | Name |
|---------|-----------|------|
| 17 | | 2-Chloro-N-(2-{4-[(3-cyanopyrazin-2-yl)oxy]piperidin-1-yl}-2-[4-(difluoromethyl)-1,3-thiazol-5-yl]ethyl)-6-fluorobenzamide |
| 18 | | 2-Chloro-N-(2-{4-[(2-cyanopyridin-3-yl)oxy]piperidin-1-yl}-2-[4-(difluoromethyl)-1,3-thiazol-5-yl]ethyl)-6-fluorobenzamide |
| 19 | | 2-Chloro-N-(2-{4-[(2-chloropyridin-3-yl)oxy]piperidin-1-yl}-2-[4-(difluoromethyl)-1,3-thiazol-5-yl]ethyl)-6-fluorobenzamide |

-continued

| Example | Structure | Name |
|---|---|---|
| 20 | | N-{2-[4-(1,3-Benzothiazol-2-yl oxy)piperidin-1-yl]-2-[4-(difluoromethyl)-1,3-thiazol-5-yl]ethyl}-2-chloro-6-fluorobenzamide |
| 21 | | N-{2-[4-(1,2-Benzoxazol-3-yloxy)piperidin-1-yl]-2-[4-(difluoromethyl)-1,3-thiazol-5-yl]ethyl}-2-chloro-6-fluorobenzamide |
| 22 | | N-{2-[4-(1,3-Benzoxazol-2-yloxy)piperidin-1-yl]-2-[4-(difluoromethyl)-1,3-thiazol-5-yl]ethyl}-2-chloro-6-fluorobenzamide |

-continued

| Example | Structure | Name |
|---|---|---|
| 23 | | 2-Chloro-N-{2-[4-(difluoromethyl)-1,3-thiazol-5-yl]-2-(4-{[3-(2-methoxyethyl)-1,2,4-thiadiazol-5-yl]oxy}piperidin-1-yl)ethyl}-6-fluorobenzamide |
| 24 | | 2-Chloro-N-{2-[4-(difluoromethyl)-1,3-thiazol-5-yl]-2-{4-[(3-phenyl-1,2,4-oxadiazol-5-yl)oxy]piperidin-1-yl}ethyl}-6-fluorobenzamide |
| 25 | | 2-Chloro-N-{2-[4-(difluoromethyl)-1,3-thiazol-5-yl]-2-{4-[(1-phenyl-1H-1,2,3,4-tetrazol-5-yl)oxy]piperidin-1-yl}ethyl}-6-fluorobenzamide |

| Example | Structure | Name |
| --- | --- | --- |
| 26 | | 2-Chloro-N-{2-[4-(difluoromethyl)-1,3-thiazol-5-yl]-2-{4-[(4-fluoro-1-methyl-1H-1,3-benzodiazol-2-yl)oxy]piperidin-1-yl}ethyl}-6-fluorobenzamide |
| 27 | | 2-Chloro-N-{2-[4-(difluoromethyl)-1,3-thiazol-5-yl]-2-{4-[(3-methylpyridin-2-yl)oxy]piperidin-1-yl}ethyl}-6-fluorobenzamide |
| 28 | | 2-Chloro-N-{2-[4-(difluoromethyl)-1,3-thiazol-5-yl]-2-{4-[(5-methylpyrimidin-2-yl)oxy]piperidin-1-yl}ethyl}-6-fluorobenzamide |

-continued

| Example | Structure | Name |
|---|---|---|
| 29 | | 2-Chloro-N-{2-[4-(difluoromethyl)-1,3-thiazol-5-yl]-2-{4-[(6-methylpyridazin-3-yl)oxy]piperidin-1-yl}ethyl}-6-fluorobenzamide |
| 30 | | 2-Chloro-N-{2-[4-(difluoromethyl)-1,3-thiazol-5-yl]-2-{4-[(5-fluoropyridin-2-yl)oxy]piperidin-1-yl}ethyl}-6-fluorobenzamide |
| 31 | | 2-Chloro-N-{2-[4-(difluoromethyl)-1,3-thiazol-5-yl]-2-{4-[(6-fluoropyrimidin-4-yl)oxy]piperidin-1-yl}ethyl}-6-fluorobenzamide |

| Example | Structure | Name |
|---|---|---|
| 32 | | 2-Chloro-N-{2-[4-(difluoromethyl)-1,3-thiazol-5-yl]-2-{4-[(6-fluoropyridazin-3-yl)oxy]piperidin-1-yl}ethyl}-6-fluorobenzamide |
| 33 | | 2-Chloro-N-{2-[4-(difluoromethyl)-1,3-thiazol-5-yl]-2-{4-[(6-fluoropyrazin-2-yl)oxy]piperidin-1-yl}ethyl}-6-fluorobenzamide |
| 34 | | 2-Chloro-N-{2-[4-(difluoromethyl)-1,3-thiazol-5-yl]-2-{4-[(3-fluoropyrazin-2-yl)oxy]piperidin-1-yl}ethyl}-6-fluorobenzamide |

-continued

| Example | Structure | Name |
|---|---|---|
| 35 | | 2-Chloro-N-{2-[4-(difluoromethyl)-1,3-thiazol-5-yl]-2-{4-[(2-fluoropyrimidin-4-yl)oxy]piperidin-1-yl}ethyl}-6-fluorobenzamide |
| 36 | | 2-Chloro-N-(2-{4-[(3-cyanopyridin-2-yl)oxy]piperidin-1-yl}-2-[4-(difluoromethyl)-1,3-thiazol-5-yl]ethyl)-6-fluorobenzamide |
| 37 | | 2-Chloro-N-(2-{4-[(6-cyanopyridin-2-yl)oxy]piperidin-1-yl}-2-[4-(difluoromethyl)-1,3-thiazol-5-yl]ethyl)-6-fluorobenzamide |

-continued

| Example | Structure | Name |
|---|---|---|
| 38 | | 2-Chloro-N-(2-{4-[(4-cyanopyridin-3-yl)oxy]piperidin-1-yl}-2-[4-(difluoromethyl)-1,3-thiazol-5-yl]ethyl)-6-fluorobenzamide |
| 39 | | 2-Chloro-N-{2-[4-(difluoromethyl)-1,3-thiazol-5-yl]-2-{4-[(6-fluoro-2-methylpyrimidin-4-yl)oxy]piperidin-1-yl}ethyl}-6-fluorobenzamide |
| 40 | | 2-Chloro-N-{2-[4-(difluoromethyl)-1,3-thiazol-5-yl]-2-{4-[(6-fluoro-5-methylpyrimidin-4-yl)oxy]piperidin-1-yl}ethyl}-6-fluorobenzamide |

-continued

| Example | Structure | Name |
|---|---|---|
| 41 | | 2-Chloro-N-(2-{4-[(6-cyclopropylpyridin-2-yl)oxy]piperidin-1-yl}-2-[4-(difluoromethyl)-1,3-thiazol-5-yl]ethyl)-6-fluorobenzamide |
| 42 | | 2-Chloro-N-{2-[4-(difluoromethyl)-1,3-thiazol-5-yl]-2-(4-{[4-(trifluoromethyl)pyrimidin-2-yl]oxy}piperidin-1-yl)ethyl}-6-fluorobenzamide |
| 43 | | 2-Chloro-N-{2-[4-(difluoromethyl)-1,3-thiazol-5-yl]-2-(4-{[6-(trifluoromethyl)pyrimidin-4-yl]oxy}piperidin-1-yl)ethyl}-6-fluorobenzamide |

| Example | Structure | Name |
|---|---|---|
| 44 | | 2-Chloro-N-{2-[4-(difluoromethyl)-1,3-thiazol-5-yl]-2-(4-{pyrazolo[1,5-a]pyrazin-4-yloxy}piperidin-1-yl)ethyl}-6-fluorobenzamide |
| 45 | | 2-Chloro-N-{2-[4-(difluoromethyl)-1,3-thiazol-5-yl]-2-(4-{[1,2,4]triazolo[4,3-a]pyrazin-5-yloxy}piperidin-1-yl)ethyl}-6-fluorobenzamide |
| 46 | | 2-Chloro-N-{2-[4-(difluoromethyl)-1,3-thiazol-5-yl]-2-(4-{[1,2,4]triazolo[4,3-a]pyrazin-8-yloxy}piperidin-1-yl)ethyl}-6-fluorobenzamide |

-continued

| Example | Structure | Name |
|---------|-----------|------|
| 47 | | 2-Chloro-N-(2-{4-[(3-chloropyridin-2-yl)oxy]piperidin-1-yl}-2-[4-(difluoromethyl)-1,3-thiazol-5-yl]ethyl)-6-fluorobenzamide |
| 48 | | 2-Chloro-N-{2-[4-(difluoromethyl)-1,3-thiazol-5-yl]-2-[4-(1,5-naphthyridin-4-yloxy)piperidin-1-yl]ethyl}-6-fluorobenzamide |
| 49 | | 2-Chloro-N-{2-[4-(difluoromethyl)-1,3-thiazol-5-yl]-2-[4-(1,6-naphthyridin-5-yloxy)piperidin-1-yl]ethyl}-6-fluorobenzamide |

-continued

| Example | Structure | Name |
|---|---|---|
| 50 | | 2-Chloro-N-(2-{4-[(3-cyanopyridin-4-yl)oxy]piperidin-1-yl}-2-[4-(difluoromethyl)-1,3-thiazol-5-yl]ethyl)-6-fluorobenzamide |
| 51 | | 2-Chloro-N-{2-[4-(difluoromethyl)-1,3-thiazol-5-yl]-2-[4-({1-methyl-1H-pyrazolo[3,4-d]pyrimidin-4-yl}oxy)piperidin-1-yl]ethyl}-6-fluorobenzamide |
| 52 | | 2-Chloro-N-{2-[4-(difluoromethyl)-1,3-thiazol-5-yl]-2-[4-({3-methyl-[1,2,4]triazolo[4,3-a]pyrazin-8-yl}oxy)piperidin-1-yl]ethyl}-6-fluorobenzamide |

| Example | Structure | Name |
|---|---|---|
| 53 | | 2-Chloro-N-(2-{4-[(4-cyano-3-methyl-1,2-thiazol-5-yl)oxy]piperidin-1-yl}-2-[4-(difluoromethyl)-1,3-thiazol-5-yl]ethyl)-6-fluorobenzamide |
| 54 | | 2-Chloro-N-{2-[4-(difluoromethyl)-1,3-thiazol-5-yl]-2-{4-[(2-fluoro-6-methylpyrimidin-4-yl)oxy]piperidin-1-yl}ethyl}-6-fluorobenzamide |
| 55 | | 2-Chloro-N-{2-[4-(difluoromethyl)-1,3-thiazol-5-yl]-2-{4-[(2-fluoro-5-methylpyrimidin-4-yl)oxy]piperidin-1-yl}ethyl}-6-fluorobenzamide |

-continued

| Example | Structure | Name |
|---|---|---|
| 56 | | 2-Chloro-N-{2-[4-(difluoromethyl)-1,3-thiazol-5-yl]-2-{4-[(5-fluoro-6-methylpyrimidin-4-yl)oxy]piperidin-1-yl}ethyl}-6-fluorobenzamide |
| 57 | | 2-Chloro-N-[2-(4-{[3-(difluoromethoxy)pyridin-2-yl]oxy}piperidin-1-yl)-2-[4-(difluoromethyl)-1,3-thiazol-5-yl]ethyl]-6-fluorobenzamide |
| 58 | | 2-Chloro-N-{2-[4-(difluoromethyl)-1,3-thiazol-5-yl]-2-(4-{[6-(1H-pyrazol-1-yl)pyrazin-2-yl]oxy}piperidin-1-yl)ethyl}-6-fluorobenzamide |

-continued

| Example | Structure | Name |
|---|---|---|
| 59 | | 2-Chloro-N-{2-[4-(difluoromethyl)-1,3-thiazol-5-yl]-2-(4-{[3-(trifluoromethyl)pyridin-2-yl]oxy}piperidin-1-yl)ethyl}-6-fluorobenzamide |
| 60 | | 2-Chloro-N-{2-[4-(difluoromethyl)-1,3-thiazol-5-yl]-2-(4-{[6-(trifluoromethyl)pyridin-2-yl]oxy}piperidin-1-yl)ethyl}-6-fluorobenzamide |
| 61 | | 2-Chloro-N-{2-[4-(difluoromethyl)-1,3-thiazol-5-yl]-2-(4-{[2-(trifluoromethyl)pyridin-4-yl]oxy}piperidin-1-yl)ethyl}-6-fluorobenzamide |

-continued

| Example | Structure | Name |
|---|---|---|
| 62 | | 2-Chloro-N-{2-[4-(difluoromethyl)-1,3-thiazol-5-yl]-2-[4-({3,6-dimethyl-[1,2]oxazolo[5,4-b]pyridin-4-yl}oxy)piperidin-1-yl]ethyl}-6-fluorobenzamide |
| 63 | | 2-Chloro-N-{2-[4-(difluoromethyl)-1,3-thiazol-5-yl]-2-{4-[(2-methoxypyrimidin-4-yl)oxy]piperidin-1-yl}ethyl}-6-fluorobenzamide |
| 64 | | 2-Chloro-N-{2-[4-(difluoromethyl)-1,3-thiazol-5-yl]-2-{4-[(4-methoxypyrimidin-2-yl)oxy]piperidin-1-yl}ethyl}-6-fluorobenzamide |

| Example | Structure | Name |
|---|---|---|
| 65 | | 2-Chloro-N-{2-[4-(difluoromethyl)-1,3-thiazol-5-yl]-2-{4-[(6-methoxypyrimidin-4-yl)oxy]piperidin-1-yl}ethyl}-6-fluorobenzamide |
| 66 | | 2-Chloro-N-(2-{4-[(3-cyclobutoxypyrazin-2-yl)oxy]piperidin-1-yl}-2-[4-(difluoromethyl)-1,3-thiazol-5-yl]ethyl)-6-fluorobenzamide |
| 67 | | 2-Chloro-N-{2-[4-(difluoromethyl)-1,3-thiazol-5-yl]-2-{4-[(5-fluoro-2,6-dimethylpyrimidin-4-yl)oxy]piperidin-1-yl}ethyl}-6-fluorobenzamide |

-continued

| Example | Structure | Name |
|---------|-----------|------|
| 68 | | 2-Chloro-N-{2-[4-(difluoromethyl)-1,3-thiazol-5-yl]-2-[4-(phthalazin-1-yloxy)piperidin-1-yl]ethyl}-6-fluorobenzamide |
| 69 | | 2-Chloro-N-(2-{4-[(4-chloropyridin-3-yl)oxy]piperidin-1-yl}-2-[4-(difluoromethyl)-1,3-thiazol-5-yl]ethyl)-6-fluorobenzamide |
| 70 | | 2-Chloro-N-{2-[4-(difluoromethyl)-1,3-thiazol-5-yl]-2-[4-(pyrazin-2-yloxy)piperidin-1-yl]ethyl}-6-fluorobenzamidev |

-continued

| Example | Structure | Name |
|---|---|---|
| 71 | | 2-Chloro-N-{2-[4-(difluoromethyl)-1,3-thiazol-5-yl]-2-[4-(pyridazin-3-yloxy)piperidin-1-yl]ethyl}-6-fluorobenzamide |
| 72 | | 2-Chloro-N-{2-[4-(difluoromethyl)-1,3-thiazol-5-yl]-2-{4-[(6-fluoropyridin-2-yl)oxy]piperidin-1-yl}ethyl}-6-fluorobenzamide |
| 73 | | 2-Chloro-N-{2-[4-(difluoromethyl)-1,3-thiazol-5-yl]-2-{4-[(2-methylpyridin-4-yl)oxy]piperidin-1-yl}ethyl}-6-fluorobenzamide |

| Example | Structure | Name |
|---|---|---|
| 74 | | 2-Chloro-N-(2-{4-[(2-chloropyrimidin-4-yl)oxy]piperidin-1-yl}-2-[4-(difluoromethyl)-1,3-thiazol-5-yl]ethyl)-6-fluorobenzamide |
| 75 | | 2-chloro-N-(2-{4-[(4-chloropyrimidin-2-yl)oxy]piperidin-1-yl}-2-[4-(difluoromethyl)-1,3-thiazol-5-yl]ethyl)-6-fluorobenzamide |
| 76 | | 2-Chloro-N-(2-{4-[(6-chloropyrazin-2-yl)oxy]piperidin-1-yl}-2-[4-(difluoromethyl)-1,3-thiazol-5-yl]ethyl)-6-fluorobenzamide |

-continued

| Example | Structure | Name |
|---|---|---|
| 77 | | 2-Chloro-N-(2-{4-[(6-chloropyridin-2-yl)oxy]piperidin-1-yl}-2-[4-(difluoromethyl)-1,3-thiazol-5-yl]ethyl)-6-fluorobenzamide |
| 78 | | 2-Chloro-N-{2-[4-(difluoromethyl)-1,3-thiazol-5-yl]-2-[4-(pyrimidin-4-yloxy)piperidin-1-yl]ethyl}-6-fluorobenzamide |
| 79 | | 2-Chloro-N-(2-{4-[(4-cyanopyridin-2-yl)oxy]piperidin-1-yl}-2-[4-(difluoromethyl)-1,3-thiazol-5-yl]ethyl)-6-fluorobenzamide |

-continued

| Example | Structure | Name |
|---|---|---|
| 80 | | 2-Chloro-N-{2-[4-(difluoromethyl)-1,3-thiazol-5-yl]-2-{4-[(2-fluoropyridin-4-yl)oxy]piperidin-1-yl}ethyl}-6-fluorobenzamide |
| 81 | | 2-chloro-N-{2-[4-(difluoromethyl)-1,3-thiazol-5-yl]-2-{4-[(4-fluoropyridin-2-yl)oxy]piperidin-1-yl}ethyl}-6-fluorobenzamide |
| 82 | | 2-chloro-N-{2-[4-(difluoromethyl)-1,3-thiazol-5-yl]-2-{4-[(1,3-thiazol-2-yloxy)methyl]piperidin-1-yl}ethyl}-6-fluorobenzamide |

-continued

| Example | Structure | Name |
|---|---|---|
| 83 | | 2-Chloro-N-[2-(4-{[(4-chloro-1,3-thiazol-2-yl)oxy]methyl}piperidin-1-yl)-2-[4-(difluoromethyl)-1,3-thiazol-5-yl]ethyl]-6-fluorobenzamide |
| 84 | | 2-Chloro-N-{2-[4-(difluoromethyl)-1,3-thiazol-5-yl]-2-(4-{[(4-methyl-1,3-thiazol-2-yl)oxy]methyl}piperidin-1-yl)ethyl}-6-fluorobenzamide |
| 85 | | 2-Chloro-N-{2-[4-(difluoromethyl)-1,3-thiazol-5-yl]-2-(4-{[(3-methyl-1,2,4-thiadiazol-5-yl)oxy]methyl}piperidin-1-yl)ethyl}-6-fluorobenzamide |

-continued

| Example | Structure | Name |
|---|---|---|
| 86 | | 2-Chloro-N-[2-(4-{[(4-cyano-1-methyl-1H-pyrazol-5-yl)oxy]methyl}piperidin-1-yl)-2-[4-(difluoromethyl)-1,3-thiazol-5-yl]ethyl]-6-fluorobenzamide |
| 87 | | 2-Chloro-N-[2-(4-{[(3-cyclopropyl-1,2,4-thiadiazol-5-yl)oxy]methyl}piperidin-1-yl)-2-[4-(difluoromethyl)-1,3-thiazol-5-yl]ethyl]-6-fluorobenzamide |
| 88 | | 2-Chloro-N-{2-[4-(difluoromethyl)-1,3-thiazol-5-yl]-2-(4-{[(6-methylpyridin-2-yl)oxy]methyl}piperidin-1-yl)ethyl}-6-fluorobenzamide |

-continued

| Example | Structure | Name |
|---|---|---|
| 89 | | 2-Chloro-N-{2-[4-(difluoromethyl)-1,3-thiazol-5-yl]-2-(4-{[(4-methylpyridin-2-yl)oxy]methyl}piperidin-1-yl)ethyl}-6-fluorobenzamide |
| 90 | | 2-Chloro-N-[2-(4-{[(2-cyanopyridin-3-yl)oxy]methyl}piperidin-1-yl)-2-[4-(difluoromethyl)-1,3-thiazol-5-yl]ethyl]-6-fluorobenzamide |
| 91 | | 2-Chloro-N-[2-(4-{[(5-cyanopyridin-3-yl)oxy]methyl}piperidin-1-yl)-2-[4-(difluoromethyl)-1,3-thiazol-5-yl]ethyl]-6-fluorobenzamide |

-continued

| Example | Structure | Name |
|---|---|---|
| 92 | | 2-Chloro-N-[2-(4-{[(3-cyanopyrazin-2-yl)oxy]methyl}piperidin-1-yl)-2-[4-(difluoromethyl)-1,3-thiazol-5-yl]ethyl]-6-fluorobenzamide |
| 93 | | N-(2-{4-[(1,3-Benzothiazol-2-yloxy)methyl]piperidin-1-yl}-2-[4-(difluoromethyl)-1,3-thiazol-5-yl]ethyl)-2-chloro-6-fluorobenzamide |
| 94 | | N-(2-{4-[(1,2-Benzoxazol-3-yloxy)methyl]piperidin-1-yl}-2-[4-(difluoromethyl)-1,3-thiazol-5-yl]ethyl)-2-chloro-6-fluorobenzamide |

| Example | Structure | Name |
|---|---|---|
| 95 | | 2-Chloro-N-{2-[4-(difluoromethyl)-1,3-thiazol-5-yl]-2-[4-({[3-(2-methoxyethyl)-1,2,4-thiadiazol-5-yl]oxy}methyl)piperidin-1-yl]ethyl}-6-fluorobenzamide |
| 96 | | 2-Chloro-N-{2-[4-(difluoromethyl)-1,3-thiazol-5-yl]-2-(4-{[(4-phenyl-4H-1,2,4-triazol-3-yl)oxy]methyl}piperidin-1-yl)ethyl}-6-fluorobenzamide |
| 97 | | 2-Chloro-N-{2-[4-(difluoromethyl)-1,3-thiazol-5-yl]-2-(4-{[(1-phenyl-1H-1,2,3,4-tetrazol-5-yl)oxy]methyl}piperidin-1-yl)ethyl}-6-fluorobenzamide |

| Example | Structure | Name |
|---|---|---|
| 98 | | 2-Chloro-N-{2-[4-(difluoromethyl)-1,3-thiazol-5-yl]-2-(4-{[(4-fluoro-1-methyl-1H-1,3-benzodiazol-2-yl)oxy]methyl}piperidin-1-yl)ethyl}-6-fluorobenzamide |
| 99 | | 2-Chloro-N-{2-[4-(difluoromethyl)-1,3-thiazol-5-yl]-2-(4-{[(3-methylpyridin-2-yl)oxy]methyl}piperidin-1-yl)ethyl}-6-fluorobenzamide |
| 100 | | 2-Chloro-N-{2-[4-(difluoromethyl)-1,3-thiazol-5-yl]-2-(4-{[(5-methylpyrimidin-2-yl)oxy]methyl}piperidin-1-yl)ethyl}-6-fluorobenzamide |

-continued

| Example | Structure | Name |
| --- | --- | --- |
| 101 | | 2-Chloro-N-{2-[4-(difluoromethyl)-1,3-thiazol-5-yl]-2-(4-{[(6-methylpyridazin-3-yl)oxy]methyl}piperidin-1-yl)ethyl}-6-fluorobenzamide |
| 102 | | 2-Chloro-N-{2-[4-(difluoromethyl)-1,3-thiazol-5-yl]-2-(4-{[(5-fluoropyridin-2-yl)oxy]methyl}piperidin-1-yl)ethyl}-6-fluorobenzamide |
| 103 | | 2-Chloro-N-{2-[4-(difluoromethyl)-1,3-thiazol-5-yl]-2-(4-{[(6-fluoropyrimidin-4-yl)oxy]methyl}piperidin-1-yl)ethyl}-6-fluorobenzamide |

| Example | Structure | Name |
|---|---|---|
| 104 | | 2-Chloro-N-{2-[4-(difluoromethyl)-1,3-thiazol-5-yl]-2-(4-{[(6-fluoropyridazin-3-yl)oxy]methyl}piperidin-1-yl)ethyl}-6-fluorobenzamide |
| 105 | | 2-Chloro-N-{2-[4-(difluoromethyl)-1,3-thiazol-5-yl]-2-(4-{[(6-fluoropyrazin-2-yl)oxy]methyl}piperidin-1-yl)ethyl}-6-fluorobenzamide |
| 106 | | 2-Chloro-N-{2-[4-(difluoromethyl)-1,3-thiazol-5-yl]-2-(4-{[(3-fluoropyrazin-2-yl)oxy]methyl}piperidin-1-yl)ethyl}-6-fluorobenzamide |

-continued

| Example | Structure | Name |
| --- | --- | --- |
| 107 |  | 2-Chloro-N-{2-[4-(difluoromethyl)-1,3-thiazol-5-yl]-2-(4-{[(2-fluoropyrimidin-4-yl)oxy]methyl}piperidin-1-yl)ethyl}-6-fluorobenzamide |
| 108 |  | 2-Chloro-N-[2-(4-{[(3-cyanopyridin-2-yl)oxy]methyl}piperidin-1-yl)-2-[4-(difluoromethyl)-1,3-thiazol-5-yl]ethyl]-6-fluorobenzamide |
| 109 |  | 2-Chloro-N-[2-(4-{[(6-cyanopyridin-2-yl)oxy]methyl}piperidin-1-yl)-2-[4-(difluoromethyl)-1,3-thiazol-5-yl]ethyl]-6-fluorobenzamide |

| Example | Structure | Name |
|---|---|---|
| 110 | | 2-Chloro-N-[2-(4-{[(2-cyanopyridin-4-yl)oxy]methyl}piperidin-1-yl)-2-[4-(difluoromethyl)-1,3-thiazol-5-yl]ethyl]-6-fluorobenzamide |
| 111 | | 2-Chloro-N-[2-(4-{[(4-cyanopyridin-3-yl)oxy]methyl}piperidin-1-yl)-2-[4-(difluoromethyl)-1,3-thiazol-5-yl]ethyl]-6-fluorobenzamide |
| 112 | | 2-Chloro-N-{2-[4-(difluoromethyl)-1,3-thiazol-5-yl]-2-(4-{[(6-fluoro-2-methylpyrimidin-4-yl)oxy]methyl}piperidin-1-yl)ethyl}-6-fluorobenzamide |

-continued

| Example | Structure | Name |
|---|---|---|
| 113 | | 2-Chloro-N-{2-[4-(difluoromethyl)-1,3-thiazol-5-yl]-2-(4-{[(6-fluoro-5-methylpyrimidin-4-yl)oxy]methyl}piperidin-1-yl)ethyl}-6-fluorobenzamide |
| 114 | | 2-Chloro-N-{2-[4-(difluoromethyl)-1,3-thiazol-5-yl]-2-[4-({[4-(trifluoromethyl)pyrimidin-2-yl]oxy}methyl)piperidin-1-yl]ethyl}-6-fluorobenzamide |
| 115 | | 2-Chloro-N-{2-[4-(difluoromethyl)-1,3-thiazol-5-yl]-2-[4-({[6-(trifluoromethyl)pyrimidin-4-yl]oxy}methyl)piperidin-1-yl]ethyl}-6-fluorobenzamide |

-continued

| Example | Structure | Name |
|---|---|---|
| 116 | | 2-Chloro-N-{2-[4-(difluoromethyl)-1,3-thiazol-5-yl]-2-[4-({pyrazolo[1,5-a]pyrazin-4-yloxy}methyl)piperidin-1-yl]ethyl}-6-fluorobenzamide |
| 117 | | 2-Chloro-N-{2-[4-(difluoromethyl)-1,3-thiazol-5-yl]-2-[4-({pyrazolo[1,5-a]pyrimidin-5-yloxy}methyl)piperidin-1-yl]ethyl}-6-fluorobenzamide |
| 118 | | 2-Chloro-N-{2-[4-(difluoromethyl)-1,3-thiazol-5-yl]-2-[4-({[1,2,4]triazolo[4,3-a]pyrazin-5-yloxy}methyl)piperidin-1-yl]ethyl}-6-fluorobenzamide |

| Example | Structure | Name |
|---|---|---|
| 119 | | 2-Chloro-N-{2-[4-(difluoromethyl)-1,3-thiazol-5-yl]-2-[4-({[1,2,4]triazolo[4,3-a]pyrazin-8-yloxy}methyl)piperidin-1-yl]ethyl}-6-fluorobenzamide |
| 120 | | 2-Chloro-N-[2-(4-{[(3-chloropyridin-2-yl)oxy]methyl}piperidin-1-yl)-2-[4-(difluoromethyl)-1,3-thiazol-5-yl]ethyl]-6-fluorobenzamide |
| 121 | | 2-Chloro-N-{2-[4-(difluoromethyl)-1,3-thiazol-5-yl]-2-{4-[(1,6-naphthyridin-5-yloxy)methyl]piperidin-1-yl}ethyl}-6-fluorobenzamide |

| Example | Structure | Name |
|---|---|---|
| 122 | | 2-Chloro-N-[2-(4-{[(3-cyanopyridin-4-yl)oxy]methyl}piperidin-1-yl)-2-[4-(difluoromethyl)-1,3-thiazol-5-yl]ethyl]-6-fluorobenzamide |
| 123 | | 2-Chloro-N-{2-[4-(difluoromethyl)-1,3-thiazol-5-yl]-2-{4-[{{1-methyl-1H-pyrazolo[3,4-d]pyrimidin-4-yl}oxy)methyl]piperidin-1-yl}ethyl}-6-fluorobenzamide |
| 124 | | 2-Chloro-N-{2-[4-(difluoromethyl)-1,3-thiazol-5-yl]-2-(4-{[(6-fluoropyridin-2-yl)oxy]methyl}piperidin-1-yl)ethyl}-6-fluorobenzamide |

-continued

| Example | Structure | Name |
|---|---|---|
| 125 | | 2-Chloro-N-{2-[4-(difluoromethyl)-1,3-thiazol-5-yl]-2-(4-{[(2-fluoropyridin-4-yl)oxy]methyl}piperidin-1-yl)ethyl}-6-fluorobenzamide |
| 126 | | 2-chloro-N-{2-[4-(difluoromethyl)-1,3-thiazol-5-yl]-2-(4-{[(4-fluoropyridin-2-yl)oxy]methyl}piperidin-1-yl)ethyl}-6-fluorobenzamide |
| 127 | | 2-Chloro-N-(2-{4-[(2-cyanopyridin-4-yl)oxy]piperidin-1-yl}-2-[4-(difluoromethyl)-1,3-thiazol-5-yl]ethyl)-6-fluorobenzamide |

Analytical Methods
LC_MS

The HPLC measurement was performed using a Dionex 3000 module comprising a quaternary pump with degasser, an autosampler, a column oven (set at 29° C.), a diode-array detector DAD and a column as specified in the respective methods below. Flow from the column was split to a MS spectrometer. The MS detector (LCQ Fleet Thermo Scientific) was configured with an electrospray ionization source. Mass spectra were acquired by scanning from 50 to 800 in 0.48 second. The capillary needle voltage was 5 kV in positive and negative ionization mode and the source temperature was maintained at 275° C. Nitrogen was used as the nebulizer gas, the flow was 8 l/min. Data acquisition was performed with Thermo Xcalibur Qual Browser.

Several methods have been used for the LC_MS analysis of the patent's examples:

(Method A)
HPLC Conditions:
 Wavelength range: (190-340) nm±4 nm
 Flow: 1.0 ml/min
 Column temperature: 25° C.
 Autosampler temperature: 20° C.
 Injection volume: 2.0 µl
 Analysis time: 6 min
 Elution: gradient

| Time [min] | Mobile phase A [%] | Mobile phase B [%] | Flow [ml/min] |
|---|---|---|---|
| 0.0 | 80 | 20 | 1.0 |
| 3.35 | 20 | 80 | 1.0 |
| 3.75 | 20 | 80 | 1.0 |
| 3.9 | 5 | 95 | 1.0 |
| 4.75 | 5 | 95 | 1.0 |
| 5.0 | 80 | 20 | 1.0 |
| 6.0 | 80 | 20 | 1.0 |

Mobile phase A: 0.1% v/v water solution of formic acid
Mobile phase B: 0.1% v/v acetonitrile solution of formic acid
Solution for syringe washing: 20% MeOH (Method B)
HPLC Conditions:
 Wavelength range: (190-340) nm±4 nm
 Flow: 1.0 ml/min
 Column temperature: 25° C.
 Autosampler temperature: 20° C.
 Injection volume: 2.0 µl
 Analysis time: 6 min
 Elution: gradient

| Time [min] | Mobile phase A [%] | Mobile phase B [%] | Flow [ml/min] |
|---|---|---|---|
| 0.0 | 70 | 30 | 1.0 |
| 3.35 | 20 | 80 | 1.0 |
| 3.75 | 20 | 80 | 1.0 |
| 3.90 | 5 | 95 | 1.0 |
| 4.75 | 5 | 95 | 1.0 |
| 5.00 | 70 | 30 | 1.0 |
| 6.00 | 70 | 30 | 1.0 |

Mobile phase A: 0.1% v/v water solution of formic acid
Mobile phase B: 0.1% v/v acetonitrile solution of formic acid
Solution for syringe washing: 20% MeOH (Method C)
HPLC Conditions:
 Wavelength range: (190-340) nm±4 nm
 Flow: 1.0 ml/min
 Column temperature: 25° C.
 Autosampler temperature: 20° C.
 Injection volume: 2.0 µl
 Analysis time: 7 min
 Elution: gradient

| Time [min] | Mobile phase A [%] | Mobile phase B [%] | Flow [ml/min] |
|---|---|---|---|
| 0.0 | 95 | 5 | 1.0 |
| 1.0 | 95 | 5 | 1.0 |
| 4.75 | 20 | 80 | 1.0 |
| 5.25 | 20 | 80 | 1.0 |
| 6.0 | 95 | 5 | 1.0 |
| 7.0 | 95 | 5 | 1.0 |

Mobile phase A: 0.1% v/v water solution of formic acid
Mobile phase B: 0.1% v/v acetonitrile solution of formic acid
Solution for syringe washing: 20% MeOH (Method D)
HPLC Conditions:
 Wavelength range: (190-340) nm±4 nm
 Flow: 1.0 ml/min
 Column temperature: 25° C.
 Autosampler temperature: 20° C.
 Injection volume: 2.0 µl
 Analysis time: 6 min
 Elution: gradient

| Time [min] | Mobile phase A [%] | Mobile phase B [%] | Flow [ml/min] |
|---|---|---|---|
| 0.00 | 60 | 40 | 1.0 |
| 3.35 | 20 | 80 | 1.0 |
| 3.75 | 20 | 80 | 1.0 |
| 3.90 | 5 | 95 | 1.0 |
| 4.75 | 5 | 95 | 1.0 |
| 5.00 | 60 | 40 | 1.0 |
| 6.00 | 60 | 40 | 1.0 |

Mobile phase A: 0.1% v/v water solution of formic acid
Mobile phase B: 0.1% v/v acetonitrile solution of formic acid
Solution for syringe washing: 20% MeOH (Method E)
HPLC Conditions:
 Wavelength range: (190-340) nm±4 nm
 Flow: 1.0 ml/min
 Column temperature: 25° C.
 Autosampler temperature: 20° C.
 Injection volume: 2.0 µl
 Analysis time: 7 min
 Elution: gradient

| Time [min] | Mobile phase A [%] | Mobile phase B [%] | Flow [ml/min] |
|---|---|---|---|
| 0.00 | 80 | 20 | 1.0 |
| 2.00 | 20 | 80 | 1.0 |
| 2.35 | 20 | 80 | 1.0 |
| 2.45 | 5 | 95 | 1.0 |
| 4.25 | 5 | 95 | 1.0 |
| 5.00 | 80 | 20 | 1.0 |
| 7.00 | 80 | 20 | 1.0 |

Mobile phase A: 0.1% v/v water solution of formic acid
Mobile phase B: 0.1% v/v acetonitrile solution of formic acid
Solution for syringe washing: 20% MeOH (Method F)
HPLC Conditions:
 Wavelength range: (190-340) nm±4 nm
 Flow: 1.0 ml/min
 Column temperature: 25° C.
 Autosampler temperature: 20° C.

Injection volume: 2.0 μl
Analysis time: 6 min
Elution: gradient

| Time [min] | Mobile phase A [%] | Mobile phase B [%] | Flow [ml/min] |
|---|---|---|---|
| 0.0 | 50 | 50 | 1.0 |
| 3.35 | 20 | 80 | 1.0 |
| 3.75 | 20 | 80 | 1.0 |
| 3.9 | 5 | 95 | 1.0 |
| 4.75 | 5 | 95 | 1.0 |
| 5.0 | 50 | 50 | 1.0 |
| 6.0 | 50 | 50 | 1.0 |

Mobile phase A: 0.1% v/v water solution of formic acid
Mobile phase B: 0.1% v/v acetonitrile solution of formic acid
Solution for syringe washing: 20% MeOH

| Intermediate | [M + H]⁺ | Intermediate | [M + H]⁺ |
|---|---|---|---|
| 1a | 383.10 | 1b | 350.95 |
| 1c | 351.05 | 1d | 351.05 |
| 1e | 351.95 | 1f | 369.05 |
| 1g | 369.00 | 1h | 369.05 |
| 1i | 369.05 | 1j | 369.05 |
| 1k | 288.05 | | |
| 2a | — | 2b | 372.00 |
| 3a | 387.55 | 3b | 355.45 |
| 3c | 355.05 | 3d | 355.10 |
| 3e | 356.15 | 3f | 373.20 |
| 3g | 373.05 | 3h | 373.20 |
| 3i | 373.50 | 3j | 362.05 |
| 3k | 376.55 | | |
| 4a | 518.95 | 4b | 533.00 |
| 5a | 434.05 | 5b | 448.10 |

| Example | Method | R$_t$ min | [M + H]⁺ | Example | Method | R$_t$ min | [M + H]⁺ |
|---|---|---|---|---|---|---|---|
| 1 | A | 2.23 | 511.15 | 2 | C | 2.98 | 511.10 |
| 3 | C | 2.83 | 511.13 | 4 | C | 3.41 | 512.11 |
| 5 | A | 2.27 | 528.96 | 6 | A | 1.60 | 529.96 |
| 7 | B | 2.19 | 531.10 | 8 | A | 1.90 | 530.06 |
| 9 | A | 1.89 | 543.21 | 10 | A | 2.49 | 517.04 |
| 11 | A | 2.60 | 532.07 | 12 | D | 2.34 | 551.00 |
| 13 | D | 2.38 | 558.06 | 14 | A | 2.34 | 525.11 |
| 15 | A | 2.33 | 525.10 | 16 | B | 1.87 | 536.11 |
| 17 | B | 2.10 | 537.05 | 18 | B | 1.83 | 536.11 |
| 19 | A | 2.28 | 547.07 | 20 | D | 2.68 | 567.09 |
| 21 | D | 2.28 | 551.11 | 22 | B | 2.78 | 551.06 |
| 23 | A | 2.61 | 576.12 | 24 | F | 2.36 | 577.96 |
| 25 | D | 2.06 | 578.03 | 26 | B | 2.32 | 582.07 |
| 27 | B | 2.06 | 525.10 | 28 | A | 1.88 | 526.13 |
| 29 | C | 3.26 | 526.10 | 30 | B | 2.13 | 529.90 |
| 31 | B | 2.01 | 529.90 | 32 | A | 2.00 | 529.86 |
| 33 | B | 2.11 | 529.88 | 34 | A | 2.59 | 529.89 |
| 35 | A | 2.45 | 529.83 | 36 | B | 2.03 | 536.12 |
| 37 | A | 2.7 | 536.13 | 38 | A | 2.22 | 536.11 |
| 39 | B | 2.21 | 544.10 | 40 | B | 2.26 | 541.96 |
| 41 | B | 2.83 | 551.12 | 42 | B | 2.40 | 580.10 |
| 43 | A | 3.06 | 580.06 | 44 | A | 2.32 | 551.09 |
| 45 | A | 1.61 | 552.08 | 46 | C | 3.17 | 552.10 |
| 47 | B | 2.36 | 547.06 | 48 | C | 2.97 | 561.88 |
| 49 | A | 2.09 | 561.95 | 50 | A | 2.11 | 536.11 |
| 51 | A | 2.15 | 566.14 | 52 | A | 1.46 | 566.10 |
| 53 | A | 3.09 | 556.11 | 54 | A | 2.61 | 544.14 |
| 55 | E | 2.13 | 544.11 | 56 | A | 2.45 | 544.12 |
| 57 | B | 2.26 | 577.88 | 58 | A | 2.64 | 577.94 |
| 59 | A | 2.97 | 579.10 | 60 | D | 2.48 | 579.10 |
| 61 | B | 2.51 | 579.05 | 62 | B | 2.16 | 580.06 |
| 63 | C | 3.85 | 542.12 | 64 | A | 2.05 | 542.14 |
| 65 | A | 2.30 | 542.12 | 66 | D | 2.28 | 582.05 |
| 67 | A | 2.55 | 558.12 | 68 | A | 1.96 | 561.95 |
| 69 | A | 2.15 | 547.06 | 70 | A | 1.96 | 512.13 |
| 71 | A | 1.54 | 512.08 | 72 | A | 2.81 | 529.94 |
| 73 | C | 2.90 | 522.96 | 74 | A | 2.56 | 545.80 |
| 75 | A | 2.44 | 545.68 | 76 | B | 2.46 | 545.64 |
| 77 | D | 2.16 | 545.88 | 78 | C | 3.48 | 512.11 |
| 79 | A | 2.63 | 533.99 | 80 | A | 2.63 | 528.93 |
| 81 | A | 2.46 | 528.94 | 82 | A | 2.00 | 531.06 |
| 83 | A | 2.59 | 565.00 | 84 | A | 2.21 | 545.89 |
| 85 | A | 1.95 | 545.83 | 86 | A | 1.87 | 596.96 |
| 87 | A | 2.55 | 572.08 | 88 | A | 1.84 | 539.16 |
| 89 | A | 1.91 | 539.15 | 90 | A | 1.95 | 550.12 |
| 91 | A | 1.96 | 550.12 | 92 | A | 2.13 | 551.10 |
| 93 | A | 2.84 | 581.05 | 94 | B | 2.19 | 565.13 |
| 95 | A | 2.00 | 590.07 | 96 | A | 1.79 | 591.11 |
| 97 | A | 2.43 | 592.13 | 98 | A | 2.29 | 596.12 |
| 99 | A | 2.29 | 539.12 | 100 | A | 1.68 | 540.11 |
| 101 | A | 1.30 | 540.10 | 102 | A | 2.26 | 543.07 |
| 103 | A | 1.99 | 544.10 | 104 | A | 1.69 | 544.09 |
| 105 | A | 2.14 | 544.08 | 106 | A | 2.16 | 544.08 |
| 107 | A | 1.97 | 544.09 | 108 | A | 2.11 | 550.10 |
| 109 | B | 1.82 | 550.12 | 110 | A | 2.03 | 550.13 |
| 111 | A | 1.89 | 550.07 | 112 | A | 2.15 | 558.09 |
| 113 | A | 2.24 | 558.11 | 114 | A | 2.36 | 593.85 |
| 115 | A | 2.54 | 593.84 | 116 | A | 1.94 | 565.14 |
| 117 | A | 1.82 | 565.08 | 118 | A | 1.28 | 566.13 |
| 119 | A | 1.25 | 566.14 | 120 | B | 2.01 | 559.06 |
| 121 | A | 1.85 | 576.07 | 122 | A | 1.75 | 550.11 |
| 123 | A | 1.81 | 580.12 | 124 | A | 2.37 | 542.98 |
| 125 | A | 2.20 | 542.9 | 126 | A | 2.01 | 542.98 |
| 127 | B | 2.00 | 536.08 | | | | |

NMR Characterization $^1$H NMR and $^{13}$C-NMR spectra were recorded on Bruker Avance III HD 400 MHz NMR spectrometer using CDCl$_3$ as solvents Chemical shifts (δ) are reported in parts per million (ppm) relative to residual signal of non-fully deuterated solvents pick for 1H NMR assigned as 7.26 ppm for CHCl$_3$.

| Intermediate | $^1$H-NMR 300 |
|---|---|
| 1a | $^1$H NMR (Chloroform-d) δ 8.84 (s, 1H), 7.01 (t, J = 54.2 Hz, 1H), 5.20 (s, 1H), 4.30 (s, 2H), 3.48 (dt, J = 7.9, 4.0 Hz, 1H), 2.95-2.78 (m, 2H), 2.58 (ddd, J = 11.5, 8.6, 3.3 Hz, 1H), 2.48 (ddd, J = 11.4, 8.8, 3.4 Hz, 1H), 2.39 (s, 3H), 2.29 (s, 3H), 2.03-1.89 (m, 2H), 1.74 (ddt, J = 17.2, 8.8, 4.1 Hz, 2H) |
| 1b | $^1$H NMR (Chloroform-d) δ 8.85 (s, 1H), 8.19-8.07 (m, 1H), 7.59 (ddd, J = 8.4, 7.1, 2.0 Hz, 1H), 7.24-6.84 (m, 2H), 6.75 (dt, J = 8.4, 0.9 Hz, 1H), 5.26-5.15 (m, 2H), 2.93 (dt, J = 14.4, 5.2 Hz, 2H), 2.78-2.57 (m, 2H), 2.17-2.02 (m, 2H), 2.02-1.82 (m, 2H) |
| 1c | $^1$H NMR (Chloroform-d) δ 8.85 (s, 1H), 8.42-8.20 (m, 2H), 7.26-6.82 (m, 3H), 5.25 (s, 1H), 4.48 (dt, J = 6.8, 3.3 Hz, 1H), 3.03-2.85 (m, 2H), 2.65 (dddd, J = 22.5, 11.0, 7.4, 3.9 Hz, 2H), 2.16-1.86 (m, 4H) |

-continued

| Intermediate | ¹H-NMR 300 |
|---|---|
| 1d | ¹H NMR (Chloroform-d) δ 8.85 (s, 1H), 8.51-8.41 (m, 2H), 7.25-6.73 (m, 3H), 5.25 (s, 1H), 4.55 (tt, J = 6.9, 3.7 Hz, 1H), 3.03-2.84 (m, 2H), 2.67 (dddd, J = 21.9, 11.2, 7.3, 4.0 Hz, 2H), 2.14-1.88 (m, 4H |
| 1e | ¹H NMR (Chloroform-d) δ 8.85 (s, 1H), 8.53 (d, J = 4.8 Hz, 2H), 7.25-6.81 (m, 2H), 5.24 (s, 1H), 5.15 (tt, J = 7.7, 3.9 Hz, 1H), 2.97 (d, J = 5.3 Hz, 2H), 2.82-2.68 (m, 1H), 2.62 (t, J = 8.1 Hz, 1H), 2.16 (t, J = 9.1 Hz, 2H), 2.00 (ddtd, J = 16.9, 12.2, 8.0, 4.0 Hz, 2H) |
| 1f | ¹H NMR (Chloroform-d) δ 8.86 (s, 1H), 8.18 (dd, J = 2.4, 1.1 Hz, 1H), 8.14 (d, J = 2.4 Hz, 1H), 7.02 (t, J = 54.2 Hz, 1H), 6.98 (dt, J = 10.2, 2.4 Hz, 1H), 5.25 (s, 1H), 4.48 (dt, J = 6.8, 3.3 Hz, 1H), 3.05-2.81 (m, 2H), 2.79-2.55 (m, 2H), 2.17-1.87 (m, 4H) |
| 1g | ¹H NMR (Chloroform-d) δ 8.86 (s, 1H), 8.39 (d, J = 3.3 Hz, 1H), 8.28 (d, J = 5.5 Hz, 1H), 7.02 (t, J = 54.2 Hz, 1H), 6.90 (dd, J = 7.1, 5.5 Hz, 1H), 5.26 (s, 1H), 4.60 (dt, J = 6.9, 3.4 Hz, 1H), 2.94 (tt, J = 7.7, 4.1 Hz, 2H), 2.73 (td, J = 7.2, 3.6 Hz, 1H), 2.65 (dd, J = 7.5, 3.7 Hz, 1H), 2.19-1.91 (m, 4H) |
| 1h | ¹H NMR (Chloroform-d) δ 8.85 (s, 1H), 7.90 (dd, J = 5.0, 1.7 Hz, 1H), 7.35 (ddd, J = 10.4, 7.8, 1.6 Hz, 1H), 7.23-6.80 (m, 1H), 6.93-6.81 (m, 1H), 5.30-5.20 (m, 1H), 5.24 (s, 1H), 3.04-2.88 (m, 2H), 2.74 (ddd, J = 11.5, 8.3, 3.6 Hz, 1H), 2.67-2.52 (m, 1H), 2.24-2.11 (m, 2H), 2.09-1.88 (m, 2H) |
| 1i | ¹H NMR (Chloroform-d) δ 8.83 (s, 1H), 7.01 (t, J = 54.2 Hz, 1H), 6.07 (s, 1H), 5.19 (s, 1H), 4.58 (s, 2H), 3.52 (dq, J = 7.8, 3.9 Hz, 1H), 2.87 (ddd, J = 10.7, 6.6, 3.8 Hz, 2H), 2.57 (ddd, J = 11.6, 8.5, 3.4 Hz, 1H), 2.51-2.39 (m, 1H), 2.45 (s, 3H), 2.03-1.88 (m, 2H), 1.85-1.64 (m, 2H) |
| 1j | ¹H NMR (Chloroform-d) δ 8.84 (s, 1H), 7.02 (t, J = 54.2 Hz, 1H), 5.21 (s, 1H), 4.07-3.71 (m, 1H), 3.05-2.82 (m, 2H), 2.59 (ddd, J = 11.6, 9.1, 3.2 Hz, 1H), 2.47 (ddd, J = 11.8, 9.1, 3.2 Hz, 1H), 2.03-1.89 (m, 2H), 1.70 (dtd, J = 18.9, 9.0, 4.2 Hz, 2H), 1.51-1.40 (m, 1H) |
| 1k | ¹H NMR (Chloroform-d) δ 8.83 (s, 1H), 7.03 (t, J = 54.3 Hz, 1H), 3.55 (d, J = 6.3 Hz, 2H), 3.06-2.85 (m, 2H), 2.51 (td, J = 11.3, 2.8 Hz, 1H), 2.38-2.27 (m, 1H), 1.94-1.74 (m, 2H), 1.59 (dtd, J = 9.3, 6.2, 2.8 Hz, 2H), 1.49-1.19 (m, 3H) |
| 2a | ¹H NMR (Chloroform-d) δ 8.83 (s, 1H), 7.03 (t, J = 54.2 Hz, 1H), 5.18 (d, J = 1.0 Hz, 1H), 4.73 (dd, J = 4.6, 2.9 Hz, 1H), 4.07-3.96 (m, 1H), 3.94-3.70 (m, 2H), 3.53 (dd, J = 10.9, 5.6 Hz, 2H), 2.94-2.79 (m, 2H), 2.68-2.39 (m, 2H), 2.10-1.65 (m, 8H) |
| 2b | ¹H NMR (Chloroform-d) δ 8.83 (s, 1H), 7.03 (t, J = 54.2 Hz, 1H), 5.18 (d, J = 1.0 Hz, 1H), 4.59 (s, 1H), 3.92-3.81 (m, 1H), 3.69-3.46 (m, 2H), 3.27 (ddd, J = 9.6, 6.3, 1.0 Hz, 1H), 2.93 (dt, J = 17.5, 6.9 Hz, 2H), 2.51 (td, J = 11.3, 2.7 Hz, 1H), 2.40-2.24 (m, 1H), 1.94-1.24 (m, 10H) |
| 3a | ¹H NMR (Chloroform-d) δ 8.77 (s, 1H), 6.95 (t, J = 54.2 Hz, 1H), 4.27 (s, 2H), 4.21 (t, J = 6.0 Hz, 1H), 3.36 (dt, J = 8.5, 4.3 Hz, 1H), 3.11-2.96 (m, 2H), 2.93-2.81 (m, 1H), 2.79-2.68 (m, 1H), 2.37 (s, 3H), 2.34-2.18 (m, 2H), 2.26 (s, 3H), 1.92 (s, 2H), 1.76-1.52 (m, 4H) |
| 3c | ¹H NMR (Chloroform-d) δ 8.79 (s, 1H), 8.30 (dd, J = 2.6, 1.0 Hz, 1H), 8.22 (dd, J = 4.2, 1.9 Hz, 1H), 7.25-7.16 (m, 2H), 6.97 (t, J = 54.2 Hz, 1H), 4.42-4.30 (m, 1H), 4.25 (t, J = 5.9 Hz, 1H), 3.14-2.98 (m, 2H), 2.94-2.72 (m, 2H), 2.51-2.36 (m, 2H), 2.04 (ddd, J = 11.5, 7.4, 3.7 Hz, 2H), 1.88 (dtt, J = 12.6, 8.2, 3.8 Hz, 2H), 1.51 (s, 2H) |
| 3d | ¹H NMR (300 MHz, Chloroform-d) δ 8.79 (s, 1H), 8.43 (d, J = 1.6 Hz, 1H), 8.41 (d, J = 1.6 Hz, 1H), 7.18-6.74 (m, 3H), 4.43 (dt, J = 7.6, 3.7 Hz, 1H), 4.26 (t, J = 6.0 Hz, 1H), 3.14-2.98 (m, 2H), 2.92-2.71 (m, 2H), 2.55-2.38 (m, 2H), 2.12-1.97 (m, 2H), 1.96-1.79 (m, 2H), 1.66 (s, 2H) |
| 3f | ¹H NMR (Chloroform-d) δ 8.79 (s, 1H), 8.13 (dd, J = 2.4, 1.1 Hz, 1H), 8.11 (d, J = 2.4 Hz, 1H), 6.97 (t, J = 54.2 Hz, 1H), 6.93 (d, J = 10.3 Hz, 1H), 4.35 (dt, J = 7.5, 3.8 Hz, 1H), 4.26 (t, J = 5.9 Hz, 1H), 3.14-2.98 (m, 2H), 2.95-2.82 (m, 1H), 2.81-2.71 (m, 1H), 2.45 (dtd, J = 11.4, 7.9, 3.4 Hz, 2H), 2.12-1.99 (m, 2H), 1.97-1.79 (m, 2H), 1.49 (s, 2H) |
| 3g | ¹H NMR (Chloroform-d) δ 8.79 (s, 1H), 8.36 (d, J = 3.4 Hz, 1H), 8.25 (d, J = 5.5 Hz, 1H), 6.97 (t, J = 54.2 Hz, 1H), 6.86 (dd, J = 7.2, 5.6 Hz, 1H), 4.54-4.41 (m, 1H), 4.26 (t, J = 5.9 Hz, 1H), 3.15-2.97 (m, 2H), 2.96-2.84 (m, 1H), 2.83-2.73 (m, 1H), 2.54-2.38 (m, 2H), 2.13-2.01 (m, 2H), 2.00-1.83 (m, 2H), 1.53 (s, 2H) |

| Intermediate | ¹H-NMR 300 |
|---|---|
| 3h | ¹H NMR (Chloroform-d) δ 8.78 (s, 1H), 7.88 (dd, J = 5.0, 1.6 Hz, 1H), 7.38-7.29 (m, 1H), 6.97 (t, J = 54.2 Hz, 1H), 6.83 (ddd, J = 8.0, 5.0, 3.2 Hz, 1H), 5.14 (dq, J = 8.2, 4.1 Hz, 1H), 4.25 (t, J = 5.9 Hz, 1H), 3.15-2.97 (m, 2H), 2.96-2.86 (m, 1H), 2.86-2.73 (m, 1H), 2.45 (ddd, J = 11.8, 9.0, 3.2 Hz, 2H), 2.18-2.01 (m, 2H), 1.99-1.78 (m, 2H), 1.55 (s, 2H) |
| 3i | ¹H NMR (Chloroform-d) δ 8.75 (s, 1H), 6.93 (t, J = 54.2 Hz, 1H), 6.02 (s, 1H), 4.54 (s, 2H), 4.17 (t, J = 6.0 Hz, 1H), 3.39 (dt, J = 8.6, 4.4 Hz, 1H), 3.10-2.91 (m, 2H), 2.90-2.79 (m, 1H), 2.71 (ddd, J = 9.7, 4.5, 1.9 Hz, 1H), 2.42 (d, J = 0.8 Hz, 3H), 2.24 (qd, J = 9.6, 3.0 Hz, 2H), 1.98-1.85 (m, 2H), 1.75-1.54 (m, 2H), 1.34 (s, 2H) |
| 3j | ¹H NMR (Chloroform-d) δ 8.76 (s, 1H), 6.94 (t, J = 54.2 Hz, 1H), 4.75-4.65 (m, 1H), 4.23-4.12 (m, 1H), 3.95-3.81 (m, 1H), 3.70-3.58 (m, 1H), 3.52-3.41 (m, 1H), 3.09-2.93 (m, 2H), 2.92-2.80 (m, 1H), 2.80-2.65 (m, 1H), 2.35-2.14 (m, 2H), 2.02-1.78 (m, 2H), 1.77-1.61 (m, 2H), 1.62-1.44 (m, 8H) |
| 3k | ¹H NMR (Chloroform-d) δ 8.79 (s, 1H), 6.96 (t, J = 54.1 Hz, 1H), 4.57 (t, J = 3.5 Hz, 1H), 4.32 (t, J = 6.3 Hz, 1H), 3.92-3.79 (m, 1H), 3.59 (ddd, J = 9.5, 6.7, 1.2 Hz, 1H), 3.55-3.46 (m, 1H), 3.23 (dd, J = 9.5, 6.2 Hz, 1H), 3.12-2.99 (m, 3H), 2.86-2.78 (m, 1H), 2.20 (td, J = 11.4, 2.6 Hz, 1H), 2.02 (td, J = 11.4, 2.5 Hz, 1H), 1.90-1.66 (m, 4H), 1.57 (ddd, J = 14.7, 7.7, 4.0 Hz, 7H), 1.47-1.21 (m, 2H) |
| 4a | ¹H NMR (Chloroform-d) δ 8.80 (s, 1H), 7.35 (td, J = 8.2, 5.9 Hz, 1H), 7.25 (dt, J = 8.0, 0.9 Hz, 1H), 7.08 (td, J = 8.4, 1.1 Hz, 1H), 6.95 (t, J = 54.2 Hz, 1H), 6.42 (s, 1H), 4.68 (d, J = 4.3 Hz, 1H), 4.60 (t, J = 7.0 Hz, 1H), 3.97-3.75 (m, 2H), 3.72-3.57 (m, 0H), 3.48 (dt, J = 10.4, 4.7 Hz, 1H), 2.99-2.72 (m, 2H), 2.43-2.18 (m, 2H), 1.99-1.55 (m, 8H) |
| 4b | ¹H NMR (Chloroform-d) δ 8.81 (s, 1H), 7.35 (td, J = 8.2, 5.8 Hz, 1H), 7.24 (d, J = 8.1 Hz, 1H), 7.11-7.03 (m, 1H), 7.17-6.74 (m, 1H), 6.40 (s, 1H), 4.55 (d, J = 3.9 Hz, 2H), 3.82 (d, J = 11.5 Hz, 2H), 3.67-3.44 (m, 2H), 3.24 (t, J = 7.8 Hz, 1H), 3.12-2.80 (m, 2H), 2.35-2.04 (m, 2H), 1.94-1.14 (m, 10H) |
| 5a | ¹H NMR (Chloroform-d) δ 8.80 (s, 1H), 7.36 (td, J = 8.2, 5.9 Hz, 1H), 7.25 (dt, J = 8.0, 0.9 Hz, 1H), 7.08 (td, J = 8.4, 1.1 Hz, 1H), 6.95 (t, J = 54.2 Hz, 1H), 6.42-6.31 (m, 1H), 4.62 (t, J = 7.0 Hz, 1H), 3.92-3.77 (m, 2H), 3.70 (dt, J = 8.7, 4.4 Hz, 1H), 2.97-2.75 (m, 2H), 2.43-2.21 (m, 2H), 2.00-1.86 (m, 2H), 1.71-1.50 (m, 2H), 1.40 (d, J = 4.3 Hz, 1H) |
| 5b | ¹H NMR (Chloroform-d) δ 8.80 (s, 1H), 7.35 (td, J = 8.2, 5.9 Hz, 1H), 7.27-7.22 (m, 1H), 7.08 (td, J = 8.5, 1.1 Hz, 1H), 6.95 (t, J = 54.2 Hz, 1H), 6.44-6.29 (m, 1H), 4.58 (t, J = 6.8 Hz, 1H), 3.93-3.76 (m, 2H), 3.51 (t, J = 5.8 Hz, 2H), 3.07 (d, J = 10.8 Hz, 1H), 2.91 (d, J = 11.0 Hz, 1H), 2.29-2.17 (m, 1H), 2.16-2.00 (m, 1H), 1.84-1.74 (m, 2H), 1.52-1.16 (m, 4H) |

| Example | ¹H-NMR 400 | ¹³C-NMR 101 |
|---|---|---|
| 1 | ¹H NMR (Chloroform-d) δ 8.80 (s, 1H), 8.10 (ddd, J = 5.1, 2.0, 0.8 Hz, 1H), 7.55 (ddd, J = 8.3, 7.1, 2.1 Hz, 1H), 7.33 (td, J = 8.2, 5.9 Hz, 1H), 7.23 (dt, J = 8.1, 0.9 Hz, 1H), 7.11-7.02 (m, 1H), 7.09-6.80 (m, 2H), 6.68 (dt, J = 8.4, 0.9 Hz, 1H), 6.49 (t, J = 5.0 Hz, 1H), 5.05 (tt, J = 8.1, 3.9 Hz, 1H), 4.63 (t, J = 7.0 Hz, 1H), 3.92-3.76 (m, 2H), 2.94-2.79 (m, 2H), 2.55-2.39 (m, 2H), 2.16-2.01 (m, 2H), 1.89-1.72 (m, 2H) | ¹³C NMR (Chloroform-d) δ 162.96, 162.39, 159.54 (d, J = 251.6 Hz), 152.82, 147.20 (t, J = 25.6 Hz), 146.77, 138.62, 137.16, 132.33 (d, J = 5.4 Hz), 131.25 (d, J = 9.1 Hz), 125.70 (d, J = 3.4 Hz), 124.93 (d, J = 21.4 Hz), 116.58, 114.57 (d, J = 21.9 Hz), 111.58, 111.48 (t, J = 237.6 Hz), 69.80, 58.68, 47.78, 46.37, 42.86, 31.16, 31.07 |
| 2 | ¹H NMR (Chloroform-d) δ 8.82 (s, 1H), 8.27 (dd, J = 2.8, 0.8 Hz, 1H), 8.20 (dd, J = 4.5, 1.6 Hz, 1H), 7.35 (td, J = 8.3, 6.0 Hz, 1H), 7.25 (dt, J = 8.1, 0.9 Hz, 1H), 7.21 (ddd, J = 8.4, 4.5, 0.8 Hz, 1H), 7.17 (ddd, J = 8.4, 2.8, 1.6 Hz, 1H), 7.10-7.04 (m, 1H), 6.96 (t, J = 54.4 Hz, 1H), 6.41 (t, J = 4.3 Hz, 1H), 4.34 (tt, J = 7.6, 3.8 Hz, 1H), 3.86 (dd, J = 7.0, 5.1 Hz, 2H), 2.95-2.76 (m, 2H), 2.58-2.42 (m, 2H), 2.17-1.98 (m, 2H), 1.97-1.76 (m, 2H) | ¹³C NMR (Chloroform-d) δ 162.39, 159.54 (d, J = 251.6 Hz), 153.45, 152.90, 147.32 (t, J = 25.6 Hz), 142.29, 139.33, 137.06, 132.33 (d, J = 5.3 Hz), 131.30 (d, J = 9.2 Hz), 125.73 (d, J = 3.6 Hz), 124.88 (d, J = 21.3 Hz), 123.87, 122.62, 114.58 (d, J = 21.8 Hz), 111.57, 72.72, 58.77, 47.04, 46.19, 42.85, 30.85, 30.79 |

-continued

| Example | ¹H-NMR 400 | ¹³C-NMR 101 |
|---|---|---|
| 3 | ¹H NMR (Chloroform-d) δ 8.82 (s, 1H), 8.44-8.35 (m, 2H), 7.34 (td, J = 8.2, 5.9 Hz, 1H), 7.24 (dt, J = 8.2, 0.9 Hz, 1H), 7.07 (td, J = 8.5, 1.0 Hz, 1H), 6.96 (t, J = 54.2 Hz, 1H), 6.76 (dd, J = 4.9, 1.5 Hz, 2H), 6.44 (t, J = 4.7 Hz, 1H), 4.64 (t, J = 7.0 Hz, 1H), 4.41 (tt, J = 7.6, 3.8 Hz, 1H), 3.86 (dt, J = 6.1, 4.2 Hz, 2H), 2.97-2.76 (m, 2H), 2.61-2.41 (m, 2H), 2.14-1.97 (m, 2H), 1.96-1.78 (m, 2H) | ¹³C NMR (Chloroform-d) δ 163.44, 162.39, 159.53 (d, J = 251.6 Hz), 152.91, 151.11, 147.33 (t, J = 25.7 Hz), 137.08, 132.33 (d, J = 5.3 Hz), 131.30 (d, J = 9.1 Hz), 125.72 (d, J = 3.5 Hz), 124.88 (d, J = 21.4 Hz), 114.57 (d, J = 21.8 Hz), 111.56 (t, J = 237.6 Hz), 110.97, 71.87, 58.82, 47.03, 46.19, 42.87, 30.65, 30.61 |
| 4 | ¹H NMR (Chloroform-d) δ 8.78 (s, 1H), 8.46 (d, J = 4.8 Hz, 2H), 7.32 (td, J = 8.2, 5.9 Hz, 1H), 7.24-7.20 (m, 1H), 7.05 (dd, J = 8.7, 7.6 Hz, 1H), 7.07-6.78 (m, 1H), 6.90 (t, J = 4.8 Hz, 1H), 6.55 (t, J = 5.1 Hz, 1H), 5.01 (tt, J = 8.1, 4.0 Hz, 1H), 4.64 (t, J = 7.0 Hz, 1H), 3.91-3.72 (m, 2H), 2.98-2.80 (m, 2H), 2.55-2.39 (m, 2H), 2.18-2.01 (m, 2H), 1.99-1.79 (m, 2H) | ¹³C NMR (Chloroform-d) δ 164.49, 162.39, 159.52 (d, J = 251.6 Hz), 159.25, 152.85, 147.22 (t, J = 25.6 Hz), 136.94, 132.30 (d, J = 5.3 Hz), 131.25 (d, J = 9.2 Hz), 125.69 (d, J = 3.4 Hz), 124.92 (d, J = 21.3 Hz), 114.85, 114.55 (d, J = 21.9 Hz), 111.48 (t, J = 237.6 Hz), 72.04, 58.64, 47.51, 46.26, 42.87, 30.94, 30.83 |
| 5 | ¹H NMR (Chloroform-d) δ 8.82 (s, 1H), 8.11 (dd, J = 2.4, 1.1 Hz, 1H), 8.09 (d, J = 2.3 Hz, 1H), 7.35 (td, J = 8.2, 5.9 Hz, 1H), 7.25 (dt, J = 8.0, 0.9 Hz, 1H), 7.10-7.05 (m, 1H), 6.92 (dt, J = 10.3, 2.4 Hz, 1H), 6.89 (t, J = 54.1 Hz, 1H), 6.36 (t, J = 4.2 Hz, 1H), 4.65 (t, J = 6.9 Hz, 1H), 4.41-4.27 (m, 1H), 3.86 (ddd, J = 6.7, 5.1, 1.9 Hz, 2H), 2.95-2.77 (m, 2H), 2.50 (td, J = 8.1, 4.3 Hz, 2H), 2.15-1.99 (m, 2H), 1.94-1.79 (m, 2H) | ¹³C NMR (Chloroform-d) δ 162.38, 159.83 (d, J = 257.8 Hz), 159.54 (d, J = 251.7 Hz), 154.38 (d, J = 5.5 Hz), 152.91, 147.36 (t, J = 25.8 Hz), 136.99, 135.05 (d, J = 3.3 Hz), 132.33 (d, J = 5.4 Hz), 131.32 (d, J = 9.1 Hz), 130.21 (d, J = 23.0 Hz), 125.74 (d, J = 3.5 Hz), 124.86 (d, J = 21.4 Hz), 114.59 (d, J = 21.8 Hz), 114.20-108.41 (m), 110.05 (d, J = 20.5 Hz), 73.27, 58.79, 46.92, 46.13, 42.85, 30.72, 30.66 |
| 6 | ¹H NMR (Chloroform-d) δ 8.82 (s, 1H), 8.34 (d, J = 3.3 Hz, 1H), 8.23 (d, J = 5.5 Hz, 1H), 7.35 (td, J = 8.3, 6.0 Hz, 1H), 7.25 (dt, J = 8.1, 0.9 Hz, 1H), 7.10-7.03 (m, 1H), 6.98-6.95 (m, 1H), 6.87-6.82 (m, 1H), 6.43-6.31 (m, 1H), 4.66 (t, J = 6.9 Hz, 1H), 4.45 (tt, J = 7.7, 4.0 Hz, 1H), 3.86 (dd, J = 7.0, 5.1 Hz, 2H), 3.00-2.79 (m, 2H), 2.58-2.43 (m, 2H), 2.14-2.00 (m, 2H), 2.00-1.83 (m, 2H) | ¹³C NMR (Chloroform-d) δ 162.40, 159.52 (d, J = 251.6 Hz), 152.93, 151.45 (d, J = 8.5 Hz), 150.43 (d, J = 254.2 Hz), 147.35 (t, J = 25.7 Hz), 146.75 (d, J = 5.6 Hz), 138.66 (d, J = 20.9 Hz), 137.01, 132.31 (d, J = 5.3 Hz), 131.34 (d, J = 9.2 Hz), 125.75 (d, J = 3.6 Hz), 124.83 (d, J = 21.3 Hz), 114.60 (d, J = 21.8 Hz), 111.60 (t, J = 237.5 Hz), 110.41, 73.78, 58.74, 47.09, 46.00, 42.84, 30.75, 30.66 |
| 7 | ¹H NMR (Chloroform-d) δ 8.81 (s, 1H), 7.87 (dd, J = 5.0, 1.6 Hz, 1H), 7.39-7.29 (m, 2H), 7.25 (dt, J = 8.2, 0.9 Hz, 1H), 7.08 (td, J = 8.5, 1.0 Hz, 1H), 7.12-6.78 (m, 1H), 6.83 (ddd, J = 8.0, 5.4, 3.2 Hz, 1H), 6.53-6.34 (m, 1H), 5.12 (tt, J = 8.3, 4.0 Hz, 1H), 4.66 (t, J = 7.0 Hz, 1H), 4.00-3.72 (m, 2H), 3.00-2.81 (m, 2H), 2.58-2.41 (m, 2H), 2.20-2.06 (m, 2H), 1.99-1.78 (m, 2H) | ¹³C NMR (Chloroform-d) δ 162.40, 159.55 (d, J = 251.7 Hz), 152.83, 152.31 (d, J = 10.9 Hz), 147.58 (d, J = 258.2 Hz), 147.25 (t, J = 25.6 Hz), 141.17 (d, J = 6.4 Hz), 137.06, 132.34 (d, J = 5.3 Hz), 131.30 (d, J = 9.1 Hz), 125.74 (d, J = 3.5 Hz), 124.89 (d, J = 21.3 Hz), 123.20 (d, J = 15.7 Hz), 116.74 (d, J = 1.9 Hz), 114.61 (d, J = 21.9 Hz), 111.55 (t, J = 237.7 Hz), 70.98, 58.57, 48.02, 46.17, 42.84, 31.16, 31.03 |
| 8 | ¹H NMR (Chloroform-d) δ 8.80 (s, 1H), 7.34 (td, J = 8.3, 6.0 Hz, 1H), 7.25-7.23 (m, 1H), 7.07 (td, J = 8.5, 1.0 Hz, 1H), 6.94 (t, J = 54.2 Hz, 1H), 6.47-6.34 (m, 1H), 6.02 (s, 1H), 4.68 4.55 (m, 1H), 4.53 (s, 2H), 3.94-3.71 (m, 2H), 3.38 (s, 1H), 2.95-2.73 (m, 2H), 2.43 (s, 3H), 2.39-2.21 (m, 2H), 2.02-1.84 (m, 2H), 1.73-1.54 (m, 2H) | ¹³C NMR (Chloroform-d) δ 169.80, 162.40, 161.87, 159.53 (d, J = 251.5 Hz), 152.85, 147.37, 136.96, 132.32 (d, J = 5.2 Hz), 131.30 (d, J = 9.1 Hz), 125.73 (d, J = 3.4 Hz), 124.55 (d, J = 40.4 Hz), 114.59 (d, J = 21.9 Hz), 111.51 (t, J = 237.7 Hz), 100.95, 74.16, 61.32, 58.58, 47.93, 46.20, 42.77, 31.29, 31.14, 12.28 |
| 9 | ¹H NMR (Chloroform-d) δ 8.79 (s, 1H), 7.32 (td, J = 8.3, 6.0 Hz, 1H), 7.21 (dt, J = 8.3, 0.9 Hz, 1H), 7.04 (td, J = | ¹³C NMR (Chloroform-d) δ 166.73, 162.41, 159.71, 159.50 (d, J = 251.6 Hz), 152.89, 147.93- |

-continued

| Example | ¹H-NMR 400 | ¹³C-NMR 101 |
|---|---|---|
|  | 8.6, 1.1 Hz, 1H), 6.86 (t, J = 54.1 Hz, 1H), 6.55-6.45 (m, 1H), 4.68-4.50 (m, 1H), 4.24 (s, 2H), 3.90-3.75 (m, 2H), 3.41-3.26 (m, 1H), 2.94-2.73 (m, 2H), 2.33 (s, 3H), 2.40-2.24 (m, 2H), 2.21 (s, 3H), 1.92 (s, 2H), 1.74-1.55 (m, 2H) | 146.55 (m), 136.96, 132.28 (d, J = 5.3 Hz), 131.28 (d, J = 9.0 Hz), 125.69 (d, J = 3.4 Hz), 124.86 (d, J = 21.3 Hz), 114.55 (d, J = 21.8 Hz), 111.43 (t, J = 237.6 Hz), 111.31, 73.79, 60.39, 58.75, 47.82, 46.40, 42.80, 31.28, 31.12, 11.02, 10.09 |
| 10 | ¹H NMR (Chloroform-d) δ 8.82 (s, 1H), 7.35 (td, J = 8.2, 5.9 Hz, 1H), 7.25 (dt, J = 8.1, 0.9 Hz, 1H), 7.10 (d, J = 3.8 Hz, 1H), 7.07 (dd, J = 8.5, 1.1 Hz, 1H), 7.13-6.80 (m, 1H), 6.67 (d, J = 3.8 Hz, 1H), 6.35 (t, J = 5.7 Hz, 1H), 4.97 (td, J = 8.2, 4.4 Hz, 1H), 4.65 (t, J = 7.0 Hz, 1H), 3.92-3.77 (m, 2H), 2.93-2.76 (m, 2H), 2.51 (t, J = 8.9 Hz, 2H), 2.19-2.04 (m, 2H), 2.01-1.84 (m, 2H) | ¹³C NMR (Chloroform-d) δ 174.11, 162.38, 159.55 (d, J = 251.7 Hz), 152.88, 147.37, 137.00, 136.78, 132.37, 131.30 (d, J = 9.1 Hz), 125.74 (d, J = 3.3 Hz), 114.60 (d, J = 21.9 Hz), 114.06-109.03 (m), 110.91, 75.62, 58.68, 47.13, 46.24, 42.84, 30.84, 30.77 |
| 11 | ¹H NMR (Chloroform-d) δ 8.82 (s, 1H), 7.36 (td, J = 8.2, 5.9 Hz, 1H), 7.25 (d, J = 8.1 Hz, 1H), 7.08 (t, J = 8.5 Hz, 1H), 6.96 (t, J = 54.2 Hz, 1H), 6.31 (t, J = 5.6 Hz, 1H), 4.95 (tt, J = 7.9, 4.0 Hz, 1H), 4.66 (t, J = 7.0 Hz, 1H), 3.86 (t, J = 6.1 Hz, 2H), 2.91-2.77 (m, 2H), 2.58-2.48 (m, 2H), 2.46 (s, 3H), 2.20-2.08 (m, 2H), 2.04-1.88 (m, 2H) | ¹³C NMR (Chloroform-d) δ 190.06, 169.24, 162.38, 159.55 (d, J = 251.8 Hz), 152.92, 147.39, 136.80, 132.31, 131.34 (d, J = 9.2 Hz), 125.76 (d, J = 3.6 Hz), 124.83 (d, J = 21.0 Hz), 114.60 (d, J = 21.8 Hz), 111.62 (t, J = 237.5 Hz), 79.35, 58.73, 46.86, 46.12, 42.84, 30.73, 30.67, 19.73 |
| 12 | ¹H NMR (Chloroform-d) δ 8.82 (s, 1H), 7.35 (td, J = 8.3, 5.9 Hz, 1H), 7.25 (dt, J = 8.1, 0.9 Hz, 1H), 7.08 (td, J = 8.6, 1.0 Hz, 1H), 6.96 (t, J = 54.2 Hz, 1H), 6.43 (s, 1H), 6.33 (t, J = 5.3 Hz, 1H), 5.01 (dt, J = 7.7, 3.8 Hz, 1H), 4.65 (t, J = 7.0 Hz, 1H), 3.85 (dd, J = 7.0, 5.0 Hz, 2H), 2.87-2.75 (m, 2H), 2.52 (td, J = 8.1, 4.2 Hz, 2H), 2.17-2.04 (m, 2H), 2.01-1.84 (m, 2H) | ¹³C NMR (Chloroform-d) δ 172.60, 162.37, 159.55 (d, J = 251.4 Hz), 152.89, 147.75-146.98 (m), 136.91, 132.58, 132.34 (d, J = 5.4 Hz), 131.31 (d, J = 9.2 Hz), 125.75 (d, J = 3.6 Hz), 124.86 (d, J = 21.4 Hz), 114.60 (d, J = 21.9 Hz), 114.06-108.80 (m), 104.47, 77.57, 58.70, 46.99, 46.12, 42.83, 30.71, 30.63 |
| 13 | ¹H NMR (Chloroform-d) δ 8.82 (s, 1H), 7.35 (td, J = 8.3, 5.9 Hz, 1H), 7.25 (dt, J = 8.1, 0.9 Hz, 1H), 7.08 (td, J = 8.5, 1.0 Hz, 1H), 6.96 (t, J = 54.2 Hz, 1H), 6.33 (t, J = 4.7 Hz, 1H), 4.88 (tt, J = 7.5, 3.7 Hz, 1H), 4.65 (t, J = 7.0 Hz, 1H), 3.85 (t, J = 6.0 Hz, 2H), 2.94-2.75 (m, 2H), 2.57-2.39 (m, 2H), 2.16-2.03 (m, 3H), 2.01-1.84 (m, 2H), 1.06-1.00 (m, 2H), 0.97 (ddt, J = 7.8, 5.2, 2.5 Hz, 2H) | ¹³C NMR (Chloroform-d) δ 189.70, 174.21, 162.37, 159.54 (d, J = 251.6 Hz), 152.92, 147.37 (t, J = 25.8 Hz), 136.82, 132.33 (d, J = 5.2 Hz), 131.33 (d, J = 9.1 Hz), 125.75 (d, J = 3.4 Hz), 124.84 (d, J = 21.3 Hz), 114.60 (d, J = 21.8 Hz), 111.61 (t, J = 237.5 Hz), 79.23, 58.75, 46.80, 46.14, 42.83, 30.69, 30.65, 14.25, 8.85 |
| 14 | ¹H NMR (Chloroform-d) δ 8.83 (s, 1H), 7.44 (t, J = 7.7 Hz, 1H), 7.35 (td, J = 8.3, 5.9 Hz, 1H), 7.27-7.21 (m, 1H), 7.08 (td, J = 8.6, 1.1 Hz, 1H), 7.14-6.81 (m, 1H), 6.69 (d, J = 7.2 Hz, 1H), 6.47 (d, J = 8.2 Hz, 1H), 6.50-6.40 (m, 1H), 5.18-4.95 (m, 1H), 4.76-4.57 (m, 1H), 4.00-3.74 (m, 2H), 2.99-2.75 (m, 2H), 2.61-2.43 (m, 2H), 2.41 (s, 3H), 2.17-2.02 (m, 2H), 1.96-1.73 (m, 2H) |  |
| 15 | ¹H NMR (Chloroform-d) δ 8.83 (s, 1H), 7.97 (d, J = 5.2 Hz, 1H), 7.35 (td, J = 8.2, 5.9 Hz, 1H), 7.25 (dt, J = 8.1, 0.9 Hz, 1H), 7.08 (td, J = 8.6, 1.0 Hz, 1H), 7.14-6.81 (m, 1H), 6.68 (d, J = 5.3 Hz, 1H), 6.51 (dt, J = 1.6, 0.8 Hz, 1H), 6.49-6.37 (m, 1H), 5.14-4.97 (m, 1H), 4.78-4.56 (m, 1H), 3.98-3.76 (m, 2H), 3.02-2.71 (m, 2H), 2.61-2.38 (m, 2H), 2.29 (s, 3H), 2.14-2.00 (m, 2H), 1.92-1.74 (m, 2H) |  |
| 16 | ¹H NMR (Chloroform-d) δ 8.83 (s, 1H), 8.51-8.44 (m, 2H), 7.42-7.32 (m, 2H), 7.28-7.24 (m, 1H), 7.09 (td, J = 8.4, 0.9 Hz, 1H), 6.97 (t, J = 54.1 | ¹³C NMR (Chloroform-d) δ 162.37, 159.54 (d, J = 251.5 Hz), 152.96, 147.95-147.03 (m), 144.41, 143.32, 136.86, |

| Example | ¹H-NMR 400 | ¹³C-NMR 101 |
|---|---|---|
|  | Hz, 1H), 6.29 (t, J = 5.1 Hz, 1H), 4.67 (t, J = 7.0 Hz, 1H), 4.39 (tt, J = 7.9, 4.0 Hz, 1H), 3.95-3.80 (m, 2H), 2.94-2.80 (m, 2H), 2.53 (dd, J = 10.5, 6.9 Hz, 2H), 2.14-2.00 (m, 2H), 1.98-1.82 (m, 2H) | 132.34 (d, J = 5.2 Hz), 131.37 (d, J = 9.2 Hz), 125.77 (d, J = 3.4 Hz), 124.82 (d, J = 21.2 Hz), 124.08, 116.33, 114.61 (d, J = 21.8 Hz), 114.11-109.15 (m), 110.02, 73.45, 58.81, 46.81, 46.07, 42.84, 30.61, 30.53 |
| 17 | ¹H NMR (Chloroform-d) δ 8.82 (s, 1H), 8.28 (d, J = 2.5 Hz, 1H), 8.26 (d, J = 2.5 Hz, 1H), 7.36 (td, J = 8.2, 5.9 Hz, 1H), 7.26 (d, J = 7.8 Hz, 1H), 7.10 (t, J = 8.5 Hz, 1H), 6.97 (t, J = 54.1 Hz, 1H), 6.36 (t, J = 5.3 Hz, 1H), 5.17 (dt, J = 8.4, 4.3 Hz, 1H), 4.68 (t, J = 7.0 Hz, 1H), 3.88 (td, J = 13.2, 12.5, 6.3 Hz, 2H), 3.05-2.95 (m, 1H), 2.92-2.81 (m, 1H), 2.50 (dt, J = 21.9, 10.0 Hz, 2H), 2.08 (m, 2H), 1.97-1.77 (m, 2H) | ¹³C-NMR (Chloroform-d) δ 162.43, 160.67, 159.54 (d, J = 251.6 Hz), 152.93, 147.33 (t, J = 25.8 Hz), 144.39, 137.37, 136.94, 132.32 (d, J = 5.3 Hz), 131.36 (d, J = 9.2 Hz), 125.78 (d, J = 3.4 Hz), 124.83 (d, J = 21.2 Hz), 119.94, 114.64 (d, J = 21.9 Hz), 113.89, 111.63 (t, J = 237.6 Hz), 73.45, 58.66, 47.47, 46.04, 42.82, 30.78, 30.60 |
| 18 | ¹H NMR (Chloroform-d) δ 8.82 (s, 1H), 8.28 (dd, J = 4.5, 1.2 Hz, 1H), 7.44 (dd, J = 8.7, 4.5 Hz, 1H), 7.40-7.29 (m, 2H), 7.25 (dt, J = 8.0, 0.9 Hz, 1H), 7.13-7.05 (m, 1H), 7.15-6.77 (m, 1H), 6.38 (t, J = 4.5 Hz, 1H), 4.68 (t, J = 6.9 Hz, 1H), 4.48 (dt, J = 7.4, 3.7 Hz, 1H), 3.97-3.79 (m, 2H), 3.07-2.94 (m, 1H), 2.87 (dd, J = 9.7, 6.1 Hz, 1H), 2.67-2.42 (m, 2H), 2.14-2.02 (m, 2H), 2.01-1.84 (m, 2H) | ¹³C NMR (Chloroform-d) δ 162.46, 159.52 (d, J = 251.3 Hz), 156.53, 152.97, 147.28 (t, J = 25.7 Hz), 143.01, 136.95, 132.29 (d, J = 5.3 Hz), 131.36 (d, J = 9.2 Hz), 127.57, 125.76 (d, J = 3.4 Hz), 124.97, 124.82 (d, J = 21.4 Hz), 121.49, 115.05, 114.62 (d, J = 21.9 Hz), 111.59 (t, J = 237.5 Hz), 74.29, 58.75, 46.68, 45.80, 42.76, 30.68, 30.46 |
| 19 | ¹H NMR (Chloroform-d) δ 8.82 (s, 1H), 8.02 (dd, J = 4.0, 2.3 Hz, 1H), 7.37 (td, J = 8.2, 5.9 Hz, 1H), 7.28-7.24 (m, 1H), 7.22-7.17 (m, 2H), 7.09 (td, J = 8.5, 1.1 Hz, 1H), 6.97 (t, J = 54.2 Hz, 1H), 6.33 (t, J = 5.6 Hz, 1H), 4.67 (t, J = 7.0 Hz, 1H), 4.45-4.34 (m, 1H), 3.94-3.82 (m, 2H), 2.98-2.80 (m, 2H), 2.60-2.41 (m, 2H), 2.15-1.82 (m, 4H) |  |
| 20 | ¹H NMR (Chloroform-d) δ 8.82 (s, 1H), 7.66 (ddd, J = 3.0, 1.3, 0.6 Hz, 1H), 7.64 (ddd, J = 2.9, 0.6 Hz, 1H), 7.40-7.32 (m, 2H), 7.27-7.20 (m, 2H), 7.13-7.04 (m, 1H), 7.12-6.81 (m, 1H), 6.38 (t, J = 4.5 Hz, 1H), 5.20 (tt, J = 7.7, 3.9 Hz, 1H), 4.66 (t, J = 7.0 Hz, 1H), 3.95-3.77 (m, 2H), 2.95-2.75 (m, 2H), 2.70-2.46 (m, 2H), 2.31-2.10 (m, 2H), 2.06-1.87 (m, 2H) | ¹³C NMR (Chloroform-d) δ 171.90, 162.40, 159.55 (d, J = 251.6 Hz), 152.91, 149.38, 147.33 (t, J = 25.7 Hz), 136.97, 132.34 (d, J = 5.2 Hz), 131.71, 131.32 (d, J = 9.2 Hz), 125.95, 125.75 (d, J = 3.5 Hz), 124.87 (d, J = 21.4 Hz), 123.44, 121.20, 120.68, 114.61 (d, J = 21.8 Hz), 111.59 (t, J = 237.6 Hz), 77.23, 58.70, 47.20, 46.20, 42.85, 30.86, 30.80 |
| 21 | ¹H NMR (Chloroform-d) δ 8.83 (s, 1H), 7.63 (d, J = 7.9 Hz, 1H), 7.55 (ddd, J = 8.3, 7.0, 1.2 Hz, 1H), 7.44 (d, J = 8.5 Hz, 1H), 7.36 (td, J = 8.2, 5.9 Hz, 1H), 7.31-7.23 (m, 2H), 7.09 (td, J = 8.5, 1.1 Hz, 1H), 6.98 (t, J = 54.2 Hz, 1H), 6.41-6.30 (m, 1H), 4.92 (dt, J = 8.0, 4.0 Hz, 1H), 4.67 (t, J = 6.9 Hz, 1H), 3.93-3.78 (m, 2H), 2.98-2.83 (m, 2H), 2.60-2.48 (m, 2H), 2.35-2.16 (m, 2H), 2.09-1.92 (m, 2H) |  |
| 22 | ¹H NMR (Chloroform-d) δ 8.82 (s, 1H), 7.49-7.45 (m, 1H), 7.40-7.32 (m, 2H), 7.27-7.22 (m, 2H), 7.18 (td, J = 7.7, 1.4 Hz, 1H), 7.09 (t, J = 8.5 Hz, 1H), 6.97 (t, J = 54.2 Hz, 1H), 6.34 (t, J = 5.2 Hz, 1H), 5.08 (tt, J = 8.1, 3.7 Hz, 1H), 4.68 (t, J = 7.0 Hz, 1H), 3.86 (dd, J = 7.0, 5.1 Hz, 2H), 2.97-2.80 (m, 2H), 2.62-2.49 (m, 2H), 2.29-2.12 (m, 2H), 2.09-1.93 (m, 2H) | ¹³C NMR (Chloroform-d) δ 162.64, 162.39, 159.55 (d, J = 251.7 Hz), 152.92, 148.16, 147.40 (t, J = 25.8 Hz), 141.04, 136.79, 132.34 (d, J = 5.4 Hz), 131.34 (d, J = 9.2 Hz), 125.76 (d, J = 3.3 Hz), 124.85 (d, J = 21.2 Hz), 124.24, 122.78, 117.80, 114.61 (d, J = 21.9 Hz), 114.09-108.79 (m), 109.63, 77.77, 58.71, 46.77, 46.12, 42.84, 30.68, 30.60 |

| Example | ¹H-NMR 400 | ¹³C-NMR 101 |
|---|---|---|
| 23 | ¹H NMR (Chloroform-d) δ 8.82 (s, 1H), 7.35 (td, J = 8.2, 5.9 Hz, 1H), 7.25 (dt, J = 8.1, 0.9 Hz, 1H), 7.08 (td, J = 8.6, 1.1 Hz, 1H), 6.89 (t, J = 54.2 Hz, 1H), 6.37-6.26 (m, 1H), 5.02-4.87 (m, 1H), 4.73-4.61 (m, 1H), 3.90-3.83 (m, 2H), 3.80 (t, J = 6.7 Hz, 2H), 3.38 (s, 3H), 3.02 (t, J = 6.7 Hz, 2H), 2.91-2.78 (m, 2H), 2.59-2.48 (m, 2H), 2.19-2.08 (m, 2H), 2.05-1.87 (m, 2H) | ¹³C NMR (Chloroform-d) δ 190.11, 170.12, 162.39, 159.54 (d, J = 251.6 Hz), 152.94, 148.31-146.89 (m), 136.81, 132.33 (d, J = 5.4 Hz), 131.36 (d, J = 8.8 Hz), 125.76 (d, J = 3.5 Hz), 124.84 (d, J = 23.0 Hz), 114.60 (d, J = 21.8 Hz), 111.62 (t, J = 237.6 Hz), 79.41, 70.04, 58.70, 46.83, 46.14, 42.81, 34.09, 30.66 |
| 24 | ¹H NMR (Chloroform-d) δ 8.84 (s, 1H), 8.00 (dd, J = 7.8, 1.8 Hz, 2H), 7.54-7.43 (m, 3H), 7.37 (td, J = 8.2, 5.9 Hz, 1H), 7.28-7.23 (m, 1H), 7.10 (td, J = 8.7, 1.0 Hz, 1H), 6.98 (t, J = 54.2 Hz, 1H), 6.38-6.22 (m, 1H), 5.05 (tt, J = 12.0, 7.8, 4.2 Hz, 1H), 4.69 (t, J = 7.0 Hz, 1H), 3.96-3.80 (m, 2H), 2.98-2.82 (m, 2H), 2.65-2.48 (m, 2H), 2.31-2.12 (m, 2H), 2.11-1.92 (m, 2H) | |
| 25 | ¹H NMR (Chloroform-d) δ 8.82 (s, 1H), 7.71-7.63 (m, 2H), 7.59-7.41 (m, 3H), 7.35 (td, J = 8.2, 5.9 Hz, 1H), 7.24 (dt, J = 8.1, 0.9 Hz, 1H), 7.07 (td, J = 8.5, 1.1 Hz, 1H), 6.96 (t, J = 54.1 Hz, 1H), 6.35-6.27 (m, 1H), 5.24-5.03 (m, 1H), 4.73-4.60 (m, 1H), 3.92-3.79 (m, 2H), 2.89-2.73 (m, 2H), 2.66-2.52 (m, 2H), 2.33-2.14 (m, 2H), 2.12-1.92 (m, 2H) | ¹³C NMR (Chloroform-d) δ 162.41, 159.52 (d, J = 251.6 Hz), 159.19, 152.91, 147.44, 136.73, 133.34, 132.32 (d, J = 5.3 Hz), 131.36 (d, J = 9.2 Hz), 129.59, 128.92, 125.75 (d, J = 3.5 Hz), 124.81 (d, J = 21.5 Hz), 121.47, 114.60 (d, J = 21.8 Hz), 111.58 (t, J = 237.7 Hz), 79.84, 58.84, 46.33, 42.77, 30.59 |
| 26 | ¹H NMR (Chloroform-d) δ 8.83 (s, 1H), 7.36 (td, J = 8.2, 5.9 Hz, 1H), 7.25 (dt, J = 8.1, 0.9 Hz, 1H), 7.14-6.81 (m, 5H), 6.41-6.27 (m, 1H), 5.33-5.20 (m, 1H), 4.83-4.57 (m, 1H), 4.01-3.77 (m, 2H), 3.53 (s, 3H), 2.94-2.76 (m, 2H), 2.68-2.47 (m, 2H), 2.28-2.10 (m, 2H), 2.05-1.86 (m, 2H) | ¹³C NMR (Chloroform-d) δ 162.42, 159.55 (d, J = 251.6 Hz), 156.37, 152.92, 152.64 (d, J = 249.0 Hz), 147.33, 137.22, 136.88 (d, J = 9.4 Hz), 132.34 (d, J = 5.2 Hz), 131.33 (d, J = 9.2 Hz), 128.11, 125.74 (d, J = 3.5 Hz), 124.85 (d, J = 21.5 Hz), 121.06, 114.60 (d, J = 21.8 Hz), 111.59 (t, J = 237.7 Hz), 107.68 (d, J = 17.9 Hz), 104.07, 75.31, 58.81, 47.16, 46.30, 42.86, 30.94, 28.37 |
| 27 | ¹H NMR (Chloroform-d) δ 8.82 (s, 1H), 7.94 (dd, J = 5.0, 1.4 Hz, 1H), 7.40-7.31 (m, 2H), 7.25 (dt, J = 8.2, 0.9 Hz, 1H), 7.13-7.04 (m, 1H), 6.90 (t, J = 54.1 Hz, 1H), 6.76 (dd, J = 7.1, 5.0 Hz, 1H), 6.51-6.36 (m, 1H), 5.23-5.06 (m, 1H), 4.74-4.58 (m, 1H), 3.96-3.74 (m, 2H), 2.96-2.72 (m, 2H), 2.68-2.40 (m, 2H), 2.13 (s, 3H), 2.10-1.99 (m, 2H), 1.93-1.74 (m, 2H) | ¹³C NMR (Chloroform-d) δ 162.45, 161.17, 159.56 (d, J = 251.7 Hz), 152.82, 143.91, 138.59, 137.29, 132.36 (d, J = 5.4 Hz), 131.28 (d, J = 9.1 Hz), 125.72 (d, J = 3.4 Hz), 124.91 (d, J = 20.3 Hz), 121.09, 116.48, 114.59 (d, J = 21.8 Hz), 111.53 (t, J = 237.6 Hz), 69.12, 58.79, 47.21, 46.59, 42.80, 31.02, 15.89 |
| 28 | ¹H NMR (Chloroform-d) δ 8.80 (s, 1H), 8.30 (d, J = 0.9 Hz, 2H), 7.35 (td, J = 8.2, 5.9 Hz, 1H), 7.24 (dt, J = 8.1, 0.9 Hz, 1H), 7.07 (td, J = 8.5, 1.0 Hz, 1H), 6.95 (t, J = 54.1 Hz, 1H), 6.46 (t, J = 5.3 Hz, 1H), 4.97 (tt, J = 8.2, 4.0 Hz, 1H), 4.65 (t, J = 7.0 Hz, 1H), 3.96-3.75 (m, 2H), 2.99-2.81 (m, 2H), 2.55-2.41 (m, 2H), 2.22 (s, 3H), 2.07 (d, J = 11.1 Hz, 2H), 1.99-1.81 (m, 2H) | ¹³C NMR (Chloroform-d) δ 163.07, 162.40, 159.55 (d, J = 251.6 Hz), 159.13, 152.83, 147.24 (t, J = 25.6 Hz), 136.88, 132.34 (d, J = 5.4 Hz), 131.28 (d, J = 9.1 Hz), 125.73 (d, J = 3.6 Hz), 124.90 (d, J = 21.3 Hz), 123.59, 114.59 (d, J = 22.0 Hz), 111.54 (t, J = 237.6 Hz), 71.76, 58.59, 47.52, 46.23, 42.84, 30.98, 30.86, 14.57 |
| 29 | ¹H NMR (Chloroform-d) δ 8.81 (s, 1H), 7.34 (td, J = 8.2, 5.9 Hz, 1H), 7.27-7.23 (m, 1H), 7.21 (d, J = 9.1 Hz, 1H), 7.09-7.03 (m, 1H), 7.12-6.77 (m, 1H), 6.82 (d, J = 9.0 Hz, 1H), 6.50-6.42 (m, 1H), 5.28 (tt, J = 7.9, 3.9 Hz, 1H), 4.63 (t, J = 6.9 Hz, 1H), 3.89-3.81 (m, 2H), 2.93-2.77 (m, 2H), 2.59 (s, 3H), 2.51 (td, J = 8.6, 4.4 Hz, | ¹³C NMR (Chloroform-d) δ 162.90, 162.40, 159.54 (d, J = 251.6 Hz), 154.96, 152.89, 147.21 (t, J = 25.6 Hz), 137.30, 132.34 (d, J = 5.2 Hz), 131.26 (d, J = 9.1 Hz), 130.00, 125.71 (d, J = 3.6 Hz), 124.92 (d, J = 21.5 Hz), 117.81, 114.57 (d, J = 21.9 Hz), 111.50 (t, J = 237.4 |

| Example | ¹H-NMR 400 | ¹³C-NMR 101 |
|---|---|---|
| | 2H), 2.23-2.07 (m, 2H), 1.99-1.79 (m, 2H) | Hz), 71.29, 58.73, 47.49, 46.48, 42.90, 30.92, 30.82, 21.43 |
| 30 | ¹H NMR (Chloroform-d) δ 8.81 (s, 1H), 7.94 (d, J = 3.1 Hz, 1H), 7.40-7.29 (m, 2H), 7.25 (dt, J = 8.1, 0.9 Hz, 1H), 7.08 (td, J = 8.5, 1.0 Hz, 1H), 6.96 (t, J = 54.1 Hz, 1H), 6.66 (dd, J = 9.0, 3.8 Hz, 1H), 6.42 (m, 1H), 4.96 (tt, J = 8.1, 3.9 Hz, 1H), 4.64 (t, J = 7.0 Hz, 1H), 3.94-3.76 (m, 2H), 2.85 (td, J = 11.3, 4.9 Hz, 2H), 2.48 (qd, J = 8.6, 4.2 Hz, 2H), 2.06 (d, J = 3.4 Hz, 2H), 1.92-1.71 (m, 2H) | ¹³C NMR (Chloroform-d) δ 162.39, 159.55 (d, J = 251.6 Hz), 159.20-158.68 (m), 155.18 (d, J = 245.4 Hz), 152.84, 147.24 (t, J = 25.7 Hz), 137.12, 133.16, 132.34 (d, J = 5.2 Hz), 131.28 (d, J = 9.2 Hz), 126.62 (d, J = 21.2 Hz), 125.72 (d, J = 3.5 Hz), 124.90 (d, J = 21.4 Hz), 114.59 (d, J = 21.9 Hz), 112.12 (d, J = 4.5 Hz), 111.52 (t, J = 237.6 Hz), 70.49, 58.68, 47.73, 46.36, 42.86, 31.09, 31.00 |
| 31 | ¹H NMR (Chloroform-d) δ 8.83 (s, 1H), 8.47 (d, J = 2.4 Hz, 1H), 7.36 (td, J = 8.2, 5.9 Hz, 1H), 7.25 (dt, J = 8.1, 0.9 Hz, 1H), 7.08 (td, J = 8.5, 1.0 Hz, 1H), 6.90 (t, J = 54.1 Hz, 1H), 6.39-6.31 (m, 1H), 6.25 (s, 1H), 5.25-5.08 (m, 1H), 4.73-4.58 (m, 1H), 3.94 3.77 (m, 2H), 2.96-2.78 (m, 2H), 2.61-2.41 (m, 2H), 2.17-2.00 (m, 2H), 1.97-1.75 (m, 2H) | ¹³C NMR (Chloroform-d) δ 171.87, 171.11 (d, J = 248.3 Hz), 162.40, 159.54 (d, J = 251.6 Hz), 158.11 (d, J = 17.6 Hz), 152.91, 136.96, 132.33 (d, J = 5.4 Hz), 131.34 (d, J = 9.4 Hz), 125.75 (d, J = 3.6 Hz), 114.60 (d, J = 21.9 Hz), 114.13-108.96 (m), 92.23 (d, J = 33.6 Hz), 72.64, 58.74, 47.43, 46.26, 42.84, 30.81 |
| 32 | ¹H NMR (Chloroform-d) δ 8.82 (s, 1H), 7.35 (td, J = 8.3, 6.0 Hz, 1H), 7.25 (dt, J = 8.1, 0.9 Hz, 1H), 7.16-6.81 (m, 4H), 6.46-6.32 (m, 1H), 5.33-5.16 (m, 1H), 4.70-4.60 (m, 1H), 3.94-3.76 (m, 2H), 2.95-2.75 (m, 2H), 2.63-2.41 (m, 2H), 2.26-2.08 (m, 2H), 1.99-1.76 (m, 2H) | ¹³C NMR (Chloroform-d) δ 163.24, 163.01 (d, J = 237.8 Hz), 162.40, 159.55 (d, J = 251.7 Hz), 152.93, 137.16, 132.34 (d, J = 5.4 Hz), 131.31 (d, J = 9.2 Hz), 125.73 (d, J = 3.6 Hz), 124.87 (d, J = 20.3 Hz), 123.55 (d, J = 7.6 Hz), 119.24 (d, J = 37.5 Hz), 114.59 (d, J = 21.9 Hz), 111.55 (t, J = 237.7 Hz), 72.35, 58.75, 47.39, 46.39, 42.85, 30.76, 30.65 |
| 33 | ¹H NMR (Chloroform-d) δ 8.83 (s, 1H), 8.09 (d, J = 4.0 Hz, 1H), 7.95 (d, J = 8.2 Hz, 1H), 7.36 (td, J = 8.3, 6.0 Hz, 1H), 7.25 (dt, J = 8.1, 0.9 Hz, 1H), 7.08 (td, J = 8.6, 1.1 Hz, 1H), 6.90 (t, J = 54.2 Hz, 1H), 6.43-6.29 (m, 1H), 5.08-4.92 (m, 1H), 4.74-4.60 (m, 1H), 3.95-3.75 (m, 2H), 3.02-2.73 (m, 2H), 2.61-2.42 (m, 2H), 2.17-2.00 (m, 2H), 1.97-1.78 (m, 2H) | ¹³C NMR (Chloroform-d) δ 162.41, 159.54 (d, J = 251.7 Hz), 158.31 (d, J = 256.2 Hz), 157.76 (d, J = 7.4 Hz), 152.92, 147.62-147.14 (m), 136.94, 132.33 (d, J = 5.2 Hz), 131.93 (d, J = 4.6 Hz), 131.34 (d, J = 9.4 Hz), 125.75 (d, J = 3.4 Hz), 124.84 (d, J = 22.8 Hz), 122.18 (d, J = 35.1 Hz), 114.60 (d, J = 21.9 Hz), 111.60 (t, J = 237.8 Hz), 72.06, 58.73, 47.34, 46.21, 42.83, 30.75, 30.67 |
| 34 | ¹H NMR (Chloroform-d) δ 8.83 (s, 1H), 7.90 (t, J = 3.0 Hz, 1H), 7.67 (t, J = 2.5 Hz, 1H), 7.36 (td, J = 8.3, 6.0 Hz, 1H), 7.25 (dt, J = 8.1, 0.9 Hz, 1H), 7.14-7.05 (m, 1H), 6.90 (t, J = 54.1 Hz, 1H), 6.47-6.33 (m, 1H), 5.24-5.02 (m, 1H), 4.79-4.60 (m, 1H), 4.00-3.72 (m, 2H), 3.07-2.80 (m, 2H), 2.64-2.35 (m, 2H), 2.24-2.06 (m, 2H), 2.02-1.81 (m, 2H) | ¹³C NMR (Chloroform-d) δ 162.46, 159.54 (d, J = 251.6 Hz), 152.96, 149.44 (d, J = 256.0 Hz), 148.75 (d, J = 30.1 Hz), 146.20-145.34 (m), 137.47 (d, J = 5.3 Hz), 136.96, 132.32 (d, J = 5.2 Hz), 131.76 (d, J = 5.2 Hz), 131.35 (d, J = 9.2 Hz), 125.75 (d, J = 3.5 Hz), 124.81 (d, J = 22.2 Hz), 114.61 (d, J = 21.8 Hz), 111.59 (t, J = 237.6 Hz), 72.24, 58.69, 47.75, 46.20, 42.80, 30.77, 30.62 |
| 35 | ¹H NMR (Chloroform-d) δ 8.83 (s, 1H), 8.29 (dd, J = 5.7, 2.2 Hz, 1H), 7.36 (td, J = 8.2, 5.9 Hz, 1H), 7.26 (d, J = 8.1 Hz, 1H), 7.13-7.04 (m, 1H), 6.97 (t, J = 54.1 Hz, 1H), 6.61 (dd, J = 5.7, 3.3 Hz, 1H), 6.38-6.27 (m, 1H), 5.24-5.05 (m, 1H), 4.66 (t, J = 6.9 Hz, 1H), 3.97-3.77 (m, 2H), 2.95-2.76 (m, 2H), 2.63-2.44 (m, 2H), 2.21-1.99 (m, 2H), 1.98-1.73 (m, 2H) | |
| 36 | ¹H NMR (Chloroform-d) δ 8.82 (s, 1H), 8.31 (dd, J = 5.0, 2.0 Hz, 1H), 7.87 (dd, J = 7.5, 2.0 Hz, 1H), 7.36 (td, | ¹³C NMR (Chloroform-d) δ 163.12, 162.47, 159.54 (d, J = 251.3 Hz), 152.92, 151.21, |

-continued

| Example | ¹H-NMR 400 | ¹³C-NMR 101 |
|---|---|---|
|  | J = 8.2, 5.9 Hz, 1H), 7.26 (dt, J = 8.1, 0.9 Hz, 1H), 7.09 (td, J = 8.5, 1.0 Hz, 1H), 7.14-6.79 (m, 2H), 6.50-6.35 (m, 1H), 5.28-5.09 (m, 1H), 4.76-4.60 (m, 1H), 3.96-3.74 (m, 2H), 3.08-2.93 (m, 1H), 2.93-2.81 (m, 1H), 2.60-2.42 (m, 2H), 2.18-2.02 (m, 2H), 2.00-1.82 (m, 2H) | 147.66-146.93 (m), 143.06, 137.03, 132.32 (d, J = 5.2 Hz), 131.34 (d, J = 9.2 Hz), 125.76 (d, J = 3.5 Hz), 124.87 (d, J = 23.2 Hz), 116.38, 115.09, 114.63 (d, J = 21.8 Hz), 111.59 (t, J = 237.6 Hz), 97.24, 72.19, 58.63, 47.59, 46.08, 42.78, 30.92, 30.72 |
| 37 | ¹H NMR (Chloroform-d) δ 8.83 (s, 1H), 7.66 (dd, J = 8.5, 7.2 Hz, 1H), 7.35 (td, J = 8.3, 5.9 Hz, 1H), 7.28 (d, J = 7.3 Hz, 1H), 7.25 (dt, J = 8.1, 0.9 Hz, 1H), 7.08 (td, J = 8.6, 1.1 Hz, 1H), 6.95-6.88 (m, 1H), 6.90 (t, J = 54.2 Hz, 1H), 6.45-6.34 (m, 1H), 5.19-5.02 (m, 1H), 4.76-4.61 (m, 1H), 3.97-3.80 (m, 2H), 2.94-2.77 (m, 2H), 2.61-2.43 (m, 2H), 2.21-1.95 (m, 2H), 1.95-1.74 (m, 2H) | ¹³C NMR (Chloroform-d) δ 163.17, 162.42, 159.55 (d, J = 251.6 Hz), 152.92, 148.05-147.04 (m), 139.17, 137.03, 132.34 (d, J = 5.3 Hz), 131.31 (d, J = 9.2 Hz), 130.32, 125.74 (d, J = 3.4 Hz), 124.86 (d, J = 23.2 Hz), 122.08, 117.28, 116.58, 114.60 (d, J = 21.9 Hz), 111.57 (t, J = 237.7 Hz), 71.12, 58.72, 47.46, 46.30, 42.83, 30.83 (d, J = 3.4 Hz), 30.76 |
| 38 | ¹H NMR (Chloroform-d) δ 8.81 (s, 1H), 8.44 (s, 1H), 8.34 (d, J = 4.9 Hz, 1H), 7.45 (d, J = 4.8 Hz, 1H), 7.35 (td, J = 8.2, 5.9 Hz, 1H), 7.25 (d, J = 8.1 Hz, 1H), 7.11-7.03 (m, 1H), 7.10-6.80 (m, 1H), 6.40 (t, J = 5.1 Hz, 1H), 4.67 (t, J = 7.0 Hz, 1H), 4.64-4.55 (m, 1H), 3.86 (t, J = 6.0 Hz, 2H), 3.05-2.91 (m, 1H), 2.88-2.81 (m, 1H), 2.65-2.43 (m, 2H), 2.18-2.05 (m, 2H), 2.04-1.87 (m, 2H) | ¹³C NMR (Chloroform-d) δ 162.46, 159.52 (d, J = 251.6 Hz), 153.70, 152.99, 147.32 (t, J = 25.7 Hz), 142.31, 137.37, 136.91, 132.30 (d, J = 5.3 Hz), 131.35 (d, J = 9.1 Hz), 126.25, 125.76 (d, J = 3.4 Hz), 124.82 (d, J = 21.4 Hz), 114.61 (d, J = 21.9 Hz), 114.03, 111.60 (t, J = 237.5 Hz), 110.53, 74.77, 58.76, 46.54, 45.85, 42.80, 30.80, 30.56 |
| 39 | ¹H NMR (Chloroform-d) δ 8.82 (s, 1H), 7.35 (td, J = 8.2, 5.9 Hz, 1H), 7.25 (dt, J = 8.1, 0.9 Hz, 1H), 7.08 (td, J = 8.5, 1.0 Hz, 1H), 6.90 (t, J = 54.2 Hz, 1H), 6.37 (s, 1H), 6.04 (s, 1H), 5.16 (s, 1H), 4.65 (s, 1H), 3.86 (s, 2H), 2.85 (s, 2H), 2.54 (s, 3H), 2.48 (s, 2H), 2.06 (s, 2H), 1.84 (s, 2H) | ¹³C NMR (Chloroform-d) δ 171.67 (d, J = 12.6 Hz), 171.02 (d, J = 245.6 Hz), 168.65 (d, J = 17.2 Hz), 162.40, 159.55 (d, J = 251.7 Hz), 152.91, 136.99, 132.33 (d, J = 5.2 Hz), 131.34 (d, J = 9.2 Hz), 125.75 (d, J = 3.5 Hz), 124.84 (d, J = 26.1 Hz), 114.60 (d, J = 21.8 Hz), 111.59 (t, J = 237.6 Hz), 88.65 (d, J = 33.8 Hz), 72.03, 58.73, 47.47, 46.27, 42.84, 30.88, 30.83, 25.70 |
| 40 | ¹H NMR (Chloroform-d) δ 8.82 (s, 1H), 8.30 (d, J = 2.2 Hz, 1H), 7.35 (td, J = 8.2, 5.9 Hz, 1H), 7.25 (dt, J = 8.1, 0.9 Hz, 1H), 7.08 (td, J = 8.6, 1.1 Hz, 1H), 6.90 (t, J = 54.1 Hz, 1H), 6.40-6.31 (m, 1H), 5.27-5.09 (m, 1H), 4.74-4.59 (m, 1H), 3.99-3.78 (m, 2H), 2.95-2.75 (m, 2H), 2.61-2.41 (m, 2H), 2.16-1.98 (m, 2H), 2.05 (d, J = 0.8 Hz, 3H), 1.96-1.77 (m, 2H) | ¹³C NMR (Chloroform-d) δ 169.58 (d, J = 11.1 Hz), 168.65 (d, J = 245.4 Hz), 162.41, 159.54 (d, J = 251.6 Hz), 154.43 (d, J = 18.1 Hz), 152.88, 147.86-146.88 (m), 137.14, 132.34 (d, J = 5.3 Hz), 131.33 (d, J = 9.2 Hz), 125.74 (d, J = 3.6 Hz), 124.85 (d, J = 22.1 Hz), 114.59 (d, J = 21.9 Hz), 111.58 (t, J = 237.7 Hz), 102.06 (d, J = 29.5 Hz), 72.27, 58.81, 47.31, 46.38, 42.84, 30.89, 30.85, 6.85 |
| 41 | ¹H NMR (Chloroform-d) δ 8.83 (s, 1H), 7.41 (t, J = 7.7 Hz, 1H), 7.37-7.32 (m, 1H), 7.25 (d, J = 8.1 Hz, 1H), 7.08 (td, J = 8.5, 1.1 Hz, 1H), 6.98 (t, J = 55.3 Hz, 1H), 6.74 (d, J = 7.4 Hz, 1H), 6.46-6.43 (m, 1H), 6.41 (d, J = 8.1 Hz, 1H), 5.06-4.89 (m, 1H), 4.70-4.59 (m, 1H), 3.90-3.77 (m, 2H), 2.96-2.73 (m, 2H), 2.55-2.35 (m, 2H), 2.14-2.00 (m, 2H), 1.93 (ddd, J = 13.1, 7.9, 4.9 Hz, 1H), 1.87-1.68 (m, 2H), 0.92 (ddd, J = 12.3, 6.2, 2.7 Hz, 4H) |  |
| 42 | ¹H NMR (Chloroform-d) δ 8.83 (s, 1H), 8.75 (d, J = 4.9 Hz, 1H), 7.36 (td, J = 8.2, 6.0 Hz, 1H), 7.28-7.23 (m, 2H), 7.08 (td, J = 8.6, 1.0 Hz, 1H), 6.96 (t, J = 54.2 Hz, 1H), 6.52-6.30 (m, 1H), 5.19-4.98 (m, 1H), 4.82-4.62 (m, 1H), 3.98-3.77 (m, 2H), 3.09-2.80 | ¹³C NMR (Chloroform-d) δ 164.76, 162.44, 162.00, 159.55 (d, J = 251.6 Hz), 157.79 (d, J = 36.5 Hz), 153.52-152.29 (m), 132.33 (d, J = 5.3 Hz), 131.35 (d, J = 9.2 Hz), 125.76 (d, J = 3.5 Hz), 124.81 (d, J = 22.4 |

-continued

| Example | ¹H-NMR 400 | ¹³C-NMR 101 |
|---|---|---|
|  | (m, 2H), 2.64-2.39 (m, 2H), 2.22-2.08 (m, 2H), 2.05-1.86 (m, 2H) | Hz), 120.05 (d, J = 275.1 Hz), 114.61 (d, J = 21.9 Hz), 111.60 (t, J = 237.7 Hz), 110.33, 73.39, 58.65, 47.47, 46.20, 42.79, 30.74, 30.56 |
| 43 | ¹H NMR (Chloroform-d) δ 8.84 (s, 1H), 8.83 (s, 1H), 7.36 (td, J = 8.3, 6.0 Hz, 1H), 7.25 (dt, J = 8.1, 0.9 Hz, 1H), 7.08 (td, J = 8.5, 1.0 Hz, 1H), 7.04 (s, 1H), 6.90 (t, 1H), 6.41-6.29 (m, 1H), 5.37-5.15 (m, 1H), 4.79-4.61 (m, 1H), 3.97-3.77 (m, 2H), 2.96-2.75 (m, 2H), 2.62-2.44 (m, 2H), 2.22-2.02 (m, 2H), 2.02-1.78 (m, 2H) | ¹³C NMR (Chloroform-d) δ 169.47, 162.40, 159.54 (d, J = 251.5 Hz), 159.05, 152.93, 148.15-146.68 (m), 136.91, 132.33 (d, J = 5.3 Hz), 131.35 (d, J = 9.3 Hz), 125.76 (d, J = 3.4 Hz), 124.81 (d, J = 22.0 Hz), 120.40 (d, J = 274.5 Hz), 114.60 (d, J = 21.8 Hz), 111.61 (t, J = 237.5 Hz), 105.99 (q, J = 3.6, 2.8 Hz), 72.62, 58.78, 47.32, 46.29, 42.84, 30.63 |
| 44 | ¹H NMR (Chloroform-d) δ 8.82 (s, 1H), 8.01 (d, J = 4.0 Hz, 1H), 7.92 (d, J = 2.3 Hz, 1H), 7.35 (td, J = 8.2, 5.9 Hz, 1H), 7.30 (d, J = 4.8 Hz, 1H), 7.25 (dt, J = 8.1, 0.9 Hz, 1H), 7.08 (td, J = 8.5, 1.0 Hz, 1H), 6.97 (t, J = 54.2 Hz, 1H), 6.74-6.72 (m, 1H), 6.45-6.37 (m, 1H), 5.33-5.20 (m, 1H), 4.73-4.60 (m, 1H), 3.96-3.78 (m, 2H), 3.00-2.79 (m, 2H), 2.66-2.43 (m, 2H), 2.23-2.07 (m, 2H), 2.04-1.81 (m, 2H) | ¹³C NMR (Chloroform-d) δ 162.41, 160.81, 157.03 (d, J = 256.4 Hz), 152.89, 147.82 - 146.51 (m), 140.87, 137.18, 132.35 (d, J = 5.3 Hz), 131.32 (d, J = 8.8 Hz), 128.74, 126.03-125.43 (m), 124.88 (d, J = 24.2 Hz), 116.98, 114.60 (d, J = 21.8 Hz), 111.58 (t, J = 237.6 Hz), 98.22, 71.35, 58.75, 47.72, 46.41, 42.86, 30.90 |
| 45 | ¹H NMR (Chloroform-d) δ 9.03 (s, 1H), 8.93 (s, 1H), 8.85 (s, 1H), 7.42-7.32 (m, 2H), 7.27 (d, J = 9.1 Hz, 1H), 7.10 (td, J = 8.5, 1.1 Hz, 1H), 6.99 (t, J = 54.2 Hz, 1H), 6.23 (t, J = 5.5 Hz, 1H), 4.71 (t, J = 6.9 Hz, 2H), 4.02-3.77 (m, 2H), 3.09-2.85 (m, 2H), 2.72-2.51 (m, 2H), 2.38-2.18 (m, 2H), 2.18-1.94 (m, 2H) |  |
| 46 | ¹H NMR (Chloroform-d) δ 8.85 (s, 1H), 8.82 (s, 1H), 7.69 (d, J = 4.7 Hz, 1H), 7.42-7.33 (m, 2H), 7.26 (dt, J = 8.1, 0.9 Hz, 1H), 7.10 (td, J = 8.5, 1.0 Hz, 1H), 6.97 (t, J = 54.2 Hz, 1H), 6.47 (t, 1H), 5.38-5.27 (m, 1H), 4.71 (t, J = 7.0 Hz, 1H), 3.97-3.77 (m, 2H), 3.14-3.01 (m, 2H), 3.00-2.89 (m, 1H), 2.51 (dt, J = 22.2, 10.4 Hz, 2H), 2.29-2.16 (m, 2H), 2.14-1.92 (m, 2H) | ¹³C NMR (Chloroform-d) δ 162.46, 159.55 (d, J = 251.6 Hz), 153.12, 152.95, 152.92, 147.07, 139.60, 136.95, 136.82, 132.32 (d, J = 5.5 Hz), 131.36 (d, J = 9.1 Hz), 127.80, 125.91-125.44 (m), 124.89 (d, J = 8.3 Hz), 114.65 (d, J = 22.1 Hz), 113.31-108.96 (m), 73.22, 58.51, 48.31, 45.94, 42.83, 30.88, 30.72 |
| 47 | ¹H NMR (Chloroform-d) δ 8.82 (s, 1H), 8.00 (dd, J = 4.9, 1.7 Hz, 1H), 7.62 (dd, J = 7.6, 1.7 Hz, 1H), 7.36 (td, J = 8.2, 5.9 Hz, 1H), 7.25 (dt, J = 8.1, 0.9 Hz, 1H), 7.09 (td, J = 8.5, 1.5 Hz, 1H), 7.12-6.80 (m, 1H), 6.83 (dd, J = 4.6, 3.1 Hz, 1H), 6.49-6.35 (m, 1H), 5.24-5.06 (m, 1H), 4.77-4.61 (m, 1H), 4.00-3.73 (m, 2H), 3.01-2.77 (m, 2H), 2.64-2.39 (m, 2H), 2.18-2.01 (m, 2H), 1.99-1.75 (m, 2H) | ¹³C NMR (Chloroform-d) δ 162.43, 159.55 (d, J = 251.0 Hz), 152.83, 147.76-146.60 (m), 144.58, 138.41, 137.17, 132.34 (d, J = 5.3 Hz), 131.30 (d, J = 9.1 Hz), 125.74 (d, J = 3.4 Hz), 124.90 (d, J = 21.7 Hz), 118.62, 117.24, 114.61 (d, J = 21.9 Hz), 111.55 (t, J = 237.6 Hz), 99.98, 70.98, 58.68, 47.35, 46.31, 42.79, 30.93, 30.86 |
| 48 | ¹H NMR (Chloroform-d) δ 8.98 (dd, J = 4.2, 1.7 Hz, 1H), 8.84 (s, 1H), 8.79 (d, J = 5.3 Hz, 1H), 8.37 (dd, J = 8.5, 1.7 Hz, 1H), 7.66 (dd, J = 8.5, 4.2 Hz, 1H), 7.44-7.30 (m, 1H), 7.28-7.24 (m, 1H), 7.14-7.05 (m, 1H), 6.98 (t, J = 54.2 Hz, 1H), 6.95 (d, J = 5.3 Hz, 1H), 6.50-6.31 (m, 1H), 4.73 (t, J = 7.0 Hz, 1H), 4.67-4.55 (m, 1H), 4.02-3.74 (m, 2H), 3.23-3.08 (m, 1H), 3.08-2.97 (m, 1H), 2.47 (dt, J = 30.1, 11.1 Hz, 2H), 2.34-2.22 (m, 2H), 2.21-2.01 (m, 2H) |  |
| 49 | ¹H NMR (Chloroform-d) δ 9.01 (dd, J = 4.4, 1.8 Hz, 1H), 8.82 (s, 1H), 8.53-8.45 (m, 1H), 8.16 (d, J = 6.1 Hz, 1H), 7.50-7.41 (m, 2H), 7.34 (tdd, J = 7.2, | ¹³C NMR (Chloroform-d) δ 171.16, 162.42, 159.84, 159.55 (d, J = 251.7 Hz), 154.29, 152.96, 152.88, 147.29 (t, J = 25.6 Hz), |

| Example | ¹H-NMR 400 | ¹³C-NMR 101 |
|---|---|---|
| | 5.9, 1.2 Hz, 1H), 7.27-7.21 (m, 1H), 7.10-7.04 (m, 1H), 6.97 (t, J = 54.1 Hz, 1H), 6.52-6.42 (m, 1H), 5.34 (tt, J = 7.8, 3.8 Hz, 1H), 4.66 (t, J = 6.9 Hz, 1H), 3.88 (dd, J = 6.9, 5.1 Hz, 2H), 3.02-2.84 (m, 2H), 2.69-2.51 (m, 2H), 2.28-2.08 (m, 2H), 2.04-1.87 (m, 2H) | 143.53, 137.35, 132.73, 132.35 (d, J = 5.4 Hz), 131.28 (d, J = 9.2 Hz), 125.72 (d, J = 3.4 Hz), 124.91 (d, J = 21.3 Hz), 121.66, 116.23, 115.49, 114.58 (d, J = 21.8 Hz), 111.54 (t, J = 237.5 Hz), 70.89, 58.86, 47.68, 46.59, 42.92, 30.98 |
| 50 | ¹H NMR (Chloroform-d) δ 8.82 (s, 1H), 8.68 (s, 1H), 8.59 (d, J = 6.0 Hz, 1H), 7.36 (td, J = 8.2, 5.9 Hz, 1H), 7.26 (dt, J = 8.1, 0.9 Hz, 1H), 7.09 (t, J = 8.5 Hz, 1H), 6.97 (t, J = 54.2 Hz, 1H), 6.86 (d, J = 6.0 Hz, 1H), 6.41-6.29 (m, 1H), 4.68 (t, J = 6.9 Hz, 1H), 4.62-4.48 (m, 1H), 3.87 (dd, J = 6.9, 5.2 Hz, 2H), 3.07-2.92 (m, 1H), 2.92-2.80 (m, 1H), 2.67-2.41 (m, 2H), 2.17-2.04 (m, 2H), 2.04-1.87 (m, 2H) | ¹³C NMR (Chloroform-d) δ 164.69, 162.43, 159.52 (d, J = 251.5 Hz), 154.64, 154.33, 152.99, 147.37 (t, J = 25.8 Hz), 136.87, 132.31 (d, J = 5.3 Hz), 131.38 (d, J = 9.4 Hz), 125.78 (d, J = 3.5 Hz), 124.80 (d, J = 21.5 Hz), 114.63 (d, J = 21.9 Hz), 111.65, 109.29, 114.32-100.55 (m), 74.21, 58.75, 46.70, 45.81, 42.78, 30.54, 30.32 |
| 51 | ¹H NMR (Chloroform-d) δ 8.82 (s, 1H), 8.50 (s, 1H), 7.99 (s, 1H), 7.35 (td, J = 8.2, 5.9 Hz, 1H), 7.25 (dt, J = 8.1, 0.9 Hz, 1H), 7.08 (td, J = 8.6, 1.1 Hz, 1H), 6.97 (t, J = 54.1 Hz, 1H), 6.40 (t, J = 4.8 Hz, 1H), 5.37 (tt, J = 8.3, 4.0 Hz, 1H), 4.67 (t, J = 6.9 Hz, 1H), 4.09 (s, 3H), 3.87 (dd, J = 7.0, 5.1 Hz, 2H), 3.01-2.83 (m, 2H), 2.60-2.44 (m, 2H), 2.23-2.10 (m, 2H), 2.03-1.85 (m, 2H) | ¹³C NMR (Chloroform-d) δ 163.02, 162.40, 159.55 (d, J = 251.6 Hz), 155.01, 154.81, 152.89, 147.33 (t, J = 25.8 Hz), 137.12, 132.34 (d, J = 5.3 Hz), 131.31 (d, J = 9.1 Hz), 131.03, 125.73 (d, J = 3.5 Hz), 124.87 (d, J = 21.3 Hz), 114.59 (d, J = 21.9 Hz), 111.58 (t, J = 237.5 Hz), 102.93, 72.13, 58.72, 47.90, 46.29, 42.89, 34.13, 31.02, 30.94 |
| 52 | ¹H NMR (3Chloroform-d) δ 8.82 (s, 1H), 7.44 (d, J = 4.8 Hz, 1H), 7.41-7.32 (m, 2H), 7.28-7.25 (m, 1H), 7.10 (td, J = 8.7, 0.9 Hz, 1H), 6.97 (t, J = 54.2 Hz, 1H), 6.46-6.38 (m, 1H), 5.40-5.25 (m, 1H), 4.70 (t, J = 7.1 Hz, 1H), 3.95-3.75 (m, 2H), 3.15-2.88 (m, 2H), 2.76 (s, 3H), 2.59-2.38 (m, 2H), 2.32-2.16 (m, 2H), 2.13-1.92 (m, 2H) | |
| 53 | ¹H NMR (Chloroform-d) δ 8.83 (s, 1H), 7.36 (td, J = 8.3, 6.0 Hz, 1H), 7.25 (dt, J = 8.1, 0.9 Hz, 1H), 7.09 (td, J = 8.5, 1.0 Hz, 1H), 6.90 (t, J = 54.2 Hz, 1H), 6.36-6.21 (m, 1H), 4.74-4.62 (m, 1H), 4.33-4.19 (m, 1H), 3.95-3.79 (m, 2H), 2.99-2.84 (m, 2H), 2.58-2.42 (m, 2H), 2.49 (s, 3H), 2.27-2.10 (m, 2H), 2.09-1.95 (m, 2H) | ¹³C NMR (Chloroform-d) δ 189.31, 166.68, 162.44, 159.51 (d, J = 251.5 Hz), 153.04, 136.65, 132.29 (d, J = 5.3 Hz), 131.41 (d, J = 9.1 Hz), 125.77, 124.75 (d, J = 21.9 Hz), 114.63 (d, J = 21.8 Hz), 112.35, 114.23-109.03 (m), 93.39, 83.61, 58.71, 46.88, 45.74, 42.77, 30.81, 30.68, 19.20 |
| 54 | ¹H NMR (Chloroform-d) δ 8.83 (s, 1H), 7.36 (td, J = 8.2, 5.9 Hz, 1H), 7.26 (d, J = 8.1 Hz, 1H), 7.09 (td, J = 8.6, 1.1 Hz, 1H), 6.97 (t, J = 54.2 Hz, 1H), 6.45 (d, J = 3.2 Hz, 1H), 6.33 (t, J = 4.1 Hz, 1H), 5.13 (tt, J = 7.4, 4.0 Hz, 1H), 4.65 (t, J = 7.0 Hz, 1H), 3.99-3.78 (m, 2H), 2.98-2.69 (m, 2H), 2.65-2.46 (m, 2H), 2.43 (s, 3H), 2.20-1.96 (m, 2H), 1.96-1.75 (m, 2H) | |
| 55 | ¹H NMR (Chloroform-d) δ 8.82 (s, 1H), 8.07 (dd, J = 2.0, 1.0 Hz, 1H), 7.35 (td, J = 8.3, 5.9 Hz, 1H), 7.25 (dt, J = 8.2, 0.9 Hz, 1H), 7.08 (t, J = 8.5 Hz, 1H), 7.11-6.80 (m, 1H), 6.36 (t, J = 4.0 Hz, 1H), 5.17 (tt, J = 7.8, 3.8 Hz, 1H), 4.65 (t, J = 6.9 Hz, 1H), 3.86 (dd, J = 6.9, 5.2 Hz, 2H), 2.92-2.76 (m, 2H), 2.66-2.48 (m, 2H), 2.20-2.00 (m, 5H), 1.97-1.77 (m, 2H) | ¹³C NMR (Chloroform-d) δ 169.66 (d, J = 13.6 Hz), 162.39, 160.94 (d, J = 215.7 Hz), 159.54 (d, J = 251.7 Hz), 158.10 (d, J = 13.3 Hz), 152.88, 147.35 (t, J = 25.7 Hz), 137.11, 132.34 (d, J = 5.3 Hz), 131.31 (d, J = 9.2 Hz), 125.73 (d, J = 3.5 Hz), 124.87 (d, J = 21.4 Hz), 115.82 (d, J = 5.8 Hz), 114.59 (d, J = 21.9 Hz), 111.58 (t, J = 237.5 Hz), 72.19, 58.82, 47.21, 46.30, 42.87, 30.74, 30.68, 11.97 (d, J = 1.8 Hz) |
| 56 | ¹H NMR (Chloroform-d) δ 8.82 (s, 1H), 8.36 (s, 1H), 7.36 (td, J = 8.3, 6.0 Hz, 1H), 7.25 (dt, J = 8.2, 0.9 Hz, 1H), 7.08 (td, J = 8.6, 1.0 Hz, 1H), 6.90 (t, J = 54.1 Hz, 1H), 6.44-6.30 (m, 1H), 5.26-5.08 (m, 1H), 4.75-4.61 (m, | ¹³C NMR (101 MHz, Chloroform-d) δ 162.42, 159.54 (d, J = 251.7 Hz), 157.12, 152.89, 151.76 (d, J = 11.1 Hz), 147.79-146.98 (m), 144.70 (d, J = 262.3 Hz), 137.03, 132.32 |

| Example | ¹H-NMR 400 | ¹³C-NMR 101 |
|---|---|---|
| | 1H), 3.96-3.78 (m, 2H), 2.99-2.79 (m, 2H), 2.58-2.40 (m, 2H), 2.46 (d, J = 2.9 Hz, 3H), 2.22-2.01 (m, 2H), 2.00-1.80 (m, 2H) | (d, J = 5.4 Hz), 131.34 (d, J = 9.3 Hz), 125.75 (d, J = 3.4 Hz), 124.84 (d, J = 19.4 Hz), 114.61 (d, J = 21.9 Hz), 111.59 (t, J = 237.7 Hz), 72.35, 58.66, 47.75, 46.16, 42.83, 30.90, 30.81, 17.10 |
| 57 | ¹H NMR (Chloroform-d) δ 8.82 (s, 1H), 7.98 (dd, J = 4.9, 1.7 Hz, 1H), 7.46-7.32 (m, 2H), 7.28-7.24 (m, 1H), 7.09 (td, J = 8.5, 1.1 Hz, 1H), 6.97 (t, J = 54.1 Hz, 1H), 6.88 (dd, J = 7.7, 4.9 Hz, 1H), 6.54 (t, J = 74.6 Hz, 1H), 6.45-6.35 (m, 1H), 5.16 (dt, J = 7.9, 4.0 Hz, 1H), 4.66 (t, J = 7.0 Hz, 1H), 3.99-3.74 (m, 2H), 2.97-2.74 (m, 2H), 2.59-2.41 (m, 2H), 2.20-2.03 (m, 2H), 2.00-1.80 (m, 2H) | |
| 58 | ¹H NMR (Chloroform-d) δ 8.89-8.79 (m, 2H), 8.33 (d, J = 2.6 Hz, 1H), 8.09 (s, 1H), 7.79 (dd, J = 1.7, 0.7 Hz, 1H), 7.36 (td, J = 8.3, 5.9 Hz, 1H), 7.26 (d, J = 8.1 Hz, 1H), 7.11-7.06 (m, 1H), 6.99 (t, J = 54.3 Hz, 1H), 6.53-6.49 (m, 1H), 6.42-6.33 (m, 1H), 5.19-5.01 (m, 1H), 4.78-4.57 (m, 1H), 3.99-3.76 (m, 2H), 3.00-2.75 (m, 2H), 2.61-2.43 (m, 2H), 2.22-2.09 (m, 2H), 2.01-1.83 (m, 2H) | |
| 59 | ¹H NMR (Chloroform-d) δ 8.82 (s, 1H), 8.27 (dd, J = 4.7, 1.6 Hz, 1H), 7.84 (dd, J = 7.6, 1.2 Hz, 1H), 7.35 (td, J = 8.2, 5.9 Hz, 1H), 7.25 (dt, J = 8.1, 0.9 Hz, 1H), 7.08 (td, J = 8.5, 1.1 Hz, 1H), 6.96 (t, J = 54.2 Hz, 1H), 6.94 (dd, J = 8.0, 5.6 Hz, 1H), 6.50-6.35 (m, 1H), 5.33-5.22 (m, 1H), 4.74-4.60 (m, 1H), 3.97-3.76 (m, 2H), 2.92-2.70 (m, 2H), 2.63-2.49 (m, 2H), 2.12-1.82 (m, 4H) | ¹³C NMR (Chloroform-d) δ 162.45, 159.72, 159.55 (d, J = 251.6 Hz), 152.83, 150.39, 147.80-146.85 (m), 137.12, 136.44 (q, J = 4.7 Hz), 132.34 (d, J = 5.3 Hz), 131.28 (d, J = 9.1 Hz), 125.72 (d, J = 3.4 Hz), 124.91 (d, J = 21.2 Hz), 127.07-118.54 (m), 115.78, 114.97-114.29 (m), 113.57 (q, J = 32.9 Hz), 111.55 (t, J = 237.6 Hz), 70.43, 58.80, 46.39, 46.11, 42.75, 30.62, 30.56 |
| 60 | ¹H NMR (Chloroform-d) δ 8.83 (s, 1H), 7.70 (t, J = 7.8 Hz, 1H), 7.35 (td, J = 8.3, 5.9 Hz, 1H), 7.27-7.21 (m, 2H), 7.08 (td, J = 8.6, 1.1 Hz, 1H), 6.90 (t, J = 54.1 Hz, 1H), 6.86 (d, J = 8.4 Hz, 1H), 6.54-6.31 (m, 1H), 5.21-5.02 (m, 1H), 4.75-4.57 (m, 1H), 3.96-3.73 (m, 2H), 2.97-2.76 (m, 2H), 2.63-2.40 (m, 2H), 2.18-2.00 (m, 2H), 1.96-1.75 (m, 2H) | ¹³C NMR (Chloroform-d) δ 162.88, 162.42, 159.56 (d, J = 251.7 Hz), 152.90, 145.59, 145.24, 139.46, 137.11 (d, J = 5.0 Hz), 132.35 (d, J = 5.3 Hz), 131.31 (d, J = 9.4 Hz), 125.74 (d, J = 3.4 Hz), 124.68, 125.29-117.39 (m), 115.01, 114.60 (d, J = 21.9 Hz), 113.07, 114.08-108.86 (m), 70.73, 58.72, 47.41, 46.39, 42.82, 30.81 |
| 61 | ¹H NMR (Chloroform-d) δ 8.84 (s, 1H), 8.53 (d, J = 5.7 Hz, 1H), 7.37 (td, J = 8.2, 5.9 Hz, 1H), 7.26 (dt, J = 8.2, 1.0 Hz, 1H), 7.15 (s, 1H), 7.09 (td, J = 8.5, 1.1 Hz, 1H), 7.15-6.78 (m, 1H), 6.92 (dd, J = 5.8, 2.5 Hz, 1H), 6.29 (t, J = 4.3 Hz, 1H), 4.67 (t, J = 7.0 Hz, 1H), 4.48 (dt, J = 7.5, 3.8 Hz, 1H), 3.94-3.82 (m, 2H), 2.95-2.77 (m, 2H), 2.63-2.45 (m, 2H), 2.15-2.01 (m, 2H), 1.97-1.80 (m, 2H) | |
| 62 | ¹H NMR (Chloroform-d) δ 8.84 (s, 1H), 7.36 (td, J = 8.2, 5.9 Hz, 1H), 7.26 (d, J = 8.1 Hz, 1H), 7.09 (td, J = 8.5, 1.0 Hz, 1H), 6.98 (t, J = 54.2 Hz, 1H), 6.45 (s, 1H), 6.37-6.24 (m, 1H), 4.76-4.60 (m, 2H), 3.89 (s, 2H), 2.85 (d, J = 13.4 Hz, 2H), 2.69-2.55 (m, 2H), 2.61 (s, 3H), 2.48 (s, 3H), 2.19-1.91 (m, 4H) | |
| 63 | ¹H NMR (Chloroform-d) δ 8.83 (s, 1H), 8.20 (d, J = 5.7 Hz, 1H), 7.35 (td, J = 8.2, 5.9 Hz, 1H), 7.25 (dt, J = 8.1, 0.9 Hz, 1H), 7.08 (td, J = 8.5, 0.9 Hz, 1H), 7.12-6.80 (m, 1H), 6.43-6.29 | |

| Example | ¹H-NMR 400 | ¹³C-NMR 101 |
|---|---|---|
| | (m, 1H), 6.33 (d, J = 5.7 Hz, 1H), 5.23-5.09 (m, 1H), 4.72-4.58 (m, 1H), 3.97 (s, 3H), 3.90-3.76 (m, 2H), 2.97-2.71 (m, 2H), 2.59-2.39 (m, 2H), 2.19-1.98 (m, 2H), 1.96-1.71 (m, 2H) | |
| 64 | ¹H NMR (Chloroform-d) δ 8.81 (s, 1H), 8.14 (d, J = 5.7 Hz, 1H), 7.35 (td, J = 8.2, 5.9 Hz, 1H), 7.25 (dt, J = 8.1, 0.9 Hz, 1H), 7.08 (td, J = 8.6, 1.0 Hz, 1H), 6.95 (t, J = 54.2 Hz, 1H), 6.45 (t, J = 4.0 Hz, 1H), 6.35 (d, J = 5.7 Hz, 1H), 4.98 (tt, J = 8.7, 4.1 Hz, 1H), 4.66 (t, J = 7.1 Hz, 1H), 3.95 (s, 3H), 3.91-3.73 (m, 2H), 3.04-2.84 (m, 2H), 2.57-2.35 (m, 2H), 2.22-2.05 (m, 2H), 1.98-1.80 (m, 2H) | ¹³C NMR (Chloroform-d) δ 171.53, 164.35, 162.39, 159.54 (d, J = 252.1 Hz), 158.29, 152.84, 147.26 (t, J = 25.6 Hz), 136.85, 132.33 (d, J = 5.4 Hz), 131.30 (d, J = 9.2 Hz), 125.75 (d, J = 3.6 Hz), 124.87 (d, J = 21.3 Hz), 114.60 (d, J = 21.8 Hz), 114.05-108.79 (m), 101.97, 72.40, 58.51, 53.77, 48.17, 46.13, 42.86, 31.11, 30.98 |
| 65 | ¹H NMR (Chloroform-d) δ 8.82 (s, 1H), 8.40 (d, J = 0.8 Hz, 1H), 7.36 (td, J = 8.2, 5.9 Hz, 1H), 7.26 (dd, J = 8.1, 1.0 Hz, 1H), 7.09 (td, J = 8.5, 1.1 Hz, 1H), 6.96 (t, J = 54.2 Hz, 1H), 6.44-6.33 (m, 1H), 6.01 (d, J = 0.9 Hz, 1H), 5.07 (tt, J = 8.1, 4.0 Hz, 1H), 4.65 (t, J = 7.0 Hz, 1H), 3.95 (s, 3H), 3.89-3.80 (m, 2H), 2.96-2.76 (m, 2H), 2.58-2.40 (m, 2H), 2.15-2.00 (m, 2H), 1.93-1.71 (m, 2H) | |
| 66 | ¹H NMR (Chloroform-d) δ 8.81 (s, 1H), 7.60-7.48 (m, 2H), 7.36 (td, J = 8.3, 5.9 Hz, 1H), 7.26 (dt, J = 8.1, 0.9 Hz, 1H), 7.09 (td, J = 8.5, 1.1 Hz, 1H), 6.97 (t, J = 54.1 Hz, 1H), 6.43 (s, 1H), 5.25-5.13 (m, 1H), 5.09-4.97 (m, 1H), 4.67 (t, J = 6.9 Hz, 1H), 3.95-3.74 (m, 2H), 3.03-2.83 (m, 2H), 2.56-2.36 (m, 3H), 2.27-2.05 (m, 3H), 2.00-1.79 (m, 3H), 1.76-1.65 (m, 1H), 1.37-1.24 (m, 2H) | ¹³C NMR (Chloroform-d) δ 162.41, 159.54 (d, J = 251.6 Hz), 152.79, 149.75, 149.38, 147.50-147.15 (m), 136.95, 132.33 (d, J = 5.2 Hz), 131.86, 131.44, 131.31 (d, J = 9.2 Hz), 125.75 (d, J = 3.4 Hz), 124.89 (d, J = 19.3 Hz), 114.62 (d, J = 21.8 Hz), 111.55 (t, J = 237.7 Hz), 71.42, 70.67, 58.51, 48.20, 46.19, 42.81, 31.59, 30.93, 30.78, 30.60, 13.54 |
| 67 | ¹H NMR (Chloroform-d) δ 8.82 (s, 1H), 7.36 (td, J = 8.2, 5.9 Hz, 1H), 7.25 (dt, J = 8.1, 0.9 Hz, 1H), 7.12-7.05 (m, 1H), 6.90 (t, J = 54.1 Hz, 1H), 6.49-6.28 (m, 1H), 5.28-5.10 (m, 1H), 4.78-4.61 (m, 1H), 3.99-3.76 (m, 2H), 3.01-2.77 (m, 2H), 2.56-2.43 (m, 2H), 2.50 (d, J = 1.1 Hz, 3H), 2.40 (d, J = 2.9 Hz, 3H), 2.19-2.01 (m, 2H), 1.99-1.78 (m, 2H) | ¹³C NMR (Chloroform-d) δ 162.42, 161.27 (d, J = 10.1 Hz), 159.54 (d, J = 251.5 Hz), 156.61, 152.91, 152.18 (d, J = 13.2 Hz), 147.72-146.88 (m), 143.10 (d, J = 257.9 Hz), 137.01, 132.32 (d, J = 5.4 Hz), 131.33 (d, J = 9.2 Hz), 125.75 (d, J = 3.6 Hz), 124.90 (d, J = 35.0 Hz), 114.61 (d, J = 21.9 Hz), 111.58 (t, J = 237.5 Hz), 71.78, 58.64, 47.80, 46.14, 42.82, 30.92, 30.83, 25.24, 17.00 |
| 68 | ¹H NMR (Chloroform-d) δ 9.15 (d, J = 0.9 Hz, 1H), 8.82 (s, 1H), 8.26-8.11 (m, 1H), 7.94-7.82 (m, 3H), 7.35 (td, J = 8.3, 5.9 Hz, 1H), 7.25 (dt, J = 8.1, 0.9 Hz, 1H), 7.08 (td, J = 8.5, 1.0 Hz, 1H), 6.98 (t, J = 54.1 Hz, 1H), 6.45 (t, J = 4.6 Hz, 1H), 5.56 (tt, J = 7.7, 3.8 Hz, 1H), 4.67 (t, J = 6.8 Hz, 1H), 3.88 (dd, J = 6.9, 5.1 Hz, 2H), 3.02-2.82 (m, 2H), 2.70-2.51 (m, 2H), 2.39-2.15 (m, 2H), 2.13-1.89 (m, 2H) | ¹³C NMR (Chloroform-d) δ 162.43, 159.56 (d, J = 251.7 Hz), 159.56, 152.90, 147.71, 147.27 (t, J = 25.8 Hz), 137.47, 132.37 (d, J = 5.3 Hz), 132.25, 132.05, 131.27 (d, J = 9.2 Hz), 128.92, 125.82, 125.72 (d, J = 3.4 Hz), 124.93 (d, J = 21.5 Hz), 122.86, 120.14, 114.59 (d, J = 21.8 Hz), 111.54 (t, J = 237.5 Hz), 71.58, 58.85, 47.54, 46.63, 42.93, 30.93, 30.92 |
| 69 | ¹H NMR (Chloroform-d) δ 8.82 (s, 1H), 8.27 (s, 1H), 8.16 (d, J = 5.1 Hz, 1H), 7.36 (td, J = 8.2, 5.9 Hz, 1H), 7.33 (d, J = 5.1 Hz, 1H), 7.26 (dt, J = 8.1, 0.9 Hz, 1H), 7.09 (td, J = 8.5, 1.1 Hz, 1H), 6.97 (t, J = 54.2 Hz, 1H), 6.40-6.28 (m, 1H), 4.66 (t, J = 7.0 Hz, 1H), 4.47 (d, J = 3.7 Hz, 1H), 3.87 (t, J = 5.9 Hz, 2H), 2.99-2.76 (m, 2H), 2.59-2.45 (m, 2H), 2.17-1.87 (m, 4H) | |

| Example | ¹H-NMR 400 | ¹³C-NMR 101 |
|---|---|---|
| 70 | ¹H NMR (00 MHZ, Chloroform-d) δ 8.82 (s, 1H), 8.17 (d, J = 1.4 Hz, 1H), 8.10 (d, J = 2.7 Hz, 1H), 8.04 (dd, J = 2.8, 1.4 Hz, 1H), 7.35 (td, J = 8.3, 5.9 Hz, 1H), 7.25 (dt, J = 8.1, 0.9 Hz, 1H), 7.08 (td, J = 8.6, 0.8 Hz, 1H), 6.90 (t, J = 54.1 Hz, 1H), 6.41 (s, 1H), 5.15-4.95 (m, 1H), 4.76-4.58 (m, 1H), 3.97-3.76 (m, 2H), 3.01-2.76 (m, 2H), 2.61-2.39 (m, 2H), 2.17-1.98 (m, 2H), 1.97-1.75 (m, 2H) | ¹³C NMR (Chloroform-d) δ 162.42, 159.55 (d, J = 251.5 Hz), 159.43, 152.90, 147.99-146.62 (m), 140.40, 137.04, 136.44, 136.33, 132.34 (d, J = 5.4 Hz), 131.32 (d, J = 9.0 Hz), 125.74 (d, J = 3.5 Hz), 124.86 (d, J = 19.0 Hz), 114.60 (d, J = 21.9 Hz), 111.57 (t, J = 237.7 Hz), 70.85, 58.71, 47.61, 46.33, 42.84, 30.88, 30.81 |
| 71 | ¹H NMR (Chloroform-d) δ 8.88-8.80 (m, 2H), 7.40-7.31 (m, 2H), 7.25 (dt, J = 8.1, 0.9 Hz, 1H), 7.08 (td, J = 8.6, 1.0 Hz, 1H), 6.97 (t, J = 54.1 Hz, 1H), 6.93 (d, J = 8.3 Hz, 1H), 6.52-6.32 (m, 1H), 5.49-5.27 (m, 1H), 4.80-4.56 (m, 1H), 4.00-3.72 (m, 2H), 2.99-2.76 (m, 2H), 2.67-2.39 (m, 2H), 2.28-2.10 (m, 2H), 2.03-1.79 (m, 2H) | ¹³C NMR (Chloroform-d) δ 164.31, 162.44, 159.55 (d, J = 251.6 Hz), 152.82, 147.07, 132.34 (d, J = 5.2 Hz), 131.31 (d, J = 9.1 Hz), 129.08, 125.73 (d, J = 3.5 Hz), 117.62, 114.59 (d, J = 21.9 Hz), 111.56 (t, J = 237.6 Hz), 71.49, 58.78, 47.59, 46.46, 42.82, 30.78 |
| 72 | ¹H NMR (Chloroform-d) δ 8.81 (s, 1H), 7.63 (q, J = 8.1 Hz, 1H), 7.35 (td, J = 8.2, 5.9 Hz, 1H), 7.25 (dt, J = 8.1, 0.9 Hz, 1H), 7.08 (td, J = 8.5, 1.1 Hz, 1H), 6.96 (t, J = 54.2 Hz, 1H), 6.55 (ddd, J = 8.0, 1.6, 0.6 Hz, 1H), 6.44 (ddd, J = 7.8, 2.5, 0.6 Hz, 1H), 6.43-6.36 (m, 1H), 4.99 (tt, J = 8.0, 3.9 Hz, 1H), 4.65 (t, J = 7.0 Hz, 1H), 3.91-3.78 (m, 2H), 2.93-2.77 (m, 2H), 2.55-2.45 (m, 2H), 2.15-1.99 (m, 2H), 1.94-1.75 (m, 2H) | ¹³C NMR (Chloroform-d) δ 162.37, 162.12 (d, J = 240.3 Hz), 162.08 (d, J = 13.6 Hz), 159.56 (d, J = 251.7 Hz), 152.83, 147.27 (t, J = 25.6 Hz), 142.61 (d, J = 8.1 Hz), 137.06, 132.36 (d, J = 5.3 Hz), 131.27 (d, J = 9.1 Hz), 125.73 (d, J = 3.6 Hz), 124.92 (d, J = 21.3 Hz), 114.59 (d, J = 21.9 Hz), 111.56 (t, J = 237.6 Hz), 107.67 (d, J = 5.1 Hz), 99.86 (d, J = 35.7 Hz), 70.78, 58.68, 47.58, 46.26, 42.86, 31.00, 30.91 |
| 73 | ¹H NMR (Chloroform-d) δ 8.82 (d, J = 0.7 Hz, 1H), 8.29 (d, J = 5.8 Hz, 1H), 7.36 (td, J = 8.2, 5.9 Hz, 1H), 7.25 (dt, J = 8.1, 0.9 Hz, 1H), 7.13-7.03 (m, 1H), 6.90 (t, J = 54.1 Hz, 1H), 6.63 (d, J = 2.4 Hz, 1H), 6.59 (dd, J = 5.8, 2.5 Hz, 1H), 6.36 (t, J = 5.2 Hz, 1H), 4.65 (t, J = 7.0 Hz, 1H), 4.39 (dt, J = 7.6, 3.8 Hz, 1H), 3.86 (dd, J = 7.0, 5.1 Hz, 2H), 2.95-2.77 (m, 2H), 2.59-2.42 (m, 5H), 2.11-1.98 (m, 2H), 1.95-1.75 (m, 2H) | ¹³C NMR (Chloroform-d) δ 163.88, 162.38, 160.04, 159.55 (d, J = 251.6 Hz), 152.90, 150.31, 147.35 (t, J = 25.7 Hz), 137.00, 132.34 (d, J = 5.2 Hz), 131.32 (d, J = 9.2 Hz), 125.75 (d, J = 3.5 Hz), 124.85 (d, J = 21.3 Hz), 114.60 (d, J = 22.0 Hz), 111.58 (t, J = 237.6 Hz), 110.23, 108.24, 71.70, 58.77, 47.04, 46.17, 42.84, 30.71, 30.67, 24.51 |
| 74 | ¹H NMR (Chloroform-d) δ 8.84 (s, 1H), 8.30 (d, J = 5.8 Hz, 1H), 7.36 (td, J = 8.2, 5.9 Hz, 1H), 7.25 (d, J = 8.2 Hz, 1H), 7.08 (td, J = 8.5, 1.1 Hz, 1H), 6.98 (t, J = 54.1 Hz, 1H), 6.63 (d, J = 5.7 Hz, 1H), 6.45-6.24 (m, 1H), 5.24-5.08 (m, 1H), 4.78-4.49 (m, 1H), 3.98-3.73 (m, 2H), 2.99-2.72 (m, 2H), 2.64-2.37 (m, 2H), 2.21-1.98 (m, 2H), 1.93-1.70 (m, 2H) | |
| 75 | ¹H NMR (Chloroform-d) δ 8.81 (s, 1H), 8.36 (d, J = 5.2 Hz, 1H), 7.35 (td, J = 8.2, 5.9 Hz, 1H), 7.24 (dt, J = 8.1, 0.9 Hz, 1H), 7.07 (td, J = 8.6, 1.0 Hz, 1H), 6.96 (d, J = 4.2 Hz, 1H), 7.11-6.78 (m, 1H), 6.47-6.40 (m, 1H), 5.04 (dt, J = 7.9, 3.9 Hz, 1H), 4.66 (t, J = 7.1 Hz, 1H), 3.97-3.75 (m, 2H), 2.94-2.78 (m, 2H), 2.58-2.42 (m, 2H), 2.15-2.02 (m, 2H), 2.01-1.82 (m, 2H) | ¹³C NMR (Chloroform-d) δ 164.26, 162.56, 162.39, 159.98, 159.54 (d, J = 251.6 Hz), 152.87, 147.29 (t, J = 25.3 Hz), 136.78, 132.33 (d, J = 5.3 Hz), 131.31 (d, J = 9.1 Hz), 125.74 (d, J = 3.4 Hz), 124.87 (d, J = 21.3 Hz), 114.90, 114.59 (d, J = 21.8 Hz), 114.17-108.29 (m), 73.05, 58.62, 47.27, 46.16, 42.84, 30.79, 30.69 |
| 76 | ¹H NMR (Chloroform-d) δ 8.82 (s, 1H), 8.12 (s, 1H), 8.10-8.04 (m, 1H), 7.35 (td, J = 8.2, 5.9 Hz, 1H), 7.25 (dt, J = 8.2, 0.9 Hz, 1H), 7.10-7.04 (m, 1H), 6.89 (t, J = 54.1 Hz, 1H), 6.44-6.30 (m, 1H), 5.05 (dt, J = 8.0, 4.0 Hz, 1H), 4.66 (t, J = 7.0 Hz, 1H), 3.85 (dd, | ¹³C NMR (Chloroform-d) δ 162.39, 159.55 (d, J = 251.6 Hz), 158.43, 152.90, 147.33 (t, J = 25.7 Hz), 145.28, 136.94, 135.08, 133.47, 132.33 (d, J = 5.5 Hz), 131.31 (d, J = 9.2 Hz), 125.73 (d, J = 3.5 Hz), 124.87 |

| Example | ¹H-NMR 400 | ¹³C-NMR 101 |
|---|---|---|
|  | J = 7.0, 5.0 Hz, 2H), 2.94-2.80 (m, 2H), 2.60-2.45 (m, 2H), 2.07 (d, J = 10.2 Hz, 2H), 1.97-1.78 (m, 2H) | (d, J = 21.3 Hz), 114.59 (d, J = 22.0 Hz), 111.58 (t, J = 237.6 Hz), 71.93, 58.73, 47.38, 46.20, 42.86, 30.74, 30.67 |
| 77 | ¹H NMR (Chloroform-d) δ 9.03 (s, 1H), 7.62-7.52 (m, 1H), 7.42-7.32 (m, 1H), 7.24 (d, J = 7.9 Hz, 1H), 7.14-6.85 (m, 2H), 6.69-6.60 (m, 1H), 5.54-5.32 (m, 3H), 5.25-5.04 (m, 1H), 4.71-4.47 (m, 1H), 4.30-4.11 (m, 1H), 3.87-3.68 (m, 1H), 3.25 (d, J = 29.2 Hz, 3H), 2.93-2.80 (m, 1H), 2.76-2.61 (m, 1H), 2.39-2.23 (m, 1H) |  |
| 78 | ¹H NMR (Chloroform-d) δ 8.81 (s, 1H), 8.72 (d, J = 1.0 Hz, 1H), 8.41 (dd, J = 5.8, 0.6 Hz, 1H), 7.35 (td, J = 8.2, 5.9 Hz, 1H), 7.25 (dt, J = 8.1, 0.9 Hz, 1H), 7.12-7.03 (m, 1H), 7.10-6.82 (m, 1H), 6.68 (dd, J = 5.8, 1.2 Hz, 1H), 6.44-6.37 (m, 1H), 5.16 (tt, J = 8.1, 4.0 Hz, 1H), 4.65 (t, J = 7.0 Hz, 1H), 3.85 (dd, J = 7.0, 5.0 Hz, 2H), 2.96-2.78 (m, 2H), 2.58-2.45 (m, 2H), 2.15-2.01 (m, 2H), 1.98-1.75 (m, 2H) | ¹³C NMR (Chloroform-d) δ 168.22, 162.38, 159.59 (d, J = 243.6 Hz), 158.30, 157.18, 152.88, 147.31 (t, J = 25.6 Hz), 137.07, 132.34 (d, J = 5.3 Hz), 131.29 (d, J = 9.2 Hz), 125.73 (d, J = 3.6 Hz), 124.89 (d, J = 21.4 Hz), 114.58 (d, J = 21.9 Hz), 111.56 (t, J = 237.6 Hz), 109.12, 71.15, 58.75, 47.54, 46.32, 42.87, 30.85, 30.78 |
| 79 | ¹H NMR (DMSO-d6) δ 12.35-11.64 (m, 1H), 9.40-9.11 (m, 1H), 8.99-8.72 (m, 1H), 8.37 (d, J = 5.2 Hz, 1H), 7.46 (td, J = 8.2, 6.1 Hz, 1H), 7.49-7.10 (m, 3H), 7.26 (d, J = 8.5 Hz, 1H), 5.38-4.87 (m, 2H), 4.65-4.37 (m, 1H), 4.02-3.73 (m, 1H), 3.71-3.51 (m, 1H), 2.99-2.73 (m, 2H), 2.43-2.24 (m, 2H), 2.18-1.92 (m, 2H), 1.73 (s, 2H) |  |
| 80 | ¹H NMR (Chloroform-d) δ 8.79 (s, 1H), 8.04 (dd, J = 9.1, 5.8 Hz, 1H), 7.32 (td, J = 8.2, 5.9 Hz, 1H), 7.21 (dt, J = 8.1, 0.9 Hz, 1H), 7.05 (td, J = 8.5, 1.0 Hz, 1H), 6.94 (t, J = 54.1 Hz, 1H), 6.61 (ddd, J = 8.0, 5.8, 2.2 Hz, 1H), 6.53 (t, J = 5.0 Hz, 1H), 6.36 (dd, J = 10.3, 2.2 Hz, 1H), 5.04 (tt, J = 8.1, 3.9 Hz, 1H), 4.62 (t, J = 7.0 Hz, 1H), 3.82 (dd, J = 7.0, 5.1 Hz, 2H), 2.91-2.74 (m, 2H), 2.51-2.40 (m, 2H), 2.11-1.97 (m, 2H), 1.89-1.72 (m, 2H) | ¹³C NMR (Chloroform-d) δ 170.26 (d, J = 259.3 Hz), 165.10 (d, J = 12.5 Hz), 162.40, 159.51 (d, J = 251.6 Hz), 152.86, 148.72 (d, J = 9.0 Hz), 147.19 (t, J = 25.6 Hz), 137.16, 132.30 (d, J = 5.4 Hz), 131.25 (d, J = 9.2 Hz), 125.68 (d, J = 3.5 Hz), 124.91 (d, J = 21.4 Hz), 114.54 (d, J = 21.8 Hz), 111.44 (t, J = 237.5 Hz), 105.82 (d, J = 18.2 Hz), 98.26 (d, J = 20.1 Hz), 70.78, 58.72, 47.66, 46.35, 42.87, 31.08, 30.99 |
| 81 | ¹H NMR (Chloroform-d) δ 8.82 (s, 1H), 7.99 (d, J = 5.9 Hz, 1H), 7.34 (td, J = 8.3, 5.9 Hz, 1H), 7.24 (dt, J = 8.1, 0.9 Hz, 1H), 7.07 (td, J = 9.0, 1.0 Hz, 1H), 7.09-6.82 (m, 1H), 6.66 (ddd, J = 5.9, 2.2, 1.1 Hz, 1H), 6.38 (t, J = 5.1 Hz, 1H), 6.33 (d, J = 2.1 Hz, 1H), 4.64 (t, J = 7.0 Hz, 1H), 4.39 (tt, J = 7.5, 3.7 Hz, 1H), 3.94-3.76 (m, 2H), 2.91-2.77 (m, 2H), 2.55-2.44 (m, 2H), 2.11-1.98 (m, 2H), 1.95-1.79 (m, 2H) | ¹³C NMR (Chloroform-d) δ 167.36 (d, J = 11.7 Hz), 165.34 (d, J = 235.2 Hz), 162.38, 159.53 (d, J = 251.6 Hz), 152.93, 148.18 (d, J = 18.6 Hz), 147.36 (t, J = 25.7 Hz), 136.99, 132.32 (d, J = 5.4 Hz), 131.32 (d, J = 9.2 Hz), 125.73 (d, J = 3.5 Hz), 124.85 (d, J = 21.3 Hz), 114.58 (d, J = 21.8 Hz), 114.08-108.80 (m), 109.86 (d, J = 4.0 Hz), 95.27 (d, J = 41.7 Hz), 72.87, 58.82, 46.90, 46.12, 42.85, 30.56, 30.51 |
| 82 | ¹H NMR (Chloroform-d) δ 8.80 (s, 1H), 7.35 (td, J = 8.3, 5.9 Hz, 1H), 7.24 (dt, J = 8.1, 0.9 Hz, 1H), 7.11 (d, J = 3.9 Hz, 1H), 7.08 (td, J = 8.6, 1.0 Hz, 1H), 6.95 (t, J = 54.1 Hz, 1H), 6.68 (d, J = 3.8 Hz, 1H), 6.41 (s, 1H), 4.60 (t, J = 6.9 Hz, 1H), 4.24 (d, J = 6.0 Hz, 2H), 3.84 (dq, J = 7.6, 4.1, 3.7 Hz, 2H), 3.07 (d, J = 11.2 Hz, 1H), 2.92 (d, J = 11.1 Hz, 1H), 2.25 (t, J = 11.8 Hz, 1H), 2.11 (t, J = 11.4 Hz, 1H), 1.94-1.78 (m, 3H), 1.54-1.27 (m, 2H) | ¹³C NMR (Chloroform-d) δ 175.15, 162.40, 159.56 (d, J = 251.7 Hz), 152.82, 147.20 (t, J = 25.6 Hz), 137.09, 136.80, 132.35 (d, J = 5.3 Hz), 131.27 (d, J = 9.1 Hz), 125.72 (d, J = 3.5 Hz), 124.92 (d, J = 21.3 Hz), 114.59 (d, J = 21.8 Hz), 111.48 (t, J = 237.6 Hz), 110.99, 75.57, 58.93, 51.11, 47.70, 42.72, 35.42, 28.95, 28.81 |
| 83 | ¹H NMR (Chloroform-d) δ 8.81 (s, 1H), 7.35 (td, J = 8.2, 5.9 Hz, 1H), 7.25 | ¹³C NMR (Chloroform-d) δ 173.57, 162.42, 159.55 (d, J = |

| Example | ¹H-NMR 400 | ¹³C-NMR 101 |
|---|---|---|
| | (dt, J = 8.1, 0.9 Hz, 1H), 7.08 (td, J = 8.6, 1.0 Hz, 1H), 6.95 (t, J = 54.1 Hz, 1H), 6.45 (s, 1H), 6.49-6.35 (m, 1H), 4.74-4.54 (m, 1H), 4.26 (d, J = 6.0 Hz, 2H), 3.93-3.79 (m, 2H), 3.16-3.04 (m, 1H), 2.93 (d, J = 11.0 Hz, 1H), 2.26 (t, J = 11.8 Hz, 1H), 2.17-2.07 (m, 1H), 1.90-1.76 (m, 3H), 1.54-1.27 (m, 2H) | 251.6 Hz), 152.91, 147.25, 136.96, 132.60, 132.33 (d, J = 5.2 Hz), 131.30 (d, J = 9.1 Hz), 125.73 (d, J = 3.4 Hz), 124.87 (d, J = 21.1 Hz), 114.59 (d, J = 21.8 Hz), 111.50 (t, J = 237.7 Hz), 104.58, 76.12, 58.95, 51.09, 47.66, 42.70, 35.27, 28.80, 28.69 |
| 84 | ¹H NMR (Chloroform-d) δ 8.81 (s, 1H), 7.36 (td, J = 8.2, 5.9 Hz, 1H), 7.28-7.23 (m, 1H), 7.09 (td, J = 8.5, 1.1 Hz, 1H), 6.95 (t, J = 54.1 Hz, 1H), 6.44-6.34 (m, 1H), 6.23 (d, J = 1.2 Hz, 1H), 4.60 (t, J = 7.0 Hz, 1H), 4.20 (d, J = 6.0 Hz, 2H), 3.91-3.76 (m, 2H), 3.07 (d, J = 11.4 Hz, 1H), 2.92 (d, J = 11.2 Hz, 1H), 2.33-2.19 (m, 1H), 2.27 (d, J = 1.1 Hz, 3H), 2.11 (t, J = 10.7 Hz, 1H), 1.93-1.72 (m, 3H), 1.53-1.32 (m, 2H) | |
| 85 | ¹H NMR (Chloroform-d) δ 8.80 (s, 1H), 7.35 (td, J = 8.3, 6.0 Hz, 1H), 7.25 (dt, J = 8.1, 0.9 Hz, 1H), 7.08 (td, J = 8.5, 1.0 Hz, 1H), 6.95 (t, J = 54.2 Hz, 1H), 6.41-6.33 (m, 1H), 4.60 (t, J = 7.0 Hz, 1H), 4.28 (d, J = 6.0 Hz, 2H), 3.84 (dd, J = 7.0, 5.0 Hz, 2H), 3.09 (d, J = 11.3 Hz, 1H), 2.93 (d, J = 11.1 Hz, 1H), 2.47 (s, 3H), 2.26 (dd, J = 12.1, 9.9 Hz, 1H), 2.18-2.04 (m, 1H), 1.95-1.73 (m, 3H), 1.57-1.29 (m, 2H) | ¹³C NMR (Chloroform-d) δ 191.06, 169.23, 162.39, 159.55 (d, J = 251.6 Hz), 152.84, 147.24 (t, J = 25.7 Hz), 137.05, 132.34 (d, J = 5.4 Hz), 131.30 (d, J = 9.2 Hz), 125.73 (d, J = 3.5 Hz), 124.89 (d, J = 21.5 Hz), 114.59 (d, J = 21.8 Hz), 114.29-108.74 (m), 77.57, 58.94 (d, J = 1.8 Hz), 51.01, 47.64, 42.73, 35.44, 28.80, 28.68, 19.71 |
| 86 | ¹H NMR (Chloroform-d) δ 8.82 (s, 1H), 7.55 (s, 1H), 7.36 (td, J = 8.2, 5.9 Hz, 1H), 7.26 (d, J = 8.4 Hz, 1H), 7.09 (td, J = 8.5, 1.1 Hz, 1H), 6.96 (t, J = 54.1 Hz, 1H), 6.39-6.29 (m, 1H), 4.64 (t, J = 7.0 Hz, 1H), 4.36 (d, J = 5.9 Hz, 2H), 3.91-3.79 (m, 2H), 3.63 (s, 3H), 3.12 (d, J = 11.5 Hz, 1H), 2.97 (d, J = 11.2 Hz, 1H), 2.28 (t, J = 11.1 Hz, 1H), 2.13 (t, J = 11.2 Hz, 1H), 1.87 (d, J = 12.6 Hz, 3H), 1.54-1.33 (m, 2H) | |
| 87 | ¹H NMR (Chloroform-d) δ 8.80 (s, 1H), 7.35 (td, J = 8.2, 5.9 Hz, 1H), 7.25 (dt, J = 8.1, 0.9 Hz, 1H), 7.08 (td, J = 8.6, 0.9 Hz, 1H), 6.95 (t, J = 54.1 Hz, 1H), 6.37 (t, J = 4.5 Hz, 1H), 4.60 (t, J = 6.9 Hz, 1H), 4.23 (d, J = 5.9 Hz, 2H), 3.92-3.76 (m, 2H), 3.08 (d, J = 11.3 Hz, 1H), 2.93 (d, J = 11.1 Hz, 1H), 2.25 (td, J = 11.6, 2.3 Hz, 1H), 2.15-2.05 (m, 2H), 1.90-1.77 (m, 3H), 1.54-1.29 (m, 2H), 1.10-1.03 (m, 2H), 0.99 (tdd, J = 7.7, 5.2, 2.4 Hz, 2H) | ¹³C NMR (Chloroform-d) δ 190.76, 174.24, 162.38, 159.55 (d, J = 251.7 Hz), 152.84, 147.23 (t, J = 25.6 Hz), 137.06, 132.34 (d, J = 5.3 Hz), 131.29 (d, J = 9.2 Hz), 125.73 (d, J = 3.5 Hz), 124.90 (d, J = 21.4 Hz), 114.59 (d, J = 21.8 Hz), 111.51 (t, J = 237.7 Hz), 77.49, 58.93, 51.04, 47.67, 42.73, 35.52, 28.81, 28.70, 14.25, 8.86 |
| 88 | ¹H NMR (Chloroform-d) δ 8.80 (s, 1H), 7.45 (dd, J = 8.2, 7.2 Hz, 1H), 7.35 (td, J = 8.2, 5.9 Hz, 1H), 7.25 (dt, J = 8.1, 0.9 Hz, 1H), 7.08 (td, J = 8.6, 1.0 Hz, 1H), 6.95 (t, J = 54.1 Hz, 1H), 6.71 (d, J = 7.2 Hz, 1H), 6.50 (d, J = 8.2 Hz, 1H), 6.46-6.38 (m, 1H), 4.60 (t, J = 7.1 Hz, 1H), 4.11 (d, J = 6.4 Hz, 2H), 3.94-3.75 (m, 2H), 3.07 (d, J = 11.2 Hz, 1H), 2.92 (d, J = 10.9 Hz, 1H), 2.44 (s, 3H), 2.26 (t, J = 11.6 Hz, 1H), 2.11 (t, J = 11.3 Hz, 1H), 1.88 (d, J = 12.9 Hz, 2H), 1.81-1.73 (m, 1H), 1.53-1.24 (m, 2H) | ¹³C NMR (Chloroform-d) δ 163.41, 162.41, 159.57 (d, J = 251.6 Hz), 156.25, 152.78, 138.76, 137.20, 132.36 (d, J = 5.3 Hz), 131.25 (d, J = 9.2 Hz), 125.71 (d, J = 3.5 Hz), 124.96 (d, J = 22.2 Hz), 115.69, 114.58 (d, J = 21.9 Hz), 111.47 (t, J = 237.7 Hz), 107.06, 69.82, 58.91, 51.36, 47.89, 42.73, 35.68, 29.33, 29.20, 24.20 |
| 89 | ¹H NMR (Chloroform-d) δ 8.81 (s, 1H), 7.99 (dd, J = 5.3, 0.7 Hz, 1H), 7.35 (td, J = 8.2, 5.9 Hz, 1H), 7.24 (dt, J = 8.1, 0.9 Hz, 1H), 7.07 (td, J = 8.5, 1.1 Hz, 1H), 6.95 (t, J = 54.1 Hz, 1H), 6.70 (ddd, J = 5.2, 1.4, 0.6 Hz, 1H), 6.55-6.53 (m, 1H), 6.51-6.40 (m, | ¹³C NMR (Chloroform-d) δ 164.17, 162.44, 159.56 (d, J = 251.8 Hz), 152.85, 149.91, 147.66-147.23 (m), 146.32, 137.28, 132.35 (d, J = 5.3 Hz), 131.26 (d, J = 9.2 Hz), 125.71 (d, J = 3.6 Hz), 124.92 (d, J = |

-continued

| Example | $^1$H-NMR 400 | $^{13}$C-NMR 101 |
|---|---|---|
|  | 1H), 4.65-4.52 (m, 1H), 4.11 (d, J = 6.5 Hz, 2H), 3.96-3.74 (m, 2H), 3.16-2.83 (m, 2H), 2.30 (s, 3H), 2.36-2.03 (m, 2H), 1.95-1.73 (m, 3H), 1.53-1.28 (m, 2H) | 20.7 Hz), 118.27, 114.58 (d, J = 21.9 Hz), 111.47 (t, J = 237.7 Hz), 111.06, 69.84, 58.94, 51.30, 47.89, 42.70, 35.50, 29.26, 29.08, 20.89 |
| 90 | $^1$H NMR (Chloroform-d) δ 8.81 (s, 1H), 8.29 (dd, J = 4.6, 1.2 Hz, 1H), 7.46 (dd, J = 8.6, 4.6 Hz, 1H), 7.37-7.30 (m, 2H), 7.24 (dt, J = 8.0, 0.9 Hz, 1H), 7.12-7.02 (m, 1H), 7.11-6.81 (m, 1H), 6.46-6.38 (m, 1H), 4.63 (t, J = 7.0 Hz, 1H), 3.94 (dt, J = 6.1, 3.0 Hz, 2H), 3.85 (t, J = 6.0 Hz, 2H), 3.11 (d, J = 11.3 Hz, 1H), 2.97 (d, J = 11.1 Hz, 1H), 2.30 (t, J = 11.4 Hz, 1H), 2.16 (t, J = 11.3 Hz, 1H), 2.00-1.84 (m, 3H), 1.58-1.35 (m, 2H) | $^{13}$C NMR (Chloroform-d) δ 162.42, 159.55 (d, J = 251.5 Hz), 157.95, 152.88, 147.64 - 146.89 (m), 142.73, 136.98, 132.33 (d, J = 5.2 Hz), 131.26 (d, J = 9.1 Hz), 127.71, 125.72 (d, J = 3.5 Hz), 124.88 (d, J = 21.3 Hz), 123.94, 119.89, 114.91, 114.60 (d, J = 21.9 Hz), 114.07-108.62 (m), 73.41, 58.96, 51.14, 47.65, 42.76, 35.57, 28.88, 28.83 |
| 91 | $^1$H NMR (Chloroform-d) δ 8.81 S, 1H), 8.49 (d, J = 1.2 Hz, 1H), 8.48 (s, 1H), 7.38 (dd, J = 2.8, 1.8 Hz, 1H), 7.37-7.32 (m, 1H), 7.25 (dt, J = 8.1, 0.9 Hz, 1H), 7.12-7.03 (m, 1H), 7.12-6.80 (m, 1H), 6.37 (s, 1H), 4.62 (t, J = 7.0 Hz, 1H), 3.93-3.79 (m, 4H), 3.12 (d, J = 11.3 Hz, 1H), 2.97 (d, J = 11.0 Hz, 1H), 2.29 (t, J = 11.5 Hz, 1H), 2.14 (t, J = 11.3 Hz, 1H), 1.93-1.78 (m, 3H), 1.45 (dt, J = 37.7, 11.4 Hz, 2H) | $^{13}$C NMR (Chloroform-d) δ 162.37, 159.56 (d, J = 251.8 Hz), 154.53, 152.86, 147.27 (t), 144.62-144.18 (m), 142.39, 137.07, 132.34 (d, J = 5.4 Hz), 131.31 (d, J = 9.2 Hz), 125.73 (d, J = 3.5 Hz), 124.90 (d, J = 21.5 Hz), 122.73, 116.39, 114.58 (d, J = 21.8 Hz), 111.53 (t), 109.92, 73.05, 59.00, 51.12, 47.74, 42.77, 35.63, 29.02, 28.89 |
| 92 | $^1$H NMR (Chloroform-d) δ 8.82 (s, 1H), 8.31 (d, J = 2.5 Hz, 1H), 8.28 (d, J = 2.5 Hz, 1H), 7.35 (td, J = 8.3, 5.9 Hz, 1H), 7.25 (dt, J = 8.1, 0.9 Hz, 1H), 7.08 (td, J = 8.6, 1.0 Hz, 1H), 6.96 (t, J = 54.1 Hz, 1H), 6.53-6.32 (m, 1H), 4.72-4.56 (m, 1H), 4.31 (dd, J = 6.2, 2.0 Hz, 2H), 3.94-3.76 (m, 2H), 3.20-3.04 (m, 1H), 3.04-2.88 (m, 1H), 2.38-2.22 (m, 1H), 2.23-2.08 (m, 1H), 1.98-1.80 (m, 3H), 1.60-1.34 (m, 2H) |  |
| 93 | $^1$H NMR (Chloroform-d) δ 8.80 (s, 1H), 7.68 (dd, J = 8.1, 1.1 Hz, 1H), 7.65 (dd, J = 7.9, 1.1 Hz, 1H), 7.43-7.31 (m, 2H), 7.27-7.21 (m, 2H), 7.08 (td, J = 8.5, 1.0 Hz, 1H), 6.95 (t, J = 54.2 Hz, 1H), 6.41 (t, J = 4.9 Hz, 1H), 4.61 (t, J = 7.0 Hz, 1H), 4.41 (d, J = 6.1 Hz, 2H), 3.93-3.76 (m, 2H), 3.09 (d, J = 11.3 Hz, 1H), 2.94 (d, J = 11.1 Hz, 1H), 2.27 (td, J = 11.7, 2.4 Hz, 1H), 2.12 (td, J = 11.5, 2.2 Hz, 1H), 1.96-1.81 (m, 3H), 1.57-1.32 (m, 2H) | $^{13}$C NMR (Chloroform-d) δ 172.96, 162.40, 159.56 (d, J = 251.7 Hz), 152.82, 149.26, 147.21 (t, J = 25.6 Hz), 137.05, 132.35 (d, J = 5.3 Hz), 131.77, 131.28 (d, J = 9.2 Hz), 126.01, 125.73 (d, J = 3.5 Hz), 124.92 (d, J = 21.3 Hz), 123.53, 121.27, 120.71, 114.59 (d, J = 21.9 Hz), 111.50 (t, J = 237.6 Hz), 75.76, 58.92, 51.10, 47.66, 42.74, 35.42, 28.97, 28.83 |
| 94 | $^1$H NMR (Chloroform-d) δ 8.82 (s, 1H), 7.64 (d, J = 8.1 Hz, 1H), 7.55 (ddd, J = 8.4, 7.1, 1.3 Hz, 1H), 7.45 (dt, J = 8.5, 0.8 Hz, 1H), 7.35 (td, J = 8.2, 5.9 Hz, 1H), 7.31-7.22 (m, 2H), 7.08 (td, J = 8.6, 1.0 Hz, 1H), 7.14-6.80 (m, 1H), 6.46-6.31 (m, 1H), 4.74-4.56 (m, 1H), 4.39-4.22 (m, 2H), 3.91-3.77 (m, 2H), 3.17-3.03 (m, 1H), 3.01-2.82 (m, 1H), 2.40-2.21 (m, 1H), 2.21-2.08 (m, 1H), 2.01-1.83 (m, 3H), 1.54-1.32 (m, 2H) |  |
| 95 | $^1$H NMR (Chloroform-d) δ 8.80 (s, 1H), 7.35 (td, J = 8.3, 6.0 Hz, 1H), 7.24 (dt, J = 8.0, 0.9 Hz, 1H), 7.07 (td, J = 8.6, 1.1 Hz, 1H), 6.95 (t, J = 54.1 Hz, 1H), 6.48-6.34 (m, 1H), 4.67-4.54 (m, 1H), 4.28 (d, J = 5.9 Hz, 2H), 3.88-3.83 (m, 2H), 3.81 (t, J = 6.7 Hz, 2H), 3.38 (s, 3H), 3.14-3.06 (m, 1H), 3.04 (t, J = 6.7 Hz, 2H), 2.98-2.89 (m, 1H), 2.26 (t, J = 11.7 Hz, 1H), 2.11 (t, J = 11.4 Hz, 1H), 1.93-1.77 (m, 3H), 1.55-1.29 (m, 2H) | $^{13}$C NMR (Chloroform-d) δ 191.12, 170.15, 162.40, 159.54 (d, J = 251.6 Hz), 152.86, 147.83-146.59 (m), 137.05, 132.33 (d, J = 5.3 Hz), 131.30 (d, J = 9.2 Hz), 125.73 (d, J = 3.5 Hz), 124.88 (d, J = 21.5 Hz), 114.59 (d, J = 21.9 Hz), 111.50 (t, J = 237.5 Hz), 77.61, 70.03, 58.95, 58.70, 51.03, 47.66, 42.72, 35.46, 34.08, 28.78, 28.68 |

-continued

| Example | ¹H-NMR 400 | ¹³C-NMR 101 |
|---|---|---|
| 96 | ¹H NMR (Chloroform-d) δ 8.80 (s, 1H), 8.07 (s, 1H), 7.57-7.30 (m, 6H), 7.27-7.22 (m, 1H), 7.08 (td, J = 8.5, 1.1 Hz, 1H), 6.95 (t, J = 54.2 Hz, 1H), 6.40-6.31 (m, 1H), 4.60 (t, J = 7.0 Hz, 1H), 4.38 (d, J = 6.6 Hz, 2H), 3.94-3.75 (m, 2H), 3.07 (d, J = 11.4 Hz, 1H), 2.92 (d, J = 11.3 Hz, 1H), 2.24 (t, J = 11.2 Hz, 1H), 2.16-2.03 (m, 1H), 1.99-1.74 (m, 3H), 1.50-1.33 (m, 2H) | |
| 97 | ¹H NMR (Chloroform-d) δ 8.80 (d, J = 0.7 Hz, 1H), 7.72-7.67 (m, 2H), 7.57-7.51 (m, 2H), 7.49-7.43 (m, 1H), 7.35 (td, J = 8.3, 5.9 Hz, 1H), 7.24 (dt, J = 8.1, 0.9 Hz, 1H), 7.07 (td, J = 8.6, 1.0 Hz, 1H), 6.95 (t, J = 54.1 Hz, 1H), 6.35 (t, J = 5.1 Hz, 1H), 4.62 (t, J = 7.0 Hz, 1H), 4.49 (d, J = 6.7 Hz, 2H), 3.84 (dd, J = 7.0, 5.1 Hz, 2H), 3.10 (d, J = 11.4 Hz, 1H), 2.95 (d, J = 11.1 Hz, 1H), 2.27 (td, J = 11.6, 2.5 Hz, 1H), 2.13 (td, J = 11.5, 2.4 Hz, 1H), 2.01-1.90 (m, 1H), 1.90-1.77 (m, 2H), 1.55-1.32 (m, 2H) | ¹³C NMR (Chloroform-d) δ 162.37, 160.14, 159.54 (d, J = 251.6 Hz), 152.84, 147.27 (t, J = 25.7 Hz), 136.93, 133.35, 132.31 (d, J = 5.3 Hz), 131.32 (d, J = 9.1 Hz), 129.63, 128.95, 125.74 (d, J = 3.5 Hz), 124.85 (d, J = 21.3 Hz), 121.44, 114.60 (d, J = 21.8 Hz), 111.52 (t, J = 237.6 Hz), 77.85, 58.96, 50.91, 47.49, 42.71, 35.32, 28.81, 28.64 |
| 98 | ¹H NMR (Chloroform-d) δ 8.82 (s, 1H), 7.40-7.31 (m, 1H), 7.26 (d, J = 8.3 Hz, 1H), 7.16-6.76 (m, 5H), 6.45-6.32 (m, 1H), 4.63 (t, J = 7.1 Hz, 1H), 4.44 (d, J = 6.3 Hz, 2H), 3.93-3.79 (m, 2H), 3.57 (s, 3H), 3.10 (d, J = 11.2 Hz, 1H), 2.95 (d, J = 10.9 Hz, 1H), 2.29 (t, J = 11.6 Hz, 1H), 2.14 (t, J = 11.1 Hz, 1H), 2.00-1.79 (m, 3H), 1.53-1.34 (m, 2H) | |
| 99 | ¹H NMR (Chloroform-d) δ 8.80 (s, 1H), 7.97 (ddd, J = 5.1, 1.9, 0.7 Hz, 1H), 7.40-7.31 (m, 2H), 7.25 (dt, J = 8.0, 0.9 Hz, 1H), 7.08 (td, J = 8.6, 1.0 Hz, 1H), 7.12-6.76 (m, 1H), 6.79 (dd, J = 12.5, 7.4 Hz, 1H), 6.54-6.39 (m, 1H), 4.66-4.57 (m, 1H), 4.15 (d, J = 6.4 Hz, 2H), 3.93-3.75 (m, 2H), 3.07 (d, J = 11.3 Hz, 1H), 2.93 (d, J = 11.1 Hz, 1H), 2.27 (td, J = 11.5, 2.5 Hz, 1H), 2.17 (s, 3H), 2.16-2.07 (m, 1H), 1.95-1.86 (m, 2H), 1.85-1.76 (m, 1H), 1.54-1.31 (m, 2H) | ¹³C NMR (Chloroform-d) δ 162.38, 162.10, 159.57 (d, J = 251.7 Hz), 152.76, 147.17 (t, J = 25.7 Hz), 143.92, 138.39, 137.03, 132.36 (d, J = 5.3 Hz), 131.25 (d, J = 9.2 Hz), 125.71 (d, J = 3.5 Hz), 124.94 (d, J = 21.3 Hz), 120.80, 116.52, 114.58 (d, J = 21.9 Hz), 114.11-108.94 (m), 69.80, 58.86, 51.36, 47.71, 42.73, 35.61, 29.37, 29.20, 15.82 |
| 100 | ¹H NMR (Chloroform-d) δ 8.80 (s, 1H), 8.32 (d, J = 0.8 Hz, 2H), 7.35 (td, J = 8.2, 5.9 Hz, 1H), 7.24 (dt, J = 8.0, 0.9 Hz, 1H), 7.08 (td, J = 8.5, 1.0 Hz, 1H), 6.95 (t, J = 54.1 Hz, 1H), 6.44 (t, J = 4.6 Hz, 1H), 4.58 (t, J = 6.9 Hz, 1H), 4.16 (d, J = 6.1 Hz, 2H), 3.91-3.75 (m, 2H), 3.07 (d, J = 11.4 Hz, 1H), 2.91 (d, J = 11.1 Hz, 1H), 2.32-2.19 (m, 4H), 2.16-2.04 (m, 1H), 1.97-1.74 (m, 3H), 1.56-1.31 (m, 2H) | ¹³C NMR (Chloroform-d) δ 163.84, 162.42, 159.56 (d, J = 251.6 Hz), 159.09, 152.80, 147.11 (t, J = 25.9 Hz), 137.25, 132.35 (d, J = 5.3 Hz), 131.24 (d, J = 9.1 Hz), 125.71 (d, J = 3.4 Hz), 124.96 (d, J = 21.4 Hz), 123.67, 114.59 (d, J = 21.8 Hz), 111.46 (t, J = 237.6 Hz), 71.48, 58.92, 51.24, 47.91, 42.69, 35.41, 29.14, 29.03, 14.58 |
| 101 | ¹H NMR (Chloroform-d) δ 8.82-8.78 (m, 1H), 7.35 (td, J = 8.2, 5.9 Hz, 1H), 7.27-7.23 (m, 1H), 7.22 (d, J = 9.0 Hz, 1H), 7.08 (td, J = 8.5, 1.1 Hz, 1H), 6.95 (t, J = 54.1 Hz, 1H), 6.86 (d, J = 9.0 Hz, 1H), 6.44 (t, J = 4.6 Hz, 1H), 4.60 (t, J = 7.0 Hz, 1H), 4.36-4.29 (m, 2H), 3.95-3.75 (m, 2H), 3.07 (d, J = 11.2 Hz, 1H), 2.92 (d, J = 11.0 Hz, 1H), 2.61 (s, 3H), 2.31-2.20 (m, 1H), 2.11 (dd, J = 11.8, 9.8 Hz, 1H), 1.94-1.80 (m, 3H), 1.52-1.30 (m, 2H) | ¹³C NMR (Chloroform-d) δ 163.66, 162.40, 159.56 (d, J = 251.6 Hz), 155.14, 152.79, 147.16 (t, J = 25.8 Hz), 137.16, 132.35 (d, J = 5.3 Hz), 131.26 (d, J = 9.2 Hz), 129.88, 125.72 (d, J = 3.5 Hz), 124.94 (d, J = 21.4 Hz), 117.35, 114.58 (d, J = 21.8 Hz), 111.47 (t, J = 237.6 Hz), 71.15, 58.92, 51.22, 47.80, 42.74, 35.35, 29.20, 29.03, 21.46 |
| 102 | ¹H NMR (Chloroform-d) δ 8.80 (s, 1H), 7.97 (d, J = 3.1 Hz, 1H), 7.48-7.31 (m, 2H), 7.25 (dt, J = 8.2, 0.9 Hz, 1H), 7.08 (t, J = 8.4 Hz, 1H), 6.95 (t, J = 54.1 Hz, 1H), 6.69 (dd, J = 9.0, 3.6 | ¹³C NMR (Chloroform-d) δ 162.38, 160.07, 159.57 (d, J = 251.7 Hz), 155.29 (d, J = 245.4 Hz), 152.79, 147.17 (t, J = 25.5 Hz), 137.18, 133.02 (d, J = 25.9 |

| Example | ¹H-NMR 400 | ¹³C-NMR 101 |
|---|---|---|
| | Hz, 1H), 6.45-6.37 (m, 1H), 4.60 (t, J = 6.9 Hz, 1H), 4.09 (d, J = 6.5 Hz, 2H), 3.92-3.76 (m, 2H), 3.07 (d, J = 11.4 Hz, 1H), 2.92 (d, J = 11.1 Hz, 1H), 2.26 (td, J = 11.6, 2.5 Hz, 1H), 2.11 (td, J = 11.4, 2.4 Hz, 1H), 1.93-1.82 (m, 2H), 1.83-1.72 (m, 1H), 1.52-1.27 (m, 2H) | Hz), 132.36 (d, J = 5.3 Hz), 131.26 (d, J = 9.0 Hz), 126.59 (d, J = 21.3 Hz), 125.71 (d, J = 3.5 Hz), 124.94 (d, J = 21.3 Hz), 114.58 (d, J = 21.8 Hz), 111.57 (d, J = 4.6 Hz), 114.08-108.89 (m), 70.53, 58.93, 51.27, 47.84, 42.75, 35.49, 29.27, 29.11 |
| 103 | ¹H NMR (Chloroform-d) δ 8.80 (s, 1H), 8.49 (dd, J = 2.5, 0.7 Hz, 1H), 7.35 (td, J = 8.3, 5.9 Hz, 1H), 7.25 (dt, J = 8.1, 0.9 Hz, 1H), 7.08 (td, J = 8.5, 1.0 Hz, 1H), 6.95 (t, J = 54.1 Hz, 1H), 6.38 (t, J = 4.5 Hz, 1H), 6.28 (s, 1H), 4.60 (t, J = 6.9 Hz, 1H), 4.25 (d, J = 6.2 Hz, 2H), 3.84 (dd, J = 7.0, 5.0 Hz, 2H), 3.09 (d, J = 11.3 Hz, 1H), 2.93 (d, J = 11.1 Hz, 1H), 2.26 (td, J = 11.5, 2.3 Hz, 1H), 2.11 (td, J = 11.4, 2.3 Hz, 1H), 1.93-1.74 (m, 3H), 1.52-1.29 (m, 2H) | ¹³C NMR (Chloroform-d) δ 172.55 (d, J = 12.1 Hz), 171.04 (d, J = 248.1 Hz), 162.37, 159.56 (d, J = 251.5 Hz), 158.13 (d, J = 17.5 Hz), 152.82, 147.23 (t, J = 25.7 Hz), 137.11, 132.34 (d, J = 5.4 Hz), 131.29 (d, J = 9.2 Hz), 125.72 (d, J = 3.4 Hz), 124.91 (d, J = 21.4 Hz), 114.58 (d, J = 21.9 Hz), 113.99-108.91 (m), 91.75 (d, J = 33.8 Hz), 71.72, 58.96, 51.12, 47.75, 42.76, 35.31, 29.03, 28.89 |
| 104 | ¹H NMR (Chloroform-d) δ 8.80 (s, 1H), 7.35 (td, J = 8.3, 5.9 Hz, 1H), 7.24 (dt, J = 8.1, 0.9 Hz, 1H), 7.17-7.04 (m, 3H), 7.12-6.79 (m, 1H), 6.43 (t, J = 4.6 Hz, 1H), 4.60 (t, J = 6.9 Hz, 1H), 4.31 (d, J = 6.1 Hz, 2H), 3.89-3.79 (m, 2H), 3.08 (d, J = 11.3 Hz, 1H), 2.93 (d, J = 11.0 Hz, 1H), 2.32-2.21 (m, 1H), 2.12 (td, J = 11.5, 2.3 Hz, 1H), 1.93-1.78 (m, 3H), 1.52-1.30 (m, 2H) | ¹³C NMR (Chloroform-d) δ 164.03, 163.17 (d, J = 238.2 Hz) 162.40, 159.55 (d, J = 251.7 Hz), 152.83, 147.19 (t, J = 25.6 Hz), 137.15, 132.33 (d, J = 5.4 Hz), 131.28 (d, J = 9.1 Hz), 125.71 (d, J = 3.5 Hz), 124.91 (d, J = 21.4 Hz), 123.10 (d, J = 7.6 Hz), 119.14 (d, J = 37.7 Hz), 114.58 (d, J = 21.8 Hz), 114.12-108.79 (m), 72.00, 58.95, 51.15, 47.79, 42.76, 35.29, 29.13, 28.95 |
| 105 | ¹H NMR (Chloroform-d) δ 8.81 (s, 1H), 8.12 (d, J = 4.0 Hz, 1H), 7.96 (d, J = 8.1 Hz, 1H), 7.35 (td, J = 8.2, 5.9 Hz, 1H), 7.25 (dt, J = 8.1, 0.9 Hz, 1H), 7.08 (td, J = 8.5, 1.0 Hz, 1H), 6.95 (t, J = 54.2 Hz, 1H), 6.39 (t, J = 4.6 Hz, 1H), 4.61 (t, J = 7.0 Hz, 1H), 4.15 (d, J = 6.2 Hz, 2H), 3.85 (dd, J = 7.2, 4.9 Hz, 2H), 3.09 (d, J = 11.4 Hz, 1H), 2.94 (d, J = 11.1 Hz, 1H), 2.33-2.22 (m, 1H), 2.12 (t, J = 11.0 Hz, 1H), 1.93-1.74 (m, 3H), 1.51-1.30 (m, 2H) | 162.39, 159.56 (d, J = 251.7 Hz), 158.69 (d, J = 7.1 Hz), 158.41 (d, J = 256.0 Hz), 152.83, 147.23 (t, J = 25.5 Hz), 137.06, 132.35 (d, J = 5.2 Hz), 131.53 (d, J = 4.8 Hz), 131.29 (d, J = 9.2 Hz), 125.73 (d, J = 3.4 Hz), 124.90 (d, J = 21.3 Hz), 122.14 (d, J = 35.5 Hz), 114.59 (d, J = 21.9 Hz), 111.50 (t, J = 237.6 Hz), 71.16, 58.93, 51.15, 47.72, 42.75, 35.27, 29.07, 28.92 |
| 106 | ¹H NMR (Chloroform-d) δ 8.80 (s, 1H), 7.92 (t, J = 3.0 Hz, 1H), 7.68 (dd, J = 2.9, 2.2 Hz, 1H), 7.35 (td, J = 8.3, 5.9 Hz, 1H), 7.25 (dt, J = 8.1, 0.9 Hz, 1H), 7.08 (td, J = 8.5, 1.1 Hz, 1H), 6.95 (t, J = 54.2 Hz, 1H), 6.46-6.38 (m, 1H), 4.61 (t, J = 7.0 Hz, 1H), 4.26 (d, J = 6.0 Hz, 2H), 3.88-3.79 (m, 2H), 3.09 (d, J = 11.4 Hz, 1H), 2.94 (d, J = 11.1 Hz, 1H), 2.35-2.24 (m, 1H), 2.18-2.07 (m, 1H), 1.93-1.78 (m, 3H), 1.59-1.32 (m, 2H) | ¹³C NMR (Chloroform-d) δ 162.39, 159.56 (d, J = 251.6 Hz), 152.81, 149.63 (d, J = 26.5 Hz), 149.37 (d, J = 256.1 Hz), 147.65-146.76 (m), 137.52 (d, J = 5.2 Hz), 137.03, 132.35 (d, J = 5.4 Hz), 131.76 (d, J = 6.5 Hz), 131.27 (d, J = 9.2 Hz), 125.72 (d, J = 3.4 Hz), 124.91 (d, J = 21.3 Hz), 114.58 (d, J = 21.9 Hz), 114.12-108.57 (m), 71.13, 58.92, 51.18, 47.68, 42.75, 35.23, 29.07, 28.95 |
| 107 | ¹H NMR (Chloroform-d) δ 9.02 (s, 1H), 8.33 (dd, J = 5.7, 2.1 Hz, 1H), 7.40-7.31 (m, 1H), 7.26-7.20 (m, 1H), 7.12-6.82 (m, 2H), 6.68 (dd, J = 5.7, 3.2 Hz, 1H), 5.50-5.36 (m, 1H), 4.53 (dd, J = 14.6, 7.0 Hz, 1H), 4.34 (d, J = 5.8 Hz, 2H), 4.19 (d, J = 15.3 Hz, 1H), 4.05-3.93 (m, 1H), 3.50-3.37 (m, 1H), 2.96-2.76 (m, 2H), 2.53-2.16 (m, 2H), 2.13-1.98 (m, 3H) | |
| 108 | ¹H NMR (Chloroform-d) δ 8.80 (s, 1H), 8.33 (dd, J = 5.1, 2.0 Hz, 1H), 7.88 (dd, J = 7.5, 2.0 Hz, 1H), 7.34 (td, J = 8.3, 5.9 Hz, 1H), 7.24 (dd, J = 8.1, 1.1 Hz, 1H), 7.07 (td, J = 8.6, 1.0 Hz, 1H), 6.98 (dd, J = 7.5, 5.0 Hz, 1H), 6.95 (t, J = 54.1 Hz, 1H), 6.49-6.38 (m, 1H), 4.61 (t, J = 7.0 Hz, 1H), 4.26 | ¹³C NMR (Chloroform-d) δ 163.84, 162.40, 159.57 (d, J = 251.8 Hz), 152.81, 151.22, 147.20 (t, J = 25.5 Hz), 142.94, 137.04, 132.35 (d, J = 5.3 Hz), 131.23 (d, J = 9.2 Hz), 125.71 (d, J = 3.5 Hz), 124.92 (d, J = 21.3 Hz), 116.44, 115.03, |

| Example | ¹H-NMR 400 | ¹³C-NMR 101 |
|---|---|---|
| | (d, J = 6.3 Hz, 2H), 3.92-3.76 (m, 2H), 3.07 (d, J = 11.4 Hz, 1H), 2.93 (d, J = 11.1 Hz, 1H), 2.32-2.22 (m, 1H), 2.19-2.09 (m, 1H), 1.96-1.79 (m, 3H), 1.55-1.32 (m, 2H) | 114.59 (d, J = 21.9 Hz), 111.46 (t, J = 237.5 Hz), 96.91, 71.28, 58.92, 51.20, 47.68, 42.74, 35.29, 29.03, 28.94 |
| 109 | ¹H NMR (Chloroform-d) δ 8.81 (d, J = 0.7 Hz, 1H), 7.66 (dd, J = 8.5, 7.2 Hz, 1H), 7.35 (td, J = 8.2, 5.9 Hz, 1H), 7.30 (dd, J = 7.2, 0.8 Hz, 1H), 7.25 (dt, J = 8.1, 0.9 Hz, 1H), 7.08 (td, J = 8.5, 1.1 Hz, 1H), 7.12-6.79 (m, 1H), 6.94 (dd, J = 8.2, 1.2 Hz, 1H), 6.41 (t, J = 4.5 Hz, 1H), 4.61 (t, J = 7.0 Hz, 1H), 4.22-4.14 (m, 2H), 3.93-3.76 (m, 2H), 3.08 (d, J = 11.4 Hz, 1H), 2.93 (d, J = 11.0 Hz, 1H), 2.26 (td, J = 11.5, 2.5 Hz, 1H), 2.16-2.08 (m, 1H), 1.93-1.73 (m, 3H), 1.50-1.29 (m, 2H) | ¹³C NMR (Chloroform-d) δ 164.06, 162.40, 159.57 (d, J = 251.8 Hz), 152.82, 147.19 (t, J = 25.6 Hz), 139.01, 137.09, 132.34 (d, J = 5.3 Hz), 131.29 (d, J = 9.1 Hz), 130.36, 125.73 (d, J = 3.4 Hz), 124.92 (d, J = 21.3 Hz), 122.13, 117.30, 116.11, 114.60 (d, J = 21.9 Hz), 111.49 (t, J = 237.6 Hz), 70.84, 58.91, 51.22, 47.75, 42.75, 35.35, 29.20, 29.03 |
| 110 | ¹H NMR (Chloroform-d) δ 8.81 (s, 1H), 8.50 (d, J = 5.8 Hz, 1H), 7.36 (td, J = 8.3, 5.9 Hz, 1H), 7.25 (dt, J = 8.1, 0.9 Hz, 1H), 7.20 (d, J = 2.4 Hz, 1H), 7.08 (td, J = 8.6, 1.0 Hz, 1H), 6.97 (dd, J = 5.8, 2.6 Hz, 1H), 6.96 (t, J = 54.1 Hz, 1H), 6.40-6.28 (m, 1H), 4.62 (t, J = 7.0 Hz, 1H), 3.95-3.78 (m, 4H), 3.12 (d, J = 11.4 Hz, 1H), 2.96 (d, J = 11.1 Hz, 1H), 2.38-2.23 (m, 1H), 2.19-2.09 (m, 1H), 1.97-1.76 (m, 3H), 1.53-1.31 (m, 2H) | ¹³C NMR (Chloroform-d) δ 165.25, 162.36, 159.55 (d, J = 251.6 Hz), 152.86, 152.26, 147.28 (t, J = 25.7 Hz), 137.06, 135.04, 132.34 (d, J = 5.3 Hz), 131.32 (d, J = 9.2 Hz), 125.73 (d, J = 3.5 Hz), 124.89 (d, J = 21.3 Hz), 117.13, 115.67, 114.59 (d, J = 21.8 Hz), 113.05, 114.08-108.74 (m), 72.86, 59.00, 51.08, 47.72, 42.78, 29.00, 28.87 |
| 111 | ¹H NMR (Chloroform-d) δ 8.81 (s, 1H), 8.45 (s, 1H), 8.37 (d, J = 4.8 Hz, 1H), 7.45 (dd, J = 4.8, 0.6 Hz, 1H), 7.34 (td, J = 8.3, 5.9 Hz, 1H), 7.24 (dt, J = 8.1, 0.9 Hz, 1H), 7.09-7.05 (m, 1H), 7.12-6.81 (m, 1H), 6.42 (t, J = 4.6 Hz, 1H), 4.63 (t, J = 7.0 Hz, 1H), 4.08-3.99 (m, 2H), 3.85 (dd, J = 7.3, 4.8 Hz, 2H), 3.11 (d, J = 11.5 Hz, 1H), 2.97 (d, J = 11.1 Hz, 1H), 2.30 (td, J = 11.6, 2.3 Hz, 1H), 2.16 (td, J = 11.4, 2.2 Hz, 1H), 2.00-1.82 (m, 3H), 1.55-1.35 (m, 2H) | ¹³C NMR (Chloroform-d) δ 162.39, 159.56 (d, J = 251.6 Hz), 154.91, 152.85, 147.26 (t, J = 25.7 Hz), 142.35, 136.96, 135.72, 132.34 (d, J = 5.4 Hz), 131.25 (d, J = 9.2 Hz), 125.97, 125.72 (d, J = 3.5 Hz), 124.90 (d, J = 21.3 Hz), 114.60 (d, J = 21.9 Hz), 113.92, 111.51 (t, J = 237.5 Hz), 109.33, 73.92, 58.93, 51.14, 47.59, 42.76, 35.72, 28.89, 28.81 |
| 112 | ¹H NMR (Chloroform-d) δ 8.81 (s, 1H), 7.36 (td, J = 8.2, 5.9 Hz, 1H), 7.27-7.22 (m, 1H), 7.08 (td, J = 8.5, 1.1 Hz, 1H), 6.96 (t, J = 54.2 Hz, 1H), 6.36 (t, J = 4.4 Hz, 1H), 6.07 (s, 1H), 4.61 (t, J = 7.0 Hz, 1H), 4.21 (d, J = 6.2 Hz, 2H), 3.85 (t, J = 6.0 Hz, 2H), 3.09 (d, J = 11.4 Hz, 1H), 2.93 (d, J = 11.3 Hz, 1H), 2.57 (s, 3H), 2.34-2.20 (m, 1H), 2.17-2.04 (m, 1H), 1.84 (d, J = 13.1 Hz, 3H), 1.52-1.29 (m, 2H) | |
| 113 | ¹H NMR (Chloroform-d) δ 8.80 (s, 1H), 8.32 (dd, J = 2.2, 0.7 Hz, 1H), 7.35 (td, J = 8.3, 5.9 Hz, 1H), 7.24 (dt, J = 8.1, 0.9 Hz, 1H), 7.07 (td, J = 8.5, 1.0 Hz, 1H), 6.95 (t, J = 54.1 Hz, 1H), 6.44-6.37 (m, 1H), 4.62 (t, J = 7.0 Hz, 1H), 4.25 (d, J = 6.1 Hz, 2H), 3.84 (dd, J = 7.0, 5.0 Hz, 2H), 3.08 (d, J = 11.4 Hz, 1H), 2.94 (d, J = 10.9 Hz, 1H), 2.27 (td, J = 11.6, 2.3 Hz, 1H), 2.18-2.07 (m, 1H), 2.08 (d, J = 0.8 Hz, 3H), 1.89-1.74 (m, 3H), 1.51-1.31 (m, 2H) | ¹³C NMR (Chloroform-d) δ 170.29 (d, J = 10.6 Hz), 168.51 (d, J = 245.2 Hz), 162.36, 159.56 (d, J = 251.7 Hz), 154.46 (d, J = 18.1 Hz), 152.80, 147.24 (t, J = 25.6 Hz), 137.00, 132.34 (d, J = 5.3 Hz), 131.28 (d, J = 9.1 Hz), 125.71 (d, J = 3.5 Hz), 124.91 (d, J = 21.3 Hz), 114.57 (d, J = 21.8 Hz), 111.50 (t, J = 237.5 Hz), 101.78 (d, J = 29.7 Hz), 71.65, 58.92 (d, J = 1.8 Hz), 51.18, 47.65, 42.75, 35.39, 29.10, 28.94, 6.79 |
| 114 | ¹H NMR (Chloroform-d) δ 8.80 (s, 1H), 8.76 (d, J = 4.9 Hz, 1H), 7.35 (td, J = 8.2, 5.9 Hz, 1H), 7.28 (d, J = 4.9 Hz, 1H), 7.25 (dt, J = 8.1, 0.9 Hz, 1H), 7.08 (td, J = 8.6, 1.0 Hz, 1H), 6.95 (t, J = 54.1 Hz, 1H), 6.45-6.37 (m, 1H), 4.60 (t, J = 6.9 Hz, 1H), 4.28 (d, J = 5.9 Hz, 2H), 3.94-3.74 (m, 2H), 3.09 (d, J = 11.2 Hz, 1H), 2.93 (d, J = 11.1 Hz, 1H), 2.31-2.21 (m, 1H), 2.17-2.07 | ¹³C NMR (Chloroform-d) δ 165.53, 162.42, 161.91, 159.56 (d, J = 251.6 Hz), 157.68 (q, J = 36.5 Hz), 152.83, 147.16 (t, J = 25.5 Hz), 137.17, 132.34 (d, J = 5.4 Hz), 131.27 (d, J = 9.1 Hz), 125.72 (d, J = 3.4 Hz), 124.93 (d, J = 21.3 Hz), 120.09 (q), 114.49, 111.49 (t, J = 237.6 Hz), 110.36 (d, J = 2.9 Hz), |

| Example | ¹H-NMR 400 | ¹³C-NMR 101 |
|---|---|---|
| | (m, 1H), 1.97-1.79 (m, 3H), 1.58-1.34 (m, 2H) | 72.51, 58.92, 51.19, 47.85, 42.70, 35.33, 29.05, 28.94 |
| 115 | ¹H NMR (Chloroform-d) δ 8.87 (s, 1H), 8.81 (s, 1H), 7.35 (td, J = 8.2, 5.9 Hz, 1H), 7.25 (dd, J = 8.1, 1.0 Hz, 1H), 7.12-7.04 (m, 2H), 7.10-6.79 (m, 1H), 6.37 (t, J = 4.3 Hz, 1H), 4.61 (t, J = 6.9 Hz, 1H), 4.29 (d, J = 6.0 Hz, 2H), 3.85 (dd, J = 6.9, 5.1 Hz, 2H), 3.10 (d, J = 11.3 Hz, 1H), 2.94 (d, J = 11.1 Hz, 1H), 2.26 (td, J = 11.2, 2.2 Hz, 1H), 2.20-2.08 (m, 1H), 1.90-1.75 (m, 3H), 1.56-1.31 (m, 2H) | ¹³C NMR (Chloroform-d) δ 170.19, 162.37, 159.56 (d, J = 251.6 Hz), 159.11, 155.95 (q, J = 36.0 Hz), 152.83, 147.24 (t, J= 25.7 Hz), 137.09, 132.35 (d, J = 5.4 Hz), 131.34, 125.72 (d, J = 3.5 Hz), 124.91 (d, J = 21.4 Hz), 124.49-116.06 (m), 114.91-114.36 (m), 114.06-108.76 (m), 105.57 (q, J = 3.0 Hz), 71.56, 58.96, 51.11, 47.74, 42.76, 35.20, 29.03, 28.89 |
| 116 | ¹H NMR (Chloroform-d) δ 8.81 (s, 1H), 8.03 (dd, J = 4.8, 0.9 Hz, 1H), 7.93 (d, J = 2.3 Hz, 1H), 7.38-7.31 (m, 2H), 7.24 (dt, J = 8.0, 0.9 Hz, 1H), 7.12-7.02 (m, 1H), 7.12-6.80 (m, 1H), 6.75 (dd, J = 2.3, 0.9 Hz, 1H), 6.42 (t, J = 4.7 Hz, 1H), 4.62 (t, J = 7.0 Hz, 1H), 4.32 (d, J = 6.1 Hz, 2H), 3.93-3.79 (m, 2H), 3.09 (d, J = 11.3 Hz, 1H), 2.95 (d, J = 10.9 Hz, 1H), 2.34-2.23 (m, 1H), 2.20-2.10 (m, 1H), 1.98-1.82 (m, 3H), 1.58-1.33 (m, 2H) | ¹³C NMR (Chloroform-d) δ 162.37, 159.56 (d, J = 251.6 Hz), 156.65, 152.80, 147.23 (t, J = 25.6 Hz), 140.89, 137.06, 132.35 (d, J = 5.2 Hz), 131.27 (d, J = 9.2 Hz), 128.53, 125.72 (d, J = 3.6 Hz), 125.67, 124.93 (d, J = 21.3 Hz), 117.11, 114.58 (d, J = 21.9 Hz), 114.10 108.94 (m), 98.19, 70.64, 58.93, 51.20, 47.72, 42.76, 35.33, 29.22, 29.06 |
| 117 | ¹H NMR (Chloroform-d) δ 8.80 (s, 1H), 8.42 (dd, J = 7.5, 0.8 Hz, 1H), 7.96 (d, J = 2.2 Hz, 1H), 7.35 (td, J = 8.3, 5.9 Hz, 1H), 7.27-7.22 (m, 1H), 7.07 (td, J = 8.5, 1.0 Hz, 1H), 6.95 (t, J = 54.2 Hz, 1H), 6.41 (t, J = 4.7 Hz, 1H), 6.32 (dd, J = 2.2, 0.8 Hz, 1H), 6.30 (d, J = 7.5 Hz, 1H), 4.61 (t, J = 7.0 Hz, 1H), 4.22 (d, J = 6.4 Hz, 2H), 3.85 (dd, J = 7.3, 4.8 Hz, 2H), 3.09 (d, J = 11.4 Hz, 1H), 2.93 (d, J = 11.1 Hz, 1H), 2.37-2.22 (m, 1H), 2.20-2.08 (m, 1H), 1.96-1.75 (m, 3H), 1.53-1.32 (m, 2H) | ¹³C NMR (Chloroform-d) δ 162.38, 161.46, 159.56 (d, J = 251.6 Hz), 152.81, 147.21 (t, J = 25.7 Hz), 147.18, 144.96, 137.13, 136.80, 132.35 (d, J = 5.3 Hz), 131.27 (d, J = 9.1 Hz), 125.72 (d, J = 3.5 Hz), 124.93 (d, J = 21.4 Hz), 114.58 (d, J = 21.8 Hz), 111.49 (t, J = 237.6 Hz), 100.17, 94.43, 70.77, 58.95, 51.19, 47.78, 42.77, 35.24, 29.20, 29.05 |
| 118 | ¹H NMR (Chloroform-d) δ 9.06 (s, 1H), 8.96 (s, 1H), 8.83 (s, 1H), 7.43-7.33 (m, 2H), 7.28-7.25 (m, 1H), 7.11 (t, J = 8.4 Hz, 1H), 6.98 (t, J = 54.2 Hz, 1H), 6.37-6.25 (m, 1H), 4.67 (t, J = 7.0 Hz, 1H), 4.22 (d, J = 5.8 Hz, 2H), 3.97-3.82 (m, 2H), 3.26-3.10 (m, 1H), 3.08-2.98 (m, 1H), 2.41-2.28 (m, 1H), 2.26-2.15 (m, 1H), 2.03-1.87 (m, 3H), 1.52-1.30 (m, 2H) | |
| 119 | ¹H NMR (Chloroform-d) δ 8.86 (s, 1H), 8.82 (s, 1H), 7.72 (d, J = 4.8 Hz, 1H), 7.38 (d, J = 4.8 Hz, 1H), 7.34 (td, J = 8.4, 6.3 Hz, 2H), 7.24 (d, J = 8.1 Hz, 1H), 7.13-7.03 (m, 1H), 6.89 (t, J = 54.1 Hz, 1H), 4.76-4.56 (m, 1H), 4.43 (d, J = 6.1 Hz, 2H), 3.96-3.74 (m, 2H), 3.22-3.05 (m, 1H), 3.01-2.87 (m, 1H), 2.44-2.08 (m, 2H), 2.03-1.90 (m, 3H), 1.68-1.36 (m, 2H) | |
| 120 | ¹H NMR (Chloroform-d) δ 8.80 (s, 1H), 8.02 (dd, J = 4.9, 1.7 Hz, 1H), 7.63 (dd, J = 7.6, 1.7 Hz, 1H), 7.34 (td, J = 8.3, 5.9 Hz, 1H), 7.24 (dt, J = 8.1, 0.9 Hz, 1H), 7.07 (td, J = 8.5, 1.0 Hz, 1H), 6.95 (t, J = 54.2 Hz, 1H), 6.84 (dd, J = 7.6, 4.9 Hz, 1H), 6.47 (t, J = 4.5 Hz, 1H), 4.68-4.56 (m, 1H), 4.21 (d, J = 6.3 Hz, 2H), 3.91-3.74 (m, 2H), 3.07 (d, J = 11.3 Hz, 1H), 2.98-2.86 (m, 1H), 2.27 (td, J = 11.5, 2.3 Hz, 1H), 2.13 (td, J = 11.3, 2.2 Hz, 1H), 1.97-1.79 (m, 3H), 1.55-1.32 (m, 2H) | ¹³C NMR (Chloroform-d) δ 162.39, 159.57 (d, J = 251.8 Hz), 159.14, 152.77, 147.18 (t, J = 25.5 Hz), 144.58, 138.24, 137.00, 132.35 (d, J = 5.3 Hz), 131.24 (d, J = 9.1 Hz), 125.71 (d, J = 3.4 Hz), 124.94 (d, J = 21.3 Hz), 118.40, 117.27, 114.57 (d, J = 21.9 Hz), 113.95-108.69 (m), 70.79, 58.86, 51.29, 47.64, 42.73, 35.42, 29.18, 29.04 |
| 121 | ¹H NMR (Chloroform-d) δ 9.03 (dd, J = 4.4, 1.8 Hz, 1H), 8.82 (s, 1H), 8.54 (d, J = 8.0 Hz, 1H), 8.19 (d, J = 6.1 Hz, 1H), | ¹³C NMR (Chloroform-d) δ 162.43, 160.74, 159.56 (d, J = 251.7 Hz), 154.36, 152.88, |

| Example | ¹H-NMR 400 | ¹³C-NMR 101 |
|---|---|---|
| | 7.51-7.42 (m, 2H), 7.35 (td, J = 8.3, 5.9 Hz, 1H), 7.24 (dt, J = 8.1, 0.9 Hz, 1H), 7.07 (td, J = 8.5, 1.0 Hz, 1H), 6.96 (t, J = 54.1 Hz, 1H), 6.52-6.36 (m, 1H), 4.71-4.59 (m, 1H), 4.37 (d, J = 6.0 Hz, 2H), 3.98-3.79 (m, 2H), 3.23-3.03 (m, 1H), 3.05-2.84 (m, 1H), 2.44-2.24 (m, 1H), 2.27-2.10 (m, 1H), 2.03-1.87 (m, 3H), 1.63-1.37 (m, 2H) | 147.88-146.60 (m), 143.51, 137.14, 132.66, 132.34 (d, J = 5.3 Hz), 131.29 (d, J = 9.1 Hz), 125.72 (d, J = 3.5 Hz), 124.89 (d, J = 19.2 Hz), 121.73, 116.42, 115.24, 114.58 (d, J = 21.9 Hz), 114.16-108.57 (m), 70.69, 58.99, 51.31, 47.83, 42.74, 35.47, 29.36, 29.13 |
| 122 | ¹H NMR (Chloroform-d) δ 8.81 (s, 1H), 8.68 (s, 1H), 8.62 (d, J = 6.0 Hz, 1H), 7.34 (td, J = 8.2, 5.9 Hz, 1H), 7.24 (dt, J = 8.1, 0.9 Hz, 1H), 7.12-7.03 (m, 1H), 7.12-6.81 (m, 1H), 6.88 (d, J = 5.9 Hz, 1H), 6.39 (t, J = 4.3 Hz, 1H), 4.63 (t, J = 7.0 Hz, 1H), 4.02-3.92 (m, 2H), 3.85 (dd, J = 7.0, 5.1 Hz, 2H), 3.11 (d, J = 11.4 Hz, 1H), 2.97 (d, J = 11.1 Hz, 1H), 2.36-2.23 (m, 1H), 2.19-2.11 (m, 1H), 1.98-1.83 (m, 3H), 1.59-1.33 (m, 2H) | ¹³C NMR (Chloroform-d) δ 165.91, 162.39, 159.56 (d, J = 251.6 Hz), 154.56, 154.25, 152.86, 147.29 (t, J = 25.5 Hz), 136.95, 132.34 (d, J = 5.3 Hz), 131.26 (d, J = 9.2 Hz), 125.73 (d, J = 3.4 Hz), 124.88 (d, J = 21.3 Hz), 114.60 (d, J = 22.0 Hz), 114.06, 111.53 (t, J = 237.5 Hz), 107.36, 100.34, 73.41, 58.96, 51.07, 47.59, 42.77, 35.39, 28.86, 28.80 |
| 123 | ¹H NMR (Chloroform-d) δ 8.80 (s, 1H), 8.53 (d, J = 0.8 Hz, 1H), 8.00 (d, J = 0.8 Hz, 1H), 7.35 (ddd, J = 8.8, 7.2, 5.6 Hz, 1H), 7.24 (dd, J = 8.1, 1.0 Hz, 1H), 7.15-7.02 (m, 1H), 6.88 (d, J = 54.2 Hz, 1H), 6.43 (t, J = 5.1 Hz, 1H), 4.61 (t, J = 7.0 Hz, 1H), 4.40 (d, J = 6.0 Hz, 2H), 4.10 (s, 3H), 3.84 (dd, J = 7.0, 5.0 Hz, 2H), 3.09 (d, J = 11.3 Hz, 1H), 2.95 (d, J = 11.0 Hz, 1H), 2.35-2.23 (m, 1H), 2.17-2.09 (m, 1H), 1.95-1.83 (m, 3H), 1.56-1.33 (m, 2H) | ¹³C NMR (Chloroform-d) δ 163.74, 162.37, 159.55 (d, J = 251.7 Hz), 155.03, 154.72, 152.81, 147.23 (t, J = 25.6 Hz), 137.02, 132.33 (d, J = 5.3 Hz), 131.29 (d, J = 9.1 Hz), 130.95, 125.71 (d, J = 3.5 Hz), 124.92 (d, J = 21.3 Hz), 114.57 (d, J = 21.9 Hz), 114.07-108.84 (m), 102.66, 70.96, 58.93, 51.18, 47.67, 42.75, 35.37, 34.16, 29.14, 28.99 |
| 124 | ¹H NMR (Chloroform-d) δ 8.80 (s, 1H), 7.65 (q, J = 8.1 Hz, 1H), 7.35 (td, J = 8.2, 5.9 Hz, 1H), 7.25 (dt, J = 8.2, 0.9 Hz, 1H), 7.08 (td, J = 8.6, 1.0 Hz, 1H), 6.95 (t, J = 54.1 Hz, 1H), 6.58 (dd, J = 8.0, 1.6 Hz, 1H), 6.46 (dd, J = 7.7, 2.5 Hz, 1H), 6.47-6.37 (m, 1H), 4.60 (t, J = 7.0 Hz, 1H), 4.11 (d, J = 6.5 Hz, 2H), 3.91-3.76 (m, 2H), 3.07 (d, J = 11.3 Hz, 1H), 2.92 (d, J = 10.7 Hz, 1H), 2.26 (td, J = 11.7, 2.6 Hz, 1H), 2.11 (td, J = 11.4, 2.3 Hz, 1H), 1.93-1.69 (m, 3H), 1.48-1.29 (m, 2H) | ¹³C NMR (Chloroform-d) δ 163.05 (d, J = 13.6 Hz), 162.39, 162.18 (d, J = 240.2 Hz), 159.57 (d, J = 251.6 Hz), 152.80, 147.19 (t, J = 25.7 Hz), 142.54 (d, J = 7.9 Hz), 137.11, 132.35 (d, J = 5.4 Hz), 131.26 (d, J = 9.1 Hz), 125.72 (d, J = 3.6 Hz), 124.94 (d, J = 21.4 Hz), 114.59 (d, J = 21.7 Hz), 114.01-108.76 (m), 107.10 (d, J = 5.2 Hz), 99.85 (d, J = 35.6 Hz), 70.61, 58.90, 51.24, 47.77, 42.73, 35.42, 29.20, 29.04 |
| 125 | ¹H NMR (Chloroform-d) δ 8.80 (s, 1H), 8.09 (dd, J = 9.0, 5.8 Hz, 1H), 7.35 (td, J = 8.2, 5.9 Hz, 1H), 7.24 (dt, J = 8.2, 0.9 Hz, 1H), 7.07 (td, J = 8.5, 1.0 Hz, 1H), 6.95 (t, J = 54.2 Hz, 1H), 6.70-6.64 (m, 1H), 6.48-6.37 (m, 1H), 6.41 (dd, J = 10.2, 2.2 Hz, 1H), 4.60 (t, J = 7.0 Hz, 1H), 4.14 (d, J = 6.4 Hz, 2H), 3.90-3.75 (m, 2H), 3.07 (d, J = 11.3 Hz, 1H), 2.92 (d, J = 11.1 Hz, 1H), 2.26 (td, J = 11.6, 2.5 Hz, 1H), 2.15-2.06 (m, 1H), 1.92-1.82 (m, 2H), 1.81-1.70 (m, 1H), 1.51-1.28 (m, 2H) | ¹³C NMR (Chloroform-d) δ 170.22 (d, J = 259.3 Hz), 165.99 (d, J = 12.6 Hz), 162.38, 159.57 (d, J = 251.7 Hz), 152.79, 148.74 (d, J = 9.1 Hz), 147.18 (t, J = 25.6 Hz), 137.15, 132.36 (d, J = 5.4 Hz), 131.25 (d, J = 9.2 Hz), 125.71 (d, J = 3.5 Hz), 124.95 (d, J = 21.3 Hz), 114.57 (d, J = 21.8 Hz), 114.05-108.38 (m), 105.97 (d, J = 18.5 Hz), 97.76 (d, J = 20.2 Hz), 70.65, 58.93, 51.25, 47.82, 42.75, 35.47, 29.21, 29.06 |
| 126 | ¹H NMR (Chloroform-d) δ 8.82 (s, 1H), 8.02 (d, J = 5.8 Hz, 1H), 7.35 (td, J = 8.2, 5.9 Hz, 1H), 7.25 (dt, J = 8.2, 0.9 Hz, 1H), 7.08 (td, J = 8.5, 8.1, 1.4 Hz, 1H), 7.11-6.80 (m, 1H), 6.69 (ddd, J = 5.8, 2.2, 1.1 Hz, 1H), 6.36 (d, J = 2.1 Hz, 1H), 6.42-6.30 (m, 1H), 4.62 (s, 1H), 3.88 (s, 2H), 3.85 (d, J = 6.1 Hz, 2H), 3.12 (d, J = 11.4 Hz, 1H), 2.96 (d, J = 11.0 Hz, 1H), 2.29 (t, J = 11.7 Hz, 1H), 2.14 (t, J = 11.4 Hz, 1H), 1.94-1.76 (m, 3H), 1.54-1.31 (m, 2H) | ¹³C NMR (Chloroform-d) δ 168.80 (d, J = 11.5 Hz), 165.29 (d, J = 235.2 Hz), 162.37, 159.56 (d, J = 251.6 Hz), 152.84, 148.03 (d, J = 18.6 Hz), 137.06, 132.36 (d, J = 5.1 Hz), 131.30 (d, J = 9.3 Hz), 125.73 (d, J = 3.6 Hz), 124.86 (d, J = 28.7 Hz), 114.58 (d, J = 21.9 Hz), 114.08-108.98 (m), 109.32 (d, J = 3.9 Hz), 107.87, 94.48 (d, J = 41.8 Hz), 72.72, 59.00, 51.15, 47.78, 42.77, 35.48, 29.04, 28.91 |
| 127 | ¹H NMR (Chloroform-d) δ 8.83 (s, 1H), 8.48 (d, J = 5.8 Hz, 1H), 7.36 (td, J = 8.2, 5.9 Hz, 1H), 7.25 (dt, J = 8.1, | ¹³C NMR (Chloroform-d) δ 163.87, 162.39, 159.52 (d, J = 251.5 Hz), 152.99, 152.35, |

| Example | ¹H-NMR 400 | ¹³C-NMR 101 |
|---|---|---|
|  | 0.9 Hz, 1H), 7.17 (d, J = 2.5 Hz, 1H), 7.08 (td, J = 8.6, 1.1 Hz, 1H), 7.15-6.81 (m, 2H), 6.37-6.24 (m, 1H), 4.73-4.62 (m, 1H), 4.51-4.39 (m, 1H), 3.99-3.75 (m, 2H), 2.96-2.78 (m, 2H), 2.64-2.42 (m, 2H), 2.14-1.99 (m, 2H), 1.99-1.78 (m, 2H) | 148.03-147.02 (m), 136.87, 135.17, 132.31 (d, J = 5.3 Hz), 131.38 (d, J = 9.0 Hz), 125.76 (d, J = 3.5 Hz), 124.80 (d, J = 22.0 Hz), 117.10, 116.37, 114.61 (d, J = 21.8 Hz), 113.71, 111.62 (t, J = 237.6 Hz), 73.15, 58.84, 46.77, 46.08, 42.83, 30.46, 30.40 |

PHARMACOLOGICAL EXAMPLES

The Compounds of the Invention were Found to be Active on a Human P2X7 Channel Calcium-Influx Assay Extracellular binding of Bz-ATP to P2X7 receptor opens the channel and allows $Ca^{2+}$ influx into the cells. This $Ca^{2+}$ entry was measured in HEK-293 cells stably transfected with P2X7 receptor using Screen Quest™ Fluo-8 No Wash Calcium Assay Kit (AAt Bioquest®, cat. 36316). Once inside the cell, the lipophilic blocking groups of Fluo-8 are cleaved by non-specific cell esterases, resulting in a negatively-charged fluorescent dye that stays inside cells. Its fluorescence increases upon binding to calcium. When HEK-293/P2X7 cells are stimulated with Bz-ATP, $Ca^{2+}$ enters the cells and the fluorescence of Fluo-8 NW increases. The dye has an absorption spectrum compatible with excitation at 488 nm by argon laser sources and its emission wavelength is in the range of 515-575 nm.

HEK-293 cells stably transfected with P2X7 receptor were seeded overnight in growth medium at 10,000 to 20,000 cells/well in 384-well plate. 24 hours later, the medium was removed, and the cells were pre-loaded at RT for 1 hour with 20 µL/w of Fluo-8 NW. Then 10 µL/w of test compounds and reference antagonist A438079 at 3X-concentration were injected with the FLIPRTETRA and the kinetic response over a period of five minutes was monitored. A second injection of 15 µL/w of 3× reference activator (Bz-ATP at EGO was performed with the FLIPRTETRA and the signal of the emitted fluorescence was recorded for additional three minutes. All the experiment was carried out in a Low Divalent Cation Assay Buffer (0.3 mM $Ca^{2+}$ and 0 mM $Mg^{2+}$). The effect of the test compounds was measured as percent inhibition vs the reference antagonist and $IC_{50}$ values were calculated accordingly.

| Example | hP2X7 IC$_{50}$ (nM) | mP2X7 IC$_{50}$ (nM) |
|---|---|---|
| 1 | 21.7 | 53.5 |
| 2 | 35.9 | 36.9 |
| 3 | 37.7 | 80.8 |
| 4 | 58.2 | 408 |
| 5 | 23.7 | 26.9 |
| 6 | 49.9 | 69.7 |
| 7 | 32.6 | 28.9 |
| 8 | 47.8 | 170 |
| 9 | 64.0 | 53.9 |
| 10 | 23.5 | 191 |
| 11 | 50.5 | 183 |
| 12 | 11.8 | 43.9 |
| 13 | 19.2 | 33.4 |
| 16 | 56.9 | 68.3 |
| 17 | 55.0 | 320 |
| 18 | 41.1 | 186 |
| 20 | 17.5 | 14.0 |
| 22 | 20.5 | 12.3 |
| 23 | 73.6 | 183 |
| 24 | 98.1 | 32.4 |
| 25 | 57.7 | 45.8 |
| 28 | 64.4 | 206 |
| 29 | 31.7 | 87.6 |
| 30 | 17.3 | 24.0 |
| 31 | 61.2 | 136 |
| 32 | 21.3 | 82.0 |
| 33 | 39.9 | 52.5 |
| 34 | 55.5 | 174 |
| 35 | 71.1 | 190 |
| 36 | 53.8 | 126 |
| 37 | 28.0 | 28.5 |
| 38 | 57.5 | 79.6 |
| 39 | 51.1 | 44.6 |
| 40 | 32.7 | 50.6 |
| 42 | 60.8 | 108 |
| 43 | 69.2 | 63.9 |
| 44 | 27.9 | 30.6 |
| 45 | 254 | 550 |
| 46 | 264 | 658 |
| 47 | 31.0 | 43.9 |
| 48 | 74.9 | 36.0 |
| 49 | 19.4 | 19.5 |
| 50 | 89.0 | 224 |
| 51 | 62.2 | 68.7 |
| 52 | 274 | 571 |
| 53 | 41.5 | 38.7 |
| 54 | 22.8 | 52.9 |
| 55 | 22.9 | 34.0 |
| 56 | 53.8 | 82.0 |
| 58 | 27.4 | 11.5 |
| 59 | 29.4 | 56.1 |
| 63 | 41.2 | 49.3 |
| 64 | 65.8 | 209 |
| 65 | 56.2 | 96.2 |
| 67 | 62.3 | 64.5 |
| 68 | 16.6 | 24.6 |
| 70 | 50.0 | 101 |
| 71 | 58.9 | 222 |
| 72 | 11.9 | 29.4 |
| 73 | 64.9 | 70.9 |
| 75 | 53.8 | 82.1 |
| 76 | 43.7 | 28.9 |
| 77 | 11.1 | 13.4 |
| 78 | 73.1 | 180 |
| 79 | 30.1 | 41.4 |
| 80 | 20.3 | 36.9 |
| 81 | 20.1 | 38.1 |
| 82 | 15.2 | 41.9 |
| 83 | 13.0 | 32.7 |
| 85 | 32.4 | 68.7 |
| 87 | 36.9 | 30.4 |
| 88 | 27.8 | 25.2 |
| 89 | 29.2 | 24.1 |
| 90 | 20.0 | 25.7 |
| 91 | 39.5 | 38.9 |
| 92 | 22.5 | 33.5 |
| 93 | 43.6 | 22.7 |
| 97 | 34.0 | 13.8 |
| 99 | 22.8 | 15.2 |
| 100 | 37.8 | 66.7 |

| Example | hP2X7 IC$_{50}$ (nM) | mP2X7 IC$_{50}$ (nM) |
|---|---|---|
| 101 | 87.8 | 76.6 |
| 102 | 32.0 | 33.8 |
| 103 | 21.1 | 34.0 |
| 104 | 49.6 | 103 |
| 105 | 48.4 | 30.4 |
| 106 | 39.6 | 30.5 |
| 107 | 55.2 | 24.2 |
| 108 | 25.6 | 13.2 |
| 109 | 24.9 | 19.2 |
| 110 | 40.6 | 25.0 |
| 111 | 22.5 | 16.1 |
| 113 | 38.5 | 17.5 |
| 114 | 50.7 | 37.2 |
| 115 | 74.5 | 44.3 |
| 116 | 28.5 | 11.3 |
| 117 | 48.2 | 35.8 |
| 118 | 214 | 256 |
| 120 | 32.5 | 16.4 |
| 122 | 39.6 | 44.2 |
| 124 | 18.1 | 18.5 |
| 125 | 16.1 | 23.0 |
| 126 | 36.5 | 34.7 |
| 127 | 49.0 | 61.7 |

In Vitro Evaluation of Test Compounds for CYP4503A4 Metabolic Induction Using Human Liver Hepatocytes.

CYP induction assessment was performed using human cryopreserved platable hepatocytes. Test compound was assessed at three or six different concentrations in duplicate.

A sandwich culture of platable cryopreserved hepatocytes was used with one day recovery period after plating. Assessment of cell morphology and confluency was performed using a phase-contrast microscope for representative wells. Experiments were carried forward if confluency was greater than 75% to ensure maximum induction response.

The plated hepatocyte cell monolayers were treated with test compound, negative and positive controls for two days changing medium every 24 hours. On the fourth day, assessment of cell morphology and confluency was repeated to ensure cell monolayer integrity. Assessment of cell morphology and confluency was performed using a phase-contrast microscope for representative wells.

Cell monolayers were assessed for test compound cytotoxicity by an adenosine triphosphate (ATP) content assay in a separate plate.

Expression levels of mRNA for CYP1A2, CYP2B6, and CYP3A4 were evaluated by the QuantiGene® Plex 2.0 methodology. For the induction experiments to be acceptable, mRNA expression induction fold for CYP3A4 positive controls should exhibit ≥4-fold negative vehicle control.

Compounds of the invention were shown to have an unexpected advantage over compounds of the prior art in that they are not liable, or much less liable, to metabolism induction mediated by CYP4503A4, as exemplified here below.

| Example | CYP4503A4 mRNA fold increase at 10 μM |
|---|---|
| 2 | 4.8 |
| 3 | 4.4 |
| 5 | 5.0 |
| 7 | 5.6 |
| 8 | 2.2 |
| 9 | 2.6 |
| 11 | 7.9 |
| 13 | 9.7 |
| 32 | 6.0 |
| 45 | 1.9 |
| 46 | 4.5 |
| 48 | 7.6 |
| 65 | 4.9 |
| 73 | 2.4 |
| 75 | 2.2 |
| 76 | 5.1 |
| 78 | 3.6 |
| 80 | 6.0 |
| 81 | 4.8 |
| 85 | 9.7 |
| 87 | 6.4 |
| 91 | 7.4 |
| 93 | 6.5 |
| 101 | 3.9 |
| 103 | 5.0 |
| 104 | 7.4 |
| 106 | 4.9 |
| 110 | 6.5 |
| 116 | 9.8 |
| 124 | 6.9 |
| 125 | 5.5 |
| 127 | 6.3 |
| Ex No 102 of WO2015119018 | 10.5 |
| Ex No 29 of WO2018041253 | 18.9 |
| Ex No 30 of WO2018041253 | 21.2 |

The invention claimed is:

1. A compound of the following formula (I) or a pharmaceutically acceptable salt thereof:

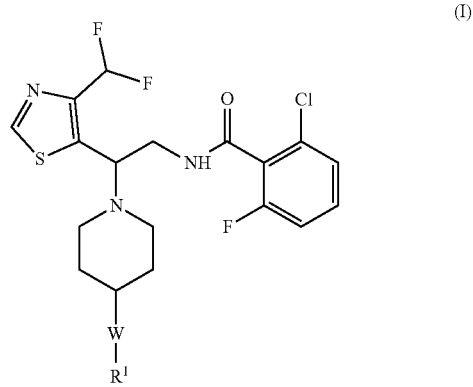

(I)

including any stereochemically isomeric form thereof, wherein

W is oxygen, —O—C1-C4 alkyl-, or —C1-C4 alkyl-O—; and

R$^1$ is a monocyclic or bicyclic five to ten membered heterocyclic ring optionally substituted with one or more groups selected from C1-C4 alkyl optionally substituted with halogen, C1-C4 alkoxy, halogen, cyano, C3-C6 cycloalkyl; and a benzofused heterocycle.

2. A compound according to claim 1 or a pharmaceutically acceptable salt thereof, including any stereochemically isomeric form thereof, wherein R$^1$ is pyridine, mono or di-substituted with one or more groups selected from cyano, methyl, halogen, trifluoromethyl group and C3-C7 cycloalkyl; pyrimidine, mono or di-substituted with one or more groups selected from cyano, methyl, trifluoromethyl, C3-C7 alkoxy, C3-C7 cycloalkoxy, and halogen; oxazole, mono or di-substituted with one or more groups selected from C3-C7 cycloalkyl, methyl, and halogen; thiazole, mono or di-substituted with one or more groups selected from C3-C7 cycloalkyl, cyano, methyl, and halogen; benzothiazole; benzoxazole; thiadiazole, mono or di-substituted with one or more groups selected from methyl, halogen, phenyl, and C1-C4 alkoxy; tetrazole optionally substituted with phenyl; benzodiazole optionally substituted with halogen; phenyl; pyridazine substituted with methyl or halogen; pyrazolo[1,5-a]pyrazine; [1,2,4]triazolo[4,3-a]pyrazine; naphthyridine; pyrazolo[3,4-d]pyrimidine; pyrazine, mono or di-substituted with one or more groups selected from C3-C7 cycloalkyl, methyl, heterocycle and halogen; [1,2]oxazolo[5,4-b]pyridine; or phthalazine.

3. A compound according to claim 1 or a pharmaceutically acceptable salt thereof, including any stereochemically isomeric form thereof, wherein W is oxygen, —CH$_2$O—, or —OCH$_2$—; and R$^1$ is pyridin-2-yl, pyridin-3-yl, pyridin-4-yl, pyrimidin-2-yl, 5-fluoropyridin-3-yl, 3-fluoropyridin-4-yl, 3-fluoropyridin-2-yl, 1,5-methyl-1,2-oxazol-3-yl, dimethyl-1,2-oxazol-4-yl, 1,3-thiazol-2-yl, 3-methyl-1,2,4-thiadiazol-5-yl, 4-chloro-1,3-thiazol-2-yl, 3-cyclopropyl-1,2,4-thiadiazol-5-yl, 6-methylpyridin-2-yl, 4-methylpyridin-2-yl, 5-cyanopyridin-3-yl, 3-cyanopyrazin-2-yl, 2-cyanopyrazin-3-yl, 2-chloropyridin-3-yl, 1,3-Benzothiazol-2-yl, 1,2-Benzoxazol-3-yl, 1,3-Benzoxazol-2-yl, 3-(2-methoxyethyl)-1,2,4-thiadiazol-5-yl, 3-phenyl-1,2,4-oxadiazol-5-yl, 1-phenyl-1H-1,2,3,4-tetrazol-5-yl, 4-fluoro-1-methyl-1H-1,3-benzodiazol-2-yl, 3-methylpyridin-2-yl, 5-methylpyrimidin-2-yl, 6-methylpyridazin-3-yl, 5-fluoropyridin-2-yl, 6-fluoropyrimidin-4-yl, 6-fluoropyridazin-3-yl, 6-fluoropyrazin-2-yl, 3-fluoropyrazin-2-yl, 2-fluoropyrimidin-4-yl, 3-cyanopyridin-2-yl, 6-cyanopyridin-2-yl, 4-cyanopyridin-3-yl, 6-fluoro-2-methylpyrimidin-4-yl, 6-fluoro-5-methylpyrimidin-4-yl, 6-cyclopropylpyridin-2-yl, 4-(trifluoromethyl)pyrimidin-2-yl, 6-(trifluoromethyl)pyrimidin-4-yl, pyrazolo[1,5-a]pyrazin-4-yl, [1,2,4]triazolo[4,3-a]pyrazin-5-yl, [1,2,4]triazolo[4,3-a]pyrazin-8-yl, 3-chloropyridin-2-yl, 1,5-naphthyridin-4-yl, 1,6-naphthyridin-5-yl, 3-cyanopyridin-4-yl,-methyl-1H-pyrazolo[3,4-d]pyrimidin-4-yl, 3-methyl-[1,2,4]triazolo[4,3-a]pyrazin-8-yl, 4-cyano-3-methyl-1,2-thiazol-5-yl,-fluoro-6-methylpyrimidin-4-yl, 2-fluoro-5-methylpyrimidin-4-yl, 5-fluoro-6-methylpyrimidin-4-yl, 3-(difluoromethoxy)pyridin-2-yl, 3-(difluoromethoxy)pyridin-2-yl, 6-(1H-pyrazol-1-yl) pyrazin-2-yl, 3-(trifluoromethyl) pyridin-2-yl, 6-(trifluoromethyl)pyridin-2-yl, 2-(trifluoromethyl) pyridin-4-yl, 3,6-dimethyl-[1,2]oxazolo[5,4-b]pyridin-4-yl, 2-methoxypyrimidin-4-yl, 4-methoxypyrimidin-2-yl, 6-methoxypyrimidin-4-yl, -cyclobutoxypyrazin-2-yl, 5-fluoro-2,6-dimethylpyrimidin-4-yl, 4-chloropyridin-3-yl, pyrazin-2-yl, pyridazin-3-yl, 6-fluoropyridin-2-yl, 2-methylpyridin-4-yl, 2-chloropyrimidin-4-yl, 4-chloropyrimidin-2-yl, 6-chloropyrazin-2-yl, 6-chloropyridin-2-yl, pyrimidin-4-yl, 2-fluoropyridin-4-yl, 4-fluoropyridin-2-yl, 1,3-thiazol-2-yl, 4-chloro-1,3-thiazol-2-yl, 4-methyl-1,3-thiazol-2-yl, 3-methyl-1,2,4-thiadiazol-5-yl, 4-cyano-1-methyl-1H-pyrazol-5-yl, 3-cyclopropyl-1,2,4-thiadiazol-5-yl, 6-methylpyridin-2-yl, 4-methylpyridin-2-yl, 2-cyanopyridin-3-yl, 5-cyanopyridin-3-yl, 3-cyanopyrazin-2-yl, 1,3-Benzothiazol-2-yl, 1,2-Benzoxazol-3-yl, 3-(2-methoxyethyl)-1,2,4-thiadiazol-5-yl, 4-phenyl-4H-1,2,4-triazol-3-yl, 1-phenyl-1H-1,2,3,4-tetrazol-5-yl, 4-fluoro-1-methyl-1H-1,3-benzodiazol-2-yl, 3-methylpyridin-2-yl, 5-methylpyrimidin-2-yl, 6-methylpyridazin-3-yl, 5-fluoropyridin-2-yl, 6-fluoropyrimidin-4-yl, 6-fluoropyridazin-3-yl, 6-fluoropyrazin-2-yl, 3-fluoropyrazin-2-yl, 2-fluoropyrimidin-4-yl, 3-cyanopyridin-2-yl, 6-cyanopyridin-2-yl, 2-cyanopyridin-4-yl, 4-cyanopyridin-3-yl, 6-fluoro-2-methylpyrimidin-4-yl, 6-fluoro-5-methylpyrimidin-4-yl, 4-(trifluoromethyl)pyridin-2-yl, 6-(trifluoromethyl)pyrimidin-4-yl, pyrazolo[1,5-a]pyrazin-4-yl, pyrazolo[1,5-a]pyrimidin-5-yl, [1,2,4]triazolo[4,3-a]pyrazin-5-yl, [1,2,4]triazolo[4,3-a]pyrazin-8-yl, 3-chloropyridin-2-yl, 1,6-naphthyridin-5-yl, 3-cyanopyridin-4-yl, 1-methyl-1H-pyrazolo[3,4-d]pyrimidin-4-yl, 6-fluoropyridin-2-yl, 2-fluoropyridin-4-yl, or 4-fluoropyridin-2-yl, or 2-cyanopyridin-4-yl.

4. A compound according to claim 1 or a pharmaceutically acceptable salt thereof, including any stereochemically isomeric form thereof, selected from the group consisting of:

| | Name |
|---|---|
| 1 | 2-chloro-N-{2-[4-(difluoromethyl)-1,3-thiazol-5-yl]-2-[4-(pyridin-2-yloxy)piperidin-1-ylethyl}-6-fluorobenzamide |
| 2 | 2-chloro-N-{2-[4-(difluoromethyl)-1,3-thiazol-5-yl]-2-[4-(pyridin-3-yloxy)piperidin-1-yl]ethyl}-6-fluorobenzamide |
| 3 | 2-chloro-N-{2-[4-(difluoromethyl)-1,3-thiazol-5-yl]-2-[4-(pyridin-4-yloxy)piperidin-1-yl]ethyl}-6-fluorobenzamide |
| 4 | 2-chloro-N-{2-[4-(difluoromethyl)-1,3-thiazol-5-yl]-2-[4-(pyrimidin-2-yloxy)piperidin-1-yl]ethyl}-6-fluorobenzamide |
| 5 | 2-chloro-N-{2-[4-(difluoromethyl)-1,3-thiazol-5-yl]-2-{4-[(5-fluoropyridin-3-yl)oxy]piperidin-1-yl}ethyl}-6-fluorobenzamide |
| 6 | 2-chloro-N-{2-[4-(difluoromethyl)-1,3-thiazol-5-yl]-2-{4-[(3-fluoropyridin-4-yl)oxy]piperidin-1-yl}ethyl}-6-fluorobenzamide |
| 7 | 2-chloro-N-{2-[4-(difluoromethyl)-1,3-thiazol-5-yl]-2-{4-[(3-fluoropyridin-2-yl)oxy]piperidin-1-yl}ethyl}-6-fluorobenzamide |

| | Name |
|---|---|
| 8 | 2-chloro-N-{2-[4-(difluoromethyl)-1,3-thiazol-5-yl]-2-{4-[(5-methyl-1,2-oxazol-3-yl)methoxy]piperidin-1-yl}ethyl}-6-fluorobenzamide |
| 9 | 2-chloro-N-{2-[4-(difluoromethyl)-1,3-thiazol-5-yl]-2-{4-[(dimethyl-1,2-oxazol-4-yl)methoxy]piperidin-1-yl}ethyl}-6-fluorobenzamide |
| 10 | 2-chloro-N-{2-[4-(difluoromethyl)-1,3-thiazol-5-yl]-2-[4-(1,3-thiazol-2-yloxy)piperidin-1-yl]ethyl}-6-fluorobenzamide |
| 11 | 2-Chloro-N-{2-[4-(difluoromethyl)-1,3-thiazol-5-yl]-2-{4-[(3-methyl-1,2,4-thiadiazol-5-yl)oxy]piperidin-1-yl}ethyl}-6-fluorobenzamide |
| 12 | 2-Chloro-N-(2-{4-[(4-chloro-1,3-thiazol-2-yl)oxy]piperidin-1-yl}-2-[4-(difluoromethyl)-1,3-thiazol-5-yl]ethyl)-6-fluorobenzamide |
| 13 | 2-Chloro-N-(2-{4-[(3-cyclopropyl-1,2,4-thiadiazol-5-yl)oxy]piperidin-1-yl}-2-[4-(difluoromethyl)-1,3-thiazol-5-yl]ethyl)-6-fluorobenzamide |
| 14 | 2-Chloro-N-{2-[4-(difluoromethyl)-1,3-thiazol-5-yl]-2-{4-[(6-methylpyridin-2-yl)oxy]piperidin-1-yl}ethyl}-6-fluorobenzamide |
| 15 | 2-Chloro-N-{2-[4-(difluoromethyl)-1,3-thiazol-5-yl]-2-{4-[(4-methylpyridin-2-yl)oxy]piperidin-1-yl}ethyl}-6-fluorobenzamide |
| 16 | 2-Chloro-N-(2-{4-[(5-cyanopyridin-3-yl)oxy]piperidin-1-yl}-2-[4-(difluoromethyl)-1,3-thiazol-5-yl]ethyl)-6-fluorobenzamide |
| 17 | 2-Chloro-N-(2-{4-[(3-cyanopyrazin-2-yl)oxy]piperidin-1-yl}-2-[4-(difluoromethyl)-1,3-thiazol-5-yl]ethyl)-6-fluorobenzamide |
| 18 | 2-Chloro-N-(2-{4-[(2-cyanopyridin-3-yl)oxy]piperidin-1-yl}-2-[4-(difluoromethyl)-1,3-thiazol-5-yl]ethyl)-6-fluorobenzamide |
| 19 | 2-Chloro-N-(2-{4-[(2-chloropyridin-3-yl)oxy]]piperidin-1-yl}-2-[4-(difluoromethyl)-1,3-thiazol-5-yl]ethyl)-6-fluorobenzamide |
| 20 | N-{2-[4-(1,3-Benzothiazol-2-yl oxy)piperidin-1-yl]-2-[4-(difluoromethyl)-1,3-thiazol-5-yl]ethyl}-2-chloro-6-fluorobenzamide |
| 21 | N-{2-[4-(1,2-Benzoxazol-3-yloxy)piperidin-1-yl]-2-[4-(difluoromethyl)-1,3-thiazol-5-yl]ethyl}-2-chloro-6-fluorobenzamide |
| 22 | N-{2-[4-(1,3-Benzoxazol-2-yloxy)piperidin-1-yl]-2-[4-(difluoromethyl)-1,3-thiazol-5-yl]ethyl}-2-chloro-6-fluorobenzamide |
| 23 | 2-Chloro-N-{2-[4-(difluoromethyl)-1,3-thiazol-5-yl]-2-(4-{[3-(2-methoxyethyl)-1,2,4-thiadiazol-5-yl]oxy}piperidin-1-yl)ethyl}-6-fluorobenzamide |
| 24 | 2-Chloro-N-{2-[4-(difluoromethyl)-1,3-thiazol-5-yl]-2-{4-[(3-phenyl-1,2,4-oxadiazol-5-yl)oxy]piperidin-1-yl}ethyl}-6-fluorobenzamide |
| 25 | 2-Chloro-N-{2-[4-(difluoromethyl)-1,3-thiazol-5-yl]-2-{4-[(1-phenyl-1H-1,2,3,4-tetrazol-5-yl)oxy]piperidin-1-yl}ethyl}-6-fluorobenzamide |
| 26 | 2-Chloro-N-{2-[4-(difluoromethyl)-1,3-thiazol-5-yl]-2-{4-[(4-fluoro-1-methyl-1H-1,3-benzodiazol-2-yl)oxy]piperidin-1-yl}ethyl}-6-fluorobenzamide |

| | Name |
|---|---|
| 27 | 2-Chloro-N-{2-[4-(difluoromethyl)-1,3-thiazol-5-yl]-2-{4-[(3-methylpyridin-2-yl)oxy]piperidin-1-yl}ethyl}-6-fluorobenzamide |
| 28 | 2-Chloro-N-{2-[4-(difluoromethyl)-1,3-thiazol-5-yl]-2-{4-[(5-methylpyrimidin-2-yl)oxy]piperidin-1-yl}ethyl}-6-fluorobenzamide |
| 29 | 2-Chloro-N-{2-[4-(difluoromethyl)-1,3-thiazol-5-yl]-2-{4-[(6-methylpyridazin-3-yl)oxy]piperidin-1-yl}ethyl}-6-fluorobenzamide |
| 30 | 2-Chloro-N-{2-[4-(difluoromethyl)-1,3-thiazol-5-yl]-2-{4-[(5-fluoropyridin-2-yl)oxy]piperidin-1-yl}ethyl}-6-fluorobenzamide |
| 31 | 2-Chloro-N-{2-[4-(difluoromethyl)-1,3-thiazol-5-yl]-2-{4-[(6-fluoropyrimidin-4-yl)oxy]piperidin-1-yl}ethyl}-6-fluorobenzamide |
| 32 | 2-Chloro-N-{2-[4-(difluoromethyl)-1,3-thiazol-5-yl]-2-{4-[(6-fluoropyridazin-3-yl)oxy]piperidin-1-yl}ethyl}-6-fluorobenzamide |
| 33 | 2-Chloro-N-{2-[4-(difluoromethyl)-1,3-thiazol-5-yl]-2-{4-[(6-fluoropyrazin-2-yl)oxy]piperidin-1-yl}ethyl}-6-fluorobenzamide |
| 34 | 2-Chloro-N-{2-[4-(difluoromethyl)-1,3-thiazol-5-yl]-2-{4-[(3-fluoropyrazin-2-yl)oxy]piperidin-1-yl}ethyl}-6-fluorobenzamide |
| 35 | 2-Chloro-N-{2-[4-(difluoromethyl)-1,3-thiazol-5-yl]-2-{4-[(2-fluoropyrimidin-4-yl)oxy]]piperidin-1-yl}ethyl}-6-fluorobenzamide |
| 36 | 2-Chloro-N-(2-{4-[(3-cyanopyridin-2-yl)oxy]piperidin-1-yl}-2-[4-(difluoromethyl)-1,3-thiazol-5-yl]ethyl)-6-fluorobenzamide |
| 37 | 2-Chloro-N-(2-{4-[(6-cyanopyridin-2-yl)oxy]piperidin-1-yl}-2-[4-(difluoromethyl)-1,3-thiazol-5-yl]ethyl)-6-fluorobenzamide |
| 38 | 2-Chloro-N-(2-{4-[(4-cyanopyridin-3-yl)oxy]piperidin-1-yl}-2-[4-(difluoromethyl)-1,3-thiazol-5-yl]ethyl)-6-fluorobenzamide |
| 39 | 2-Chloro-N-{2-[4-(difluoromethyl)-1,3-thiazol-5-yl]-2-{4-[(6-fluoro-2-methylpyrimidin-4-yl)oxy]piperidin-1-yl}ethyl}-6-fluorobenzamide |
| 40 | 2-Chloro-N-{2-[4-(difluoromethyl)-1,3-thiazol-5-yl]-2-{4-[(6-fluoro-5-methylpyrimidin-4-yl)oxy]piperidin-1-yl}ethyl}-6-fluorobenzamide |
| 41 | 2-Chloro-N-(2-{4-[(6-cyclopropylpyridin-2-yl)oxy]piperidin-1-yl}-2-[4-(difluoromethyl)-1,3-thiazol-5-yl]ethyl)-6-fluorobenzamide |
| 42 | 2-Chloro-N-{2-[4-(difluoromethyl)-1,3-thiazol-5-yl]-2-(4-{[4-(trifluoromethyl)pyrimidin-2-yl]oxy}piperidin-1-yl)ethyl}-6-fluorobenzamide |
| 43 | 2-Chloro-N-{2-[4-(difluoromethyl)-1,3-thiazol-5-yl]-2-(4-{[6-(trifluoromethyl)pyrimidin-4-yl]oxy}piperidin-1-yl)ethyl}-6-fluorobenzamide |
| 44 | 2-Chloro-N-{2-[4-(difluoromethyl)-1,3-thiazol-5-yl]-2-(4-{pyrazolo[1,5-a]pyrazin-4-yloxy}piperidin-1-yl)ethyl}-6-fluorobenzamide |

-continued

| | Name |
|---|---|
| 45 | 2-Chloro-N-{2-[4-(difluoromethyl)-1,3-thiazol-5-yl]-2-(4-{[1,2,4]triazolo[4,3-a]pyrazin-5-yloxy}piperidin-1-yl)ethyl}-6-fluorobenzamide |
| 46 | 2-Chloro-N-{2-[4-(difluoromethyl)-1,3-thiazol-5-yl]-2-(4-{[1,2,4]triazolo[4,3-a]pyrazin-8-yloxy}piperidin-1-yl)ethyl}-6-fluorobenzamide |
| 47 | 2-Chloro-N-(2-{4-[(3-chloropyridin-2-yl)oxy]piperidin-1-yl}-2-[4-(difluoromethyl)-1,3-thiazol-5-yl]ethyl)-6-fluorobenzamide |
| 48 | 2-Chloro-N-{2-[4-(difluoromethyl)-1,3-thiazol-5-yl]-2-[4-(1,5-naphthyridin-4-yloxy)piperidin-1-yl]ethyl}-6-fluorobenzamide |
| 49 | 2-Chloro-N-{2-[4-(difluoromethyl)-1,3-thiazol-5-yl]-2-[4-(1,6-naphthyridin-5-yloxy)piperidin-1-yl]ethyl}-6-fluorobenzamide |
| 50 | 2-Chloro-N-(2-{4-[(3-cyanopyridin-4-yl)oxy]piperidin-1-yl}-2-[4-(difluoromethyl)-1,3-thiazol-5-yl]ethyl)-6-fluorobenzamide |
| 51 | 2-Chloro-N-{2-[4-(difluoromethyl)-1,3-thiazol-5-yl]-2-[4-({1-methyl-1H-pyrazolo[3,4-d]pyrimidin-4-yl}oxy)piperidin-1-yl]ethyl}-6-fluorobenzamide |
| 52 | 2-Chloro-N-{2-[4-(difluoromethyl)-1,3-thiazol-5-yl]-2-[4-({3-methyl-[1,2,4]triazolo[4,3-a]pyrazin-8-yl}oxy)piperidin-1-yl]ethyl}-6-fluorobenzamide |
| 53 | 2-Chloro-N-(2-{4-[(4-cyano-3-methyl-1,2-thiazol-5-yl)oxy]piperidin-1-yl}-2-[4-(difluoromethyl)-1,3-thiazol-5-yl]ethyl)-6-fluorobenzamide |
| 54 | 2-Chloro-N-{2-[4-(difluoromethyl)-1,3-thiazol-5-yl]-2-{4-[(2-fluoro-6-methylpyrimidin-4-yl)oxy]piperidin-1-yl}ethyl}-6-fluorobenzamide |
| 55 | 2-Chloro-N-{2-[4-(difluoromethyl)-1,3-thiazol-5-yl]-2-{4-[(2-fluoro-5-methylpyrimidin-4-yl)oxy]piperidin-1-yl}ethyl}-6-fluorobenzamide |
| 56 | 2-Chloro-N-{2-[4-(difluoromethyl)-1,3-thiazol-5-yl]-2-{4-[(5-fluoro-6-methylpyrimidin-4-yl)oxy]piperidin-1-yl}ethyl}-6-fluorobenzamide |
| 57 | 2-Chloro-N-[2-(4-{[3-(difluoromethoxy)pyridin-2-yl]oxy}piperidin-1-yl)-2-[4-(difluoromethyl)-1,3-thiazol-5-yl]ethyl]-6-fluorobenzamide |
| 58 | 2-Chloro-N-{2-[4-(difluoromethyl)-1,3-thiazol-5-yl]-2-(4-{[6-(1H-pyrazol-1-yl)pyrazin-2-yl]oxy}piperidin-1-yl)ethyl}-6-fluorobenzamide |
| 59 | 2-Chloro-N-{2-[4-(difluoromethyl)-1,3-thiazol-5-yl]-2-(4-{[3-(trifluoromethyl)pyridin-2-yl]oxy}piperidin-1-yl)ethyl}-6-fluorobenzamide |
| 60 | 2-Chloro-N-{2-[4-(difluoromethyl)-1,3-thiazol-5-yl]-2-(4-{[6-(trifluoromethyl)pyridin-2-yl]oxy}piperidin-1-yl)ethyl}-6-fluorobenzamide |
| 61 | 2-Chloro-N-{2-[4-(difluoromethyl)-1,3-thiazol-5-yl]-2-(4-{[2-(trifluoromethyl)pyridin-4-yl]oxy}piperidin-1-yl)ethyl}-6-fluorobenzamide |
| 62 | 2-Chloro-N-{2-[4-(difluoromethyl)-1,3-thiazol-5-yl]-2-[4-({3,6-dimethyl-[1,2]oxazolo[5,4-b]pyridin-4-yl}oxy)piperidin-1-yl]ethyl}-6-fluorobenzamide |
| 63 | 2-Chloro-N-{2-[4-(difluoromethyl)-1,3-thiazol-5-yl]-2-{4-[(2-methoxypyrimidin-4-yl)oxy]piperidin-1-yl}ethyl}-6-fluorobenzamide |
| 64 | 2-Chloro-N-{2-[4-(difluoromethyl)-1,3-thiazol-5-yl]-2-{4-[(4-methoxypyrimidin-2-yl)oxy]piperidin-1-yl}ethyl}-6-fluorobenzamide |
| 65 | 2-Chloro-N-{2-[4-(difluoromethyl)-1,3-thiazol-5-yl]-2-{4-[(6-methoxypyrimidin-4-yl)oxy]piperidin-1-yl}ethyl}-6-fluorobenzamide |
| 66 | 2-Chloro-N-(2-{4-[(3-cyclobutoxypyrazin-2-yl)oxy]piperidin-1-yl}-2-[4-(difluoromethyl)-1,3-thiazol-5-yl]ethyl)-6-fluorobenzamide |

-continued

| | Name |
|---|---|
| 67 | 2-Chloro-N-{2-[4-(difluoromethyl)-1,3-thiazol-5-yl]-2-{4-[(5-fluoro-2,6-dimethylpyrimidin-4-yl)oxy]piperidin-1-yl}ethyl}-6-fluorobenzamide |
| 68 | 2-Chloro-N-{2-[4-(difluoromethyl)-1,3-thiazol-5-yl]-2-[4-(phthalazin-1-yloxy)piperidin-1-yl]ethyl}-6-fluorobenzamide |
| 69 | 2-Chloro-N-(2-{4-[(4-chloropyridin-3-yl)oxy]piperidin-1-yl}-2-[4-(difluoromethyl)-1,3-thiazol-5-yl]ethyl)-6-fluorobenzamide |
| 70 | 2-Chloro-N-{2-[4-(difluoromethyl)-1,3-thiazol-5-yl]-2-[4-(pyrazin-2-yloxy)piperidin-1-yl]ethyl}-6-fluorobenzamidev |
| 71 | 2-Chloro-N-{2-[4-(difluoromethyl)-1,3-thiazol-5-yl]-2-[4-(pyridazin-3-yloxy)piperidin-1-yl]ethyl}-6-fluorobenzamide |
| 72 | 2-Chloro-N-{2-[4-(difluoromethyl)-1,3-thiazol-5-yl]-2-{4-[(6-fluoropyridin-2-yl)oxy]piperidin-1-yl}ethyl}-6-fluorobenzamide |
| 73 | 2-Chloro-N-{2-[4-(difluoromethyl)-1,3-thiazol-5-yl]-2-{4-[(2-methylpyridin-4-yl)oxy]piperidin-1-yl}ethyl}-6-fluorobenzamide |
| 74 | 2-Chloro-N-(2-{4-[(2-chloropyrimidin-4-yl)oxy]piperidin-1-yl}-2-[4-(difluoromethyl)-1,3-thiazol-5-yl]ethyl)-6-fluorobenzamide |
| 75 | 2-chloro-N-(2-{4-[(4-chloropyrimidin-2-yl)oxy]piperidin-1-yl}-2-[4-(difluoromethyl)-1,3-thiazol-5-yl]ethyl)-6-fluorobenzamide |
| 76 | 2-Chloro-N-(2-{4-[(6-chloropyrazin-2-yl)oxy]piperidin-1-yl}-2-[4-(difluoromethyl)-1,3-thiazol-5-yl]ethyl)-6-fluorobenzamide |
| 77 | 2-Chloro-N-(2-{4-[(6-chloropyridin-2-yl)oxy]piperidin-1-yl}-2-[4-(difluoromethyl)-1,3-thiazol-5-yl]ethyl)-6-fluorobenzamide |
| 78 | 2-Chloro-N-{2-[4-(difluoromethyl)-1,3-thiazol-5-yl]-2-[4-(pyrimidin-4-yloxy)piperidin-1-yl]ethyl}-6-fluorobenzamide |
| 79 | 2-Chloro-N-(2-{4-[(4-cyanopyridin-2-yl)oxy]piperidin-1-yl}-2-[4-(difluoromethyl)-1,3-thiazol-5-yl]ethyl)-6-fluorobenzamide |
| 80 | 2-Chloro-N-{2-[4-(difluoromethyl)-1,3-thiazol-5-yl]-2-{4-[(2-fluoropyridin-4-yl)oxy]piperidin-1-yl}ethyl}-6-fluorobenzamide |
| 81 | 2-chloro-N-{2-[4-(difluoromethyl)-1,3-thiazol-5-yl]-2-{4-[(4-fluoropyridin-2-yl)oxy]piperidin-1-yl}ethyl}-6-fluorobenzamide |
| 82 | 2-chloro-N-{2-[4-(difluoromethyl)-1,3-thiazol-5-yl]-2-{4-[(1,3-thiazol-2-yloxy)methyl]piperidin-1-yl}ethyl}-6-fluorobenzamide |
| 83 | 2-Chloro-N-[2-(4-{[(4-chloro-1,3-thiazol-2-yl)oxy]methyl}piperidin-1-yl)-2-[4-(difluoromethyl)-1,3-thiazol-5-yl]ethyl]-6-fluorobenzamide |
| 84 | 2-Chloro-N-{2-[4-(difluoromethyl)-1,3-thiazol-5-yl]-2-(4-{[(4-methyl-1,3-thiazol-2-yl)oxy]methyl}piperidin-1-yl)ethyl}-6-fluorobenzamide |
| 85 | 2-Chloro-N-{2-[4-(difluoromethyl)-1,3-thiazol-5-yl]-2-(4-{[(3-methyl-1,2,4-thiadiazol-5-yl)oxy]methyl}piperidin-1-yl)ethyl}-6-fluorobenzamide |
| 86 | 2-Chloro-N-[2-(4-{[(4-cyano-1-methyl-1H-pyrazol-5-yl)oxy]methyl}piperidin-1-yl)-2-[4-(difluoromethyl)-1,3-thiazol-5-yl]ethyl]-6-fluorobenzamide |
| 87 | 2-Chloro-N-[2-(4-{[(3-cyclopropyl-1,2,4-thiadiazol-5-yl)oxy]methyl}piperidin-1-yl)-2-[4-(difluoromethyl)-1,3-thiazol-5-ylethyl]-6-fluorobenzamide |
| 88 | 2-Chloro-N-{2-[4-(difluoromethyl)-1,3-thiazol-5-yl]-2-(4-{[(6-methylpyridin-2-yl)oxy]methyl}piperidin-1-yl)ethyl}-6-fluorobenzamide |
| 89 | 2-Chloro-N-{2-[4-(difluoromethyl)-1,3-thiazol-5-yl]-2-(4-{[(4-methylpyridin-2-yl)oxy]methyl}piperidin-1-yl)ethyl}-6-fluorobenzamide |
| 90 | 2-Chloro-N-[2-(4-{[(2-cyanopyridin-3-yl)oxy]methyl}piperidin-1-yl)-2-[4-(difluoromethyl)-1,3-thiazol-5-yl]ethyl]-6-fluorobenzamide |
| 91 | 2-Chloro-N-[2-(4-{[(5-cyanopyridin-3-yl)oxy]methyl}piperidin-1-yl)-2-[4-(difluoromethyl)-1,3-thiazol-5-yl]ethyl]-6-fluorobenzamide |

| | Name |
|---|---|
| 92 | 2-Chloro-N-[2-(4-{[(3-cyanopyrazin-2-yl)oxy]methyl}piperidin-1-yl)-2-[4-(difluoromethyl)-1,3-thiazol-5-yl]ethyl]-6-fluorobenzamide |
| 93 | N-(2-{4-[(1,3-Benzothiazol-2-yloxy)methyl]piperidin-1-yl}-2-[4-(difluoromethyl)-1,3-thiazol-5-yl]ethyl)-2-chloro-6-fluorobenzamide |
| 94 | N-(2-{4-[(1,2-Benzoxazol-3-yloxy)methyl]piperidin-1-yl}-2-[4-(difluoromethyl)-1,3-thiazol-5-yl]ethyl)-2-chloro-6-fluorobenzamide |
| 95 | 2-Chloro-N-{2-[4-(difluoromethyl)-1,3-thiazol-5-yl]-2-[4-({[3-(2-methoxyethyl)-1,2,4-thiadiazol-5-yl]oxy}methyl)piperidin-1-yl]ethyl}-6-fluorobenzamide |
| 96 | 2-Chloro-N-{2-[4-(difluoromethyl)-1,3-thiazol-5-yl]-2-(4-{[(4-phenyl-4H-1,2,4-triazol-3-yl)oxy]methyl}piperidin-1-yl)ethyl}-6-fluorobenzamide |
| 97 | 2-Chloro-N-{2-[4-(difluoromethyl)-1,3-thiazol-5-yl]-2-(4-{[(1-phenyl-1H-1,2,3,4-tetrazol-5-yl)oxy]methyl}piperidin-1-yl)ethyl}-6-fluorobenzamide |
| 98 | 2-Chloro-N-{2-[4-(difluoromethyl)-1,3-thiazol-5-yl]-2-(4-{[(4-fluoro-1-methyl-1H-1,3-benzodiazol-2-yl)oxy]methyl}piperidin-1-yl)ethyl}-6-fluorobenzamide |
| 99 | 2-Chloro-N-{2-[4-(difluoromethyl)-1,3-thiazol-5-yl]-2-(4-{[(3-methylpyridin-2-yl)oxy]methyl}piperidin-1-yl)ethyl}-6-fluorobenzamide |
| 100 | 2-Chloro-N-{2-[4-(difluoromethyl)-1,3-thiazol-5-yl]-2-(4-{[(5-methylpyrimidin-2-yl)oxy]methyl}piperidin-1-yl)ethyl}-6-fluorobenzamide |
| 101 | 2-Chloro-N-{2-[4-(difluoromethyl)-1,3-thiazol-5-yl]-2-(4-{[(6-methylpyridazin-3-yl)oxy]methyl}piperidin-1-yl)ethyl}-6-fluorobenzamide |
| 102 | 2-Chloro-N-{2-[4-(difluoromethyl)-1,3-thiazol-5-yl]-2-(4-{[(5-fluoropyridin-2-yl)oxy]methyl}piperidin-1-yl)ethyl}-6-fluorobenzamide |
| 103 | 2-Chloro-N-{2-[4-(difluoromethyl)-1,3-thiazol-5-yl]-2-(4-{[(6-fluoropyrimidin-4-yl)oxy]methyl}piperidin-1-yl)ethyl}-6-fluorobenzamide |
| 104 | 2-Chloro-N-{2-[4-(difluoromethyl)-1,3-thiazol-5-yl]-2-(4-{[(6-fluoropyridazin-3-yl)oxy]methyl}piperidin-1-yl)ethyl}-6-fluorobenzamide |
| 105 | 2-Chloro-N-{2-[4-(difluoromethyl)-1,3-thiazol-5-yl]-2-(4-{[(6-fluoropyrazin-2-yl)oxy]methyl}piperidin-1-yl)ethyl}-6-fluorobenzamide |
| 106 | 2-Chloro-N-{2-[4-(difluoromethyl)-1,3-thiazol-5-yl]-2-(4-{[(3-fluoropyrazin-2-yl)oxy]methyl}piperidin-1-yl)ethyl}-6-fluorobenzamide |
| 107 | 2-Chloro-N-{2-[4-(difluoromethyl)-1,3-thiazol-5-yl]-2-(4-{[(2-fluoropyrimidin-4-yl)oxy]methyl}piperidin-1-yl)ethyl}-6-fluorobenzamide |
| 108 | 2-Chloro-N-[2-(4-{[(3-cyanopyridin-2-yl)oxy]methyl}piperidin-1-yl)-2-[4-(difluoromethyl)-1,3-thiazol-5-yl]ethyl]-6-fluorobenzamide |
| 109 | 2-Chloro-N-[2-(4-{[(6-cyanopyridin-2-yl)oxy]methyl}piperidin-1-yl)-2-[4-(difluoromethyl)-1,3-thiazol-5-yl]ethyl]-6-fluorobenzamide |
| 110 | 2-Chloro-N-[2-(4-{[(2-cyanopyridin-4-yl)oxy]methyl}piperidin-1-yl)-2-[4-(difluoromethyl)-1,3-thiazol-5-yl]ethyl]-6-fluorobenzamide |
| 111 | 2-Chloro-N-[2-(4-{[(4-cyanopyridin-3-yl)oxy]methyl}piperidin-1-yl)-2-[4-(difluoromethyl)-1,3-thiazol-5-yl]ethyl]-6-fluorobenzamide |
| 112 | 2-Chloro-N-{2-[4-(difluoromethyl)-1,3-thiazol-5-yl]-2-(4-{[(6-fluoro-2-methylpyrimidin-4-yl)oxy]methyl}piperidin-1-yl)ethyl}-6-fluorobenzamide |
| 113 | 2-Chloro-N-{2-[4-(difluoromethyl)-1,3-thiazol-5-yl]-2-(4-{[(6-fluoro-5-methylpyrimidin-4-yl)oxy]methyl}piperidin-1-yl)ethyl}-6-fluorobenzamide |

-continued

| | Name |
|---|---|
| 114 | 2-Chloro-N-{2-[4-(difluoromethyl)-1,3-thiazol-5-yl]-2-[4-({[4-(trifluoromethyl)pyrimidin-2-yl]oxy}methyl)piperidin-1-yl]ethyl}-6-fluorobenzamide |
| 115 | 2-Chloro-N-{2-[4-(difluoromethyl)-1,3-thiazol-5-yl]-2-[4-({[6-(trifluoromethyl)pyrimidin-4-yl]oxy}methyl)piperidin-1-yl]ethyl}-6-fluorobenzamide |
| 116 | 2-Chloro-N-{2-[4-(difluoromethyl)-1,3-thiazol-5-yl]-2-[4-({pyrazolo[1,5-a]pyrazin-4-yloxy}methyl)piperidin-1-yl]ethyl}-6-fluorobenzamide |
| 117 | 2-Chloro-N-{2-[4-(difluoromethyl)-1,3-thiazol-5-yl]-2-[4-({pyrazolo[1,5-a]pyrimidin-5-yloxy}methyl)piperidin-1-yl]ethyl}-6-fluorobenzamide |
| 118 | 2-Chloro-N-{2-[4-(difluoromethyl)-1,3-thiazol-5-yl]-2-[4-({[1,2,4]triazolo[4,3-a]pyrazin-5-yloxy}methyl)piperidin-1-yl]ethyl}-6-fluorobenzamide |
| 119 | 2-Chloro-N-{2-[4-(difluoromethyl)-1,3-thiazol-5-yl]-2-[4-({[1,2,4]triazolo[4,3-a]pyrazin-8-yloxy}methyl)piperidin-1-yl]ethyl}-6-fluorobenzamide |
| 120 | 2-Chloro-N-[2-(4-{[(3-chloropyridin-2-yl)oxy]methyl}piperidin-1-yl)-2-[4-(difluoromethyl)-1,3-thiazol-5-yl]ethyl]-6-fluorobenzamide |
| 121 | 2-Chloro-N-{2-[4-(difluoromethyl)-1,3-thiazol-5-yl]-2-{4-[(1,6-naphthyridin-5-yloxy)methyl]piperidin-1-yl}ethyl}-6-fluorobenzamide |
| 122 | 2-Chloro-N-[2-(4-{[(3-cyanopyridin-4-yl)oxy]methyl}piperidin-1-yl)-2-[4-(difluoromethyl)-1,3-thiazol-5-yl]ethyl]-6-fluorobenzamide |
| 123 | 2-Chloro-N-{2-[4-(difluoromethyl)-1,3-thiazol-5-yl]-2-{4-[({1-methyl-1H-pyrazolo[3,4-d]pyrimidin-4-yl}oxy)methyl]piperidin-1-yl}ethyl}-6-fluorobenzamide |
| 124 | 2-Chloro-N-{2-[4-(difluoromethyl)-1,3-thiazol-5-yl]-2-(4-{[(6-fluoropyridin-2-yl)oxy]methyl}piperidin-1-yl)ethyl}-6-fluorobenzamide |
| 125 | 2-Chloro-N-{2-[4-(difluoromethyl)-1,3-thiazol-5-yl]-2-(4-{[(2-fluoropyridin-4-yl)oxy]methyl}piperidin-1-yl)ethyl}-6-fluorobenzamide |
| 126 | 2-chloro-N-{2-[4-(difluoromethyl)-1,3-thiazol-5-yl]-2-(4-{[(4-fluoropyridin-2-yl)oxy]]methyl}piperidin-1-yl)ethyl}-6-fluorobenzamide AND |
| 127 | 2-Chloro-N-(2-{4-[(2-cyanopyridin-4-yl)oxy]piperidin-1-yl}-2-[4-(difluoromethyl)-1,3-thiazol-5-yl]ethyl)-6-fluorobenzamide. |

5. A process for preparing a compound of formula (I) according to claim 1 comprising the step of reacting a compound of formula (II):

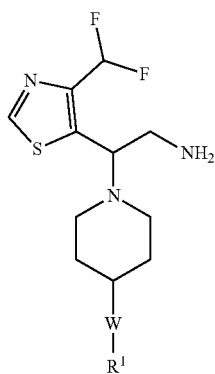

wherein the meanings of W and R$^1$ are as defined in claim 1, with a compound of formula (III):

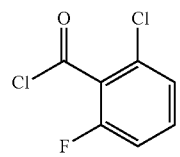

and optionally converting the obtained compound of formula (I) into a salt thereof, and/or preparing stereochemically isomeric forms thereof.

6. A process for preparing a compound of formula (I) according to claim 1 comprising the step of reacting a compound of formula (VIIIa) or (VIIIb) with a halide of formula R$^1$—X:

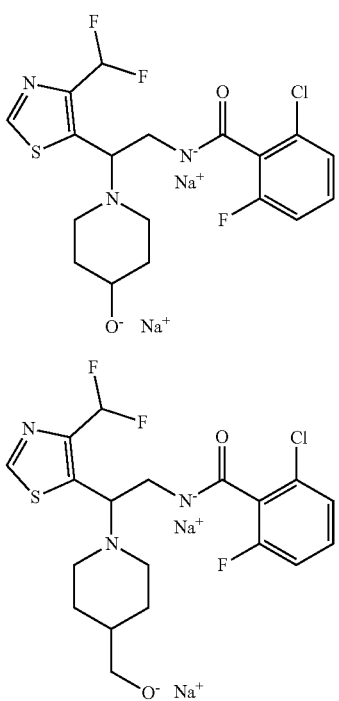

(VIIIa)

(VIIIb)

wherein R¹ is as defined in claim 1, X is a halogen; and optionally converting the obtained compound of formula (I) into a salt thereof, and/or preparing stereochemically isomeric forms thereof.

7. A pharmaceutical formulation comprising a compound of formula (I) according to claim 1, or a pharmaceutically acceptable salt thereof, including any stereochemically isomeric form thereof, and a pharmaceutically acceptable diluent and/or carrier.

8. A method of treating a condition mediated by P2X7 receptor activity in a subject, the method comprising administering to a subject in need of such treatment a therapeutically effective amount of a compound of formula (I) according to claim 1 or a pharmaceutically acceptable salt thereof, including any stereochemically isomeric form thereof.

9. The method of A compound of formula (I) according to claim 8, wherein the condition mediated by P2X7 receptor activity is selected from the group consisting of neurological disorders, neurodegenerative disorders neuroinflammatory disorders, cognitive disorders, psychiatric disorders, neuropathic pain, chronic pain, acute pain, headaches, inflammatory processes of musculoskeletal system, gastrointestinal tract disorders, genitourinary tract disorders, ophthalmic diseases, cardiovascular diseases, endocrine disorders, liver diseases, eating disorders, and allergic diseases.

\* \* \* \* \*